(12) United States Patent
Helmrich et al.

(10) Patent No.: US 9,947,329 B2
(45) Date of Patent: Apr. 17, 2018

(54) APPARATUS AND METHOD FOR ENCODING OR DECODING AN AUDIO SIGNAL USING A TRANSIENT-LOCATION DEPENDENT OVERLAP

(71) Applicant: Fraunhofer-Gesellschaft zur Foerderung der angewandten Forschung e.V., Munich (DE)

(72) Inventors: Christian Helmrich, Erlangen (DE); Jeremie Lecomte, Fuerth (DE); Goran Markovic, Nuremberg (DE); Markus Schnell, Nuremberg (DE); Bernd Edler, Fuerth (DE); Stefan Reuschl, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 74 days.

(21) Appl. No.: 14/830,484

(22) Filed: Aug. 19, 2015

(65) Prior Publication Data
US 2016/0078875 A1    Mar. 17, 2016

Related U.S. Application Data

(63) Continuation of application No. PCT/EP2014/053293, filed on Feb. 20, 2014.
(Continued)

(51) Int. Cl.
*G10L 19/02* (2013.01)
*G10L 19/025* (2013.01)
(Continued)

(52) U.S. Cl.
CPC .......... *G10L 19/025* (2013.01); *G10L 19/022* (2013.01); *G10L 19/0212* (2013.01);
(Continued)

(58) Field of Classification Search
CPC .................................................... G10L 19/022
See application file for complete search history.

(56) References Cited

U.S. PATENT DOCUMENTS

| 4,920,426 A | 4/1990 | Mukawa et al. |
| 5,394,473 A * | 2/1995 | Davidson ............ G10L 19/0212 375/240 |

(Continued)

FOREIGN PATENT DOCUMENTS

| CN | 1787383 A | 6/2006 |
| CN | 1934619 A | 3/2007 |

(Continued)

OTHER PUBLICATIONS

PCT search report for a parent case: PCT/EP2014/053293, [online] from https://patentscope.wipo.int, Jan. 2015.*
(Continued)

*Primary Examiner* — Jialong He
(74) *Attorney, Agent, or Firm* — Perkins Coie LLP; Michael A. Glenn

(57) ABSTRACT

An apparatus for encoding an audio or image signal, includes: a controllable windower for windowing the audio or image signal to provide the sequence of blocks of windowed samples; a converter for converting the sequence of blocks of windowed samples into a spectral representation including a sequence of frames of spectral values; a transient location detector for identifying a location of a transient within a transient look-ahead region of a frame; and a controller for controlling the controllable windower to apply a specific window having a specified overlap length to the audio or image signal in response to an identified location of the transient, wherein the controller is configured
(Continued)

to select the specific window from a group of at least three windows, wherein the specific window is selected based on the transient location.

41 Claims, 32 Drawing Sheets

Related U.S. Application Data

(60) Provisional application No. 61/767,115, filed on Feb. 20, 2013.

(51) Int. Cl.
*H04N 19/172* (2014.01)
*H04N 19/176* (2014.01)
*H04N 19/44* (2014.01)
*G10L 19/022* (2013.01)

(52) U.S. Cl.
CPC ......... *H04N 19/172* (2014.11); *H04N 19/176* (2014.11); *H04N 19/44* (2014.11)

(56) References Cited

U.S. PATENT DOCUMENTS

| | | | |
|---|---|---|---|
| 5,825,419 A | 10/1998 | Asamura et al. | |
| 5,848,391 A * | 12/1998 | Bosi | H04B 1/665 704/200.1 |
| 6,131,084 A | 10/2000 | Hardwick | |
| 6,173,255 B1 * | 1/2001 | Wilson | G10L 21/04 704/216 |
| 6,750,789 B2 * | 6/2004 | Herre | G10L 19/02 341/50 |
| 6,826,525 B2 * | 11/2004 | Hilpert | H04B 1/665 704/200.1 |
| 7,020,515 B2 | 3/2006 | Graindorge et al. | |
| 7,313,519 B2 * | 12/2007 | Crockett | G10L 19/02 704/226 |
| 7,587,313 B2 | 9/2009 | Gerrits et al. | |
| 7,873,227 B2 | 1/2011 | Schuller et al. | |
| 7,987,089 B2 | 7/2011 | Krishnan et al. | |
| 8,725,503 B2 | 5/2014 | Bessette | |
| 8,744,862 B2 | 6/2014 | You | |
| 8,788,276 B2 * | 7/2014 | Neuendorf | G10L 21/038 704/500 |
| 2005/0071402 A1 * | 3/2005 | Youn | G06F 17/147 708/402 |
| 2006/0074642 A1 * | 4/2006 | You | G10L 19/025 704/222 |
| 2006/0122825 A1 | 6/2006 | Oh et al. | |
| 2006/0161427 A1 * | 7/2006 | Ojala | G10L 19/24 704/219 |
| 2007/0185707 A1 | 8/2007 | Gerrits et al. | |
| 2007/0196022 A1 | 8/2007 | Schuller et al. | |
| 2008/0027719 A1 | 1/2008 | Kirshnan et al. | |
| 2008/0059202 A1 | 3/2008 | You et al. | |
| 2008/0065373 A1 | 3/2008 | Oshikiri et al. | |
| 2008/0140428 A1 * | 6/2008 | Choo | G10L 19/022 704/500 |
| 2009/0012797 A1 | 1/2009 | Boehm et al. | |
| 2010/0017213 A1 * | 1/2010 | Edler | G10L 19/26 704/500 |
| 2010/0063811 A1 | 3/2010 | Gao et al. | |
| 2010/0076754 A1 | 3/2010 | Kovesi et al. | |
| 2010/0138218 A1 | 6/2010 | Geiger et al. | |
| 2010/0217607 A1 | 8/2010 | Neuendorf et al. | |
| 2011/0046965 A1 * | 2/2011 | Taleb | G10L 19/025 704/501 |
| 2011/0153333 A1 | 6/2011 | Bessette et al. | |
| 2011/0173009 A1 | 7/2011 | Fuchs et al. | |
| 2011/0173010 A1 | 7/2011 | Lecomte et al. | |
| 2011/0202337 A1 * | 8/2011 | Fuchs | G10L 19/20 704/231 |
| 2012/0209600 A1 | 8/2012 | Kim et al. | |
| 2012/0245947 A1 | 9/2012 | Neuendorf et al. | |
| 2013/0124215 A1 | 5/2013 | Lecomte et al. | |
| 2013/0253938 A1 * | 9/2013 | You | G10L 19/008 704/500 |
| 2014/0046670 A1 * | 2/2014 | Moon | G10L 19/02 704/500 |
| 2014/0163999 A1 * | 6/2014 | Lee | G10L 19/022 704/500 |

FOREIGN PATENT DOCUMENTS

| | | |
|---|---|---|
| CN | 101611440 A | 12/2009 |
| JP | 2000500247 A | 1/2000 |
| JP | 2002118517 A | 4/2002 |
| JP | 2007529779 A | 10/2007 |
| JP | 2010501153 A | 1/2010 |
| JP | 2012530946 A | 12/2012 |
| KR | 1020110055545 A | 5/2011 |
| RU | 2214048 C2 | 10/2003 |
| RU | 2323469 C2 | 4/2008 |
| RU | 2409874 C2 | 1/2011 |
| RU | 2418323 C2 | 5/2011 |
| RU | 2459283 C2 | 8/2012 |
| WO | 9105412 A1 | 4/1991 |
| WO | 2006046546 A1 | 5/2006 |
| WO | 2010108895 A1 | 9/2010 |

OTHER PUBLICATIONS

Fujiwara, Hiroshi et al., "Mathematics in Times of Internet, Serial No. 5, Multi Media Data Compression: 3.2.3 MPEG1 Algorithm: Selection of Block Length and Window Functions,", published by Kyoritsu Shuppan Co., Ltd., First Edition, Mar. 1, 2000, pp. 109-110.

Fujiwara, Hiroshi et al., "Mathematics in Times of Internet, Serial No. 5, Multi Media Data Compression: 3.3 From AC-3 to AAC; 3.3.1 Method of transform coding and MDCT", published by Kyoritsu Shuppan Co., Ltd., First Edition, Mar. 1, 2000, pp. 118-123.

Lecomte, et al., "Efficient Cross-Fade Windows for Transitions Between LPC-Based and Non-LPC Based Audio Coding", AES Convention 126; May 2009, AES, 60 East 42nd Street, Room 2520 New York 10165-2520, USA, May 1, 2009 (May 1, 2009), XP040508994F, 18 pages.

Bosi, M et al., "ISO/IEC MPEG-2 Advanced Audio Coding", J. Audio Eng. Soc., vol. 45, No. 10, Oct. 1997, pp. 789-814.

\* cited by examiner (ENCODER)

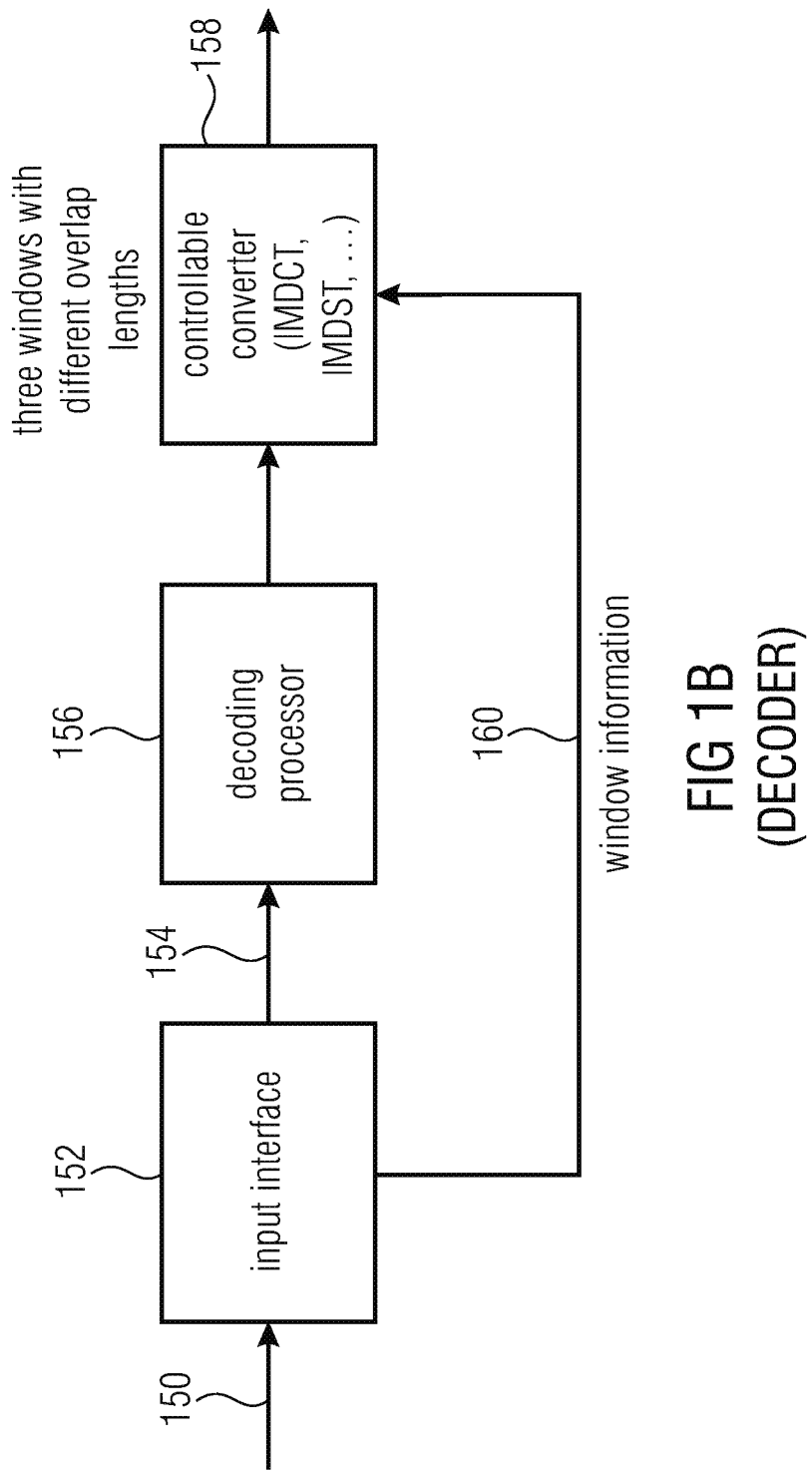
FIG 1B (DECODER)

transient in the 7th sub-block – half overlap transient in the 6th sub-block – minimal overlap

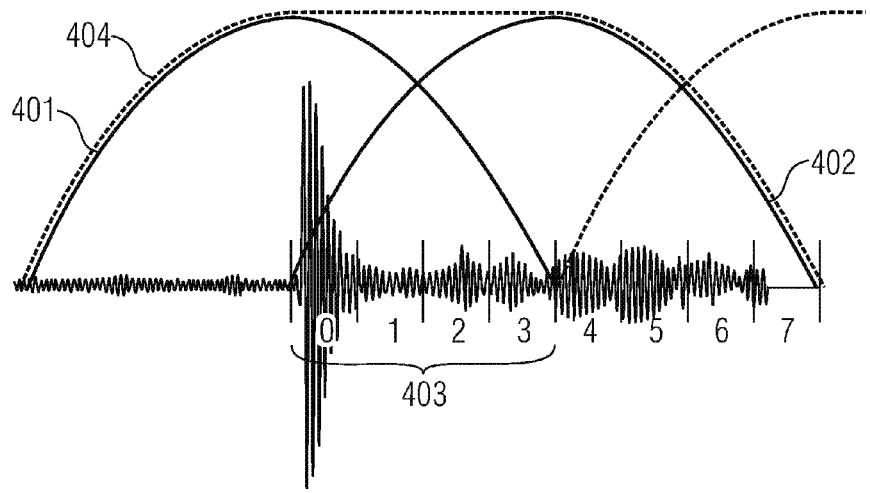

— TCX10 full overlap with the previous, with the next and between the 2 TCX10 windows
---------- TCX20 full overlap with the previous and with the next window transient in the $0^{th}$ or $1^{st}$ sub-block
(An example TCX20 window with full overlap on both sides is drawn as a reference.)

FIG 4A

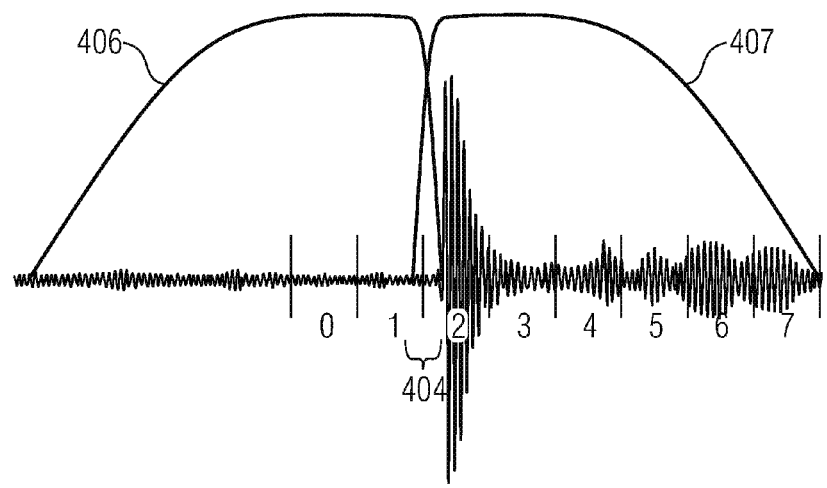

— TCX10 full overlap with the previous, with the next and minimum overlap between the 2 TCX10 windows transient in the $2^{nd}$ sub-block

FIG 4B

TCX10 full overlap with the previous, with the next and half overlap between the 2 TCX10 windows transient in the 3$^{rd}$ sub-block TCX10 full overlap with the previous, with the next and between the 2 TCX10 windows transient in the 4$^{th}$ or 5$^{th}$ sub-block — TCX10 full overlap with the previous, with the next and half overlap between the 2 TCX10 windows transient in the $0^{th}$ sub-block — TCX10 full overlap with the previous, with the next and minimum overlap between the 2 TCX10 windows transient in the $1^{st}$ sub-block —— TCX10 full overlap with the previous, between the 2 TCX10 and half overlap with the next windows transient in the 4th sub-block

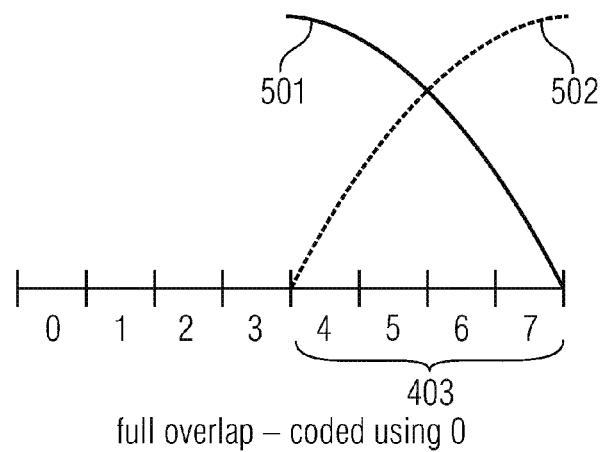
FIG 5A — full overlap – coded using 0
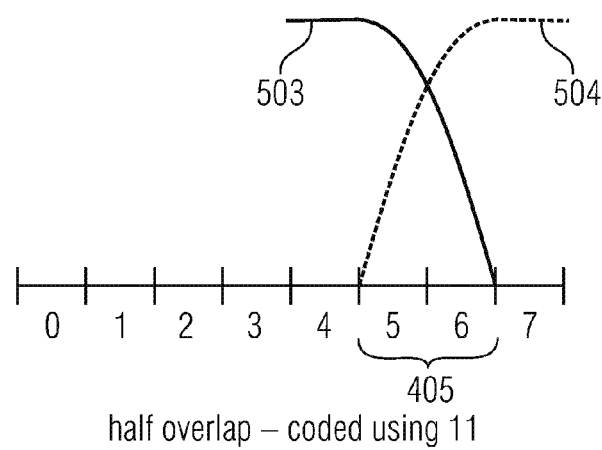
FIG 5B — half overlap – coded using 11
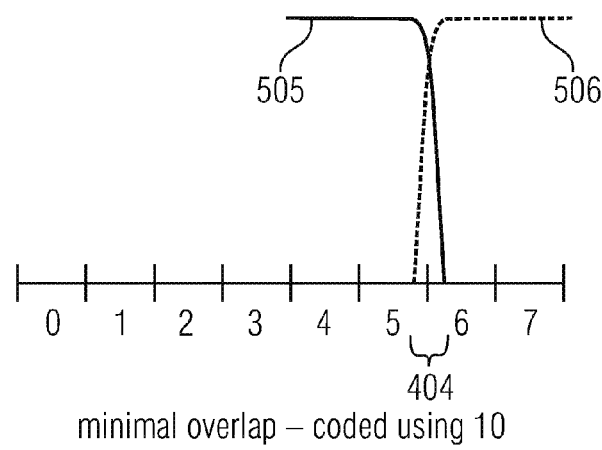
FIG 5C — minimal overlap – coded using 10

| transient position index (604) | overlap with the first window of the following frame (605) | short/long transform decision (binary coded) 0 – long, 1 – short (600) | binary code for the overlap width (602) | overlap code (603) |
|---|---|---|---|---|
| none | full | 0 | 0 | 00 |
| -2 | full | 1 | 0 | 10 |
| -1 | full | 1 | 0 | 10 |
| 0 | full | 1 | 0 | 10 |
| 1 | full | 1 | 0 | 10 |
| 2 | half | 1 | 11 | 111 |
| 3 | half | 1 | 11 | 111 |
| 4 | minimal | 1 | 10 | 110 |
| 5 | minimal | 1 | 10 | 110 |
| 6 | minimal | 0 | 10 | 010 |
| 7 | half | 0 | 11 | 011 | coding of the overlap and the transform length based on the transient position

FIG 6A

| current overlap code \ previous overlap code | 00 | 10 | 111 | 110 | 010 | 011 |
|---|---|---|---|---|---|---|
| 00 | TCX20 | TCX20 | TCX20 | TCX20 | TCX20 | TCX20 |
| 10 | TCX10, TCX10 | TCX10, TCX10 | 2xTCX5, TCX10 | 2xTCX5, TCX10 | TCX20 | TCX20 |
| 111 | TCX10, 2xTCX5 | TCX10, 2xTCX5 | 4xTCX5 | 4xTCX5 | TCX20 | TCX20 |
| 110 | TCX10, 2xTCX5 | TCX10, 2xTCX5 | 4xTCX5 | 4xTCX5 | TCX20 | TCX20 |
| 010 | TCX20 | TCX20 | TCX20 | TCX20 | TCX20 | TCX20 |
| 011 | TCX20 | TCX20 | TCX20 | TCX20 | TCX20 | TCX20 | transform lengths decision table

FIG 6B some of the possible combinations of TCX5 and TCX10 windows (ENCODER)

(DECODER)

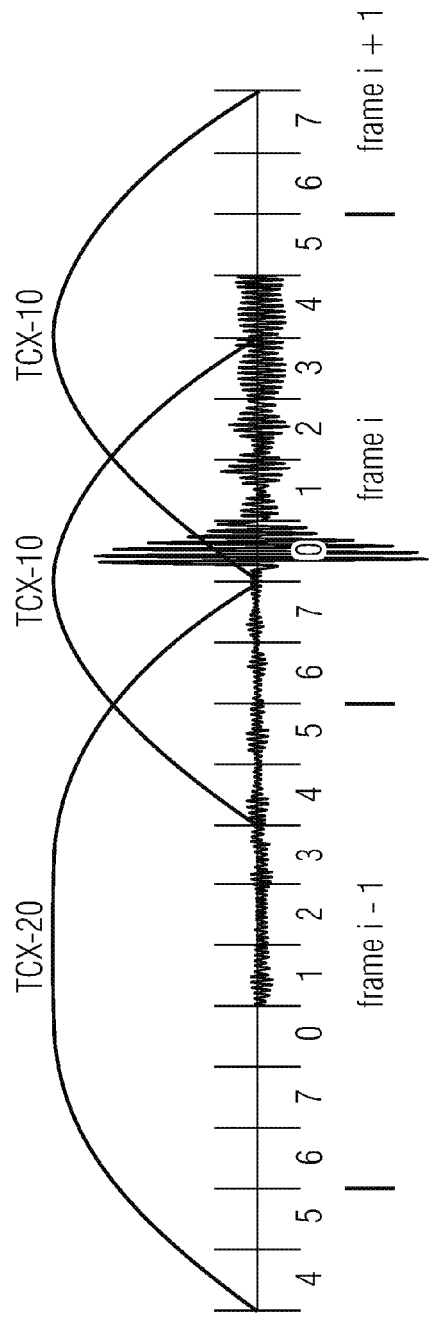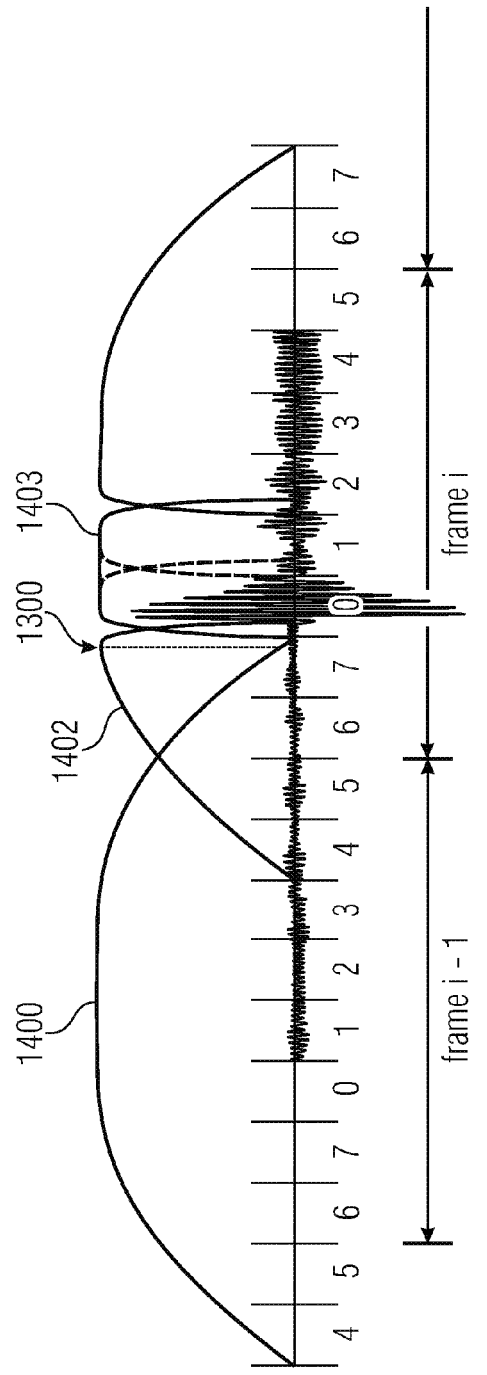

APPARATUS AND METHOD FOR ENCODING OR DECODING AN AUDIO SIGNAL USING A TRANSIENT-LOCATION DEPENDENT OVERLAP

CROSS-REFERENCE TO RELATED APPLICATIONS

This application is a continuation of copending International Application No. PCT/EP2014/053293, filed Feb. 20, 2014, which is incorporated herein by reference in its entirety, and additionally claims priority from U.S. Application No. 61/767,115, filed Feb. 20, 2013, which is also incorporated herein by reference in its entirety.

BACKGROUND OF THE INVENTION

The present invention relates to the processing of audio or image signals and, in particular, to the encoding or decoding of audio or image signals in the presence of transients.

Contemporary frequency-domain speech/audio coding schemes based on overlapping FFTs or the modified discrete cosine transform (MDCT) offer some degree of adaptation to non-stationary signal characteristics. The general-purpose codecs standardized in MPEG, namely MPEG-1 Layer 3 better known as MP3, MPEG-4 (HE-)AAC [1], and most recently, MPEG-0 xHE-AAC (USAC), as well as the Opus/Celt codec specified by the IETF [2], allow the coding of a frame using one of at least two different transform lengths—one long transform of length M for stationary signal passages, or 8 short transforms of length M/8 each. In the case of the MPEG codecs, switching from long to short and from short to long transforms (also known as block switching) necessitates the use of asymmetrically windowed transition transforms, namely a start and a stop window, respectively. These transform shapes, along with other known prior-art shapes, are depicted in FIG. 16. It should be noted that the linear overlap slope is merely illustrative and varies in exact shape. Possible window shapes are given in the AAC standard [1] and in section 6 of [3].

Given that if the upcoming frame is to be coded with short transforms by an MPEG encoder, the current frame has to be coded with a start transition transform, it becomes evident that an encoder implemented according to one of the above-mentioned MPEG standards necessitates at least one frame length of look-ahead. In low-delay communication applications, however, it is desirable to minimize or even avoid this additional look-ahead. To this end, two modifications to the general-purpose coding paradigm have been proposed. One, which was adopted e.g. in Celt [2], is to reduce the overlap of the long transform to that of the short transform so that asymmetric transition windows can be avoided. The other modification, which is used e.g. in the MPEG-4 (Enhanced) Low Delay AAC coding schemes, is to disallow switching to shorter transforms and instead rely on a Temporal Noise Shaping (TNS) coding tool [4] operating on the long-transform coefficients to minimize temporal spread of coding error around transients.

Furthermore, like xHE-AAC, Low Delay AAC allows the use of two frame overlap widths—the default 50% overlap for stationary input, or a reduced overlap (similar to the short overlap of the transition transforms) for non-stationary signals. The reduced overlap effectively limits the time extension of a transform and, thus, its coding error in case of coefficient quantization.

U.S. patent 2008/0140428A1 assigned to Samsung Electronics Co., as well as U.S. Pat. Nos. 5,502,789 and 5,819,214 assigned to Sony Corp., disclose signal-adaptive window or transform size determining units. However, the transformer units controlled by said window or transform size determining units operate on QMF or LOT sub-band values (implying that the described systems both employ cascaded filter-banks or transforms) as opposed to working directly on the time-domain full-band input signal as in the present case. Moreover, in 2008/0140428A1 no details about the shape or control of the window overlap are described, and in 5819214 the overlap shapes follow—i.e., are the result of—output from the transform size determining unit, which is the opposite of what an embodiment of the current invention proposes.

U.S. patent 2010/0076754A1 assigned to France Telecom follows the same motivation as the present invention, namely being able to perform transform length switching in communication coding scenarios to improve coding of transient signal segments, and doing so without extra encoder look-ahead. However, whereas said document reveals that the low-delay objective is achieved by avoiding transform-length transition windows and by post-processing the reconstructed signal in the decoder (disadvantageously by amplification of parts of the decoded signal and thus the coding error), the present invention proposes a simple modification of the transition window of a conventional system to be introduced below, such that additional encoder look-ahead can be minimized and special (risky) decoder post-processing can be avoided.

The transition transform to which an inventive modification is to be applied is the start window described in two variants in U.S. Pat. No. 5,848,391 assigned to Fraunhofer-Gesellschaft e. V. and Dolby Laboratories Licensing Corp. as well as, in a slightly different form, in U.S. patent 2006/0122825A1 assigned to Samsung Electronics Co. FIG. 16 shows these start windows and reveals that the difference between Fraunhofer/Dolby's windows and Samsung's window is the presence of a non-overlapping segment, i.e. a region of the window having a constant maximum value which does not belong to any overlap slope. The Fraunhofer/Dolby windows exhibit such a "non-overlapping part having a length", the Samsung windows do not. It can be concluded that an encoder with the least amount of additional look-ahead but using conventional transform switching can be realized by employing Samsung's transition window approach. With such transforms, a look-ahead equal to the overlap width between the short transforms suffices to fully switch from long to short transforms early enough before a signal transient.

Further conventional technology can be found in WO 90/09063 or "Coding of audio signals with overlap block transform and adaptive window functions", Frequenz, Band 43, September 1989, pages 2052 to 2056 or in AES Convention Paper 4929, "MPEG-4 Low Delay Audio Coding based on the AAC Codec", E. Allamanche, et al., 106 Convention, 1999.

Nonetheless, depending on the length of the short transform the look-ahead can remain fairly large and should not be avoided. FIG. 17 illustrates the block switching performance during the worst-case input situation, namely the presence of a sudden transient at the start of the look-ahead region, which in turn begins at the end of the long slope, i.e. the overlap region between the frames. According to the prior-art approaches, at least one of the two depicted transients reaches into the transition transform. In a lossy coding system utilizing an encoder without additional look-ahead—an encoder which does not "see the transient coming"—this condition causes temporal spreading of the coding error up to the beginning of the long slope and, even when using TNS, pre-echo noise is thus likely to be audible in the decoded signal.

The two previously mentioned look-ahead work-arounds have their disadvantages. Reducing the long-transform overlap by a factor of up to 8 on the one hand, as done in the Celt coder, severely limits the efficiency (i.e. coding gain, spectral compaction) on stationary, especially highly tonal, input material. Prohibiting short transforms as in (Enhanced) Low Delay AAC, on the other hand, reduces codec performance on strong transients with durations of much less than the frame length, often leading to audible pre- or post-echo noise even when using TNS.

Thus, the conventional window sequence determination procedures are sub-optimum with respect to flexibility due to the restricted window lengths, are sub-optimum with respect to the necessitated delay due to the minimum necessitated transient look-ahead periods, are sub-optimum with respect to audio quality due to pre- and post-echoes, are sub-optimum with respect to efficiency due to potentially necessitated additional pre-processing using additional functionalities apart from windowing procedures with certain windows or are sub-optimum with respect to flexibility and efficiency due to the potential necessity of changing a frame/block raster in the presence of a transient.

SUMMARY

According to an embodiment, an apparatus for encoding an audio signal may have: a controllable windower for windowing the audio signal to provide a sequence of blocks of windowed samples; a converter for converting the sequence of blocks of windowed samples into a spectral representation including a sequence of frames of spectral values; a transient location detector for identifying a location of a transient within a transient look-ahead region of a frame; and a controller for controlling the controllable windower to apply a specific window having a specified overlap length to the audio signal in response to an identified location of the transient, wherein the controller is configured to select the specific window from a group of at least three windows including a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero, wherein the specific window is selected based on the transient location such that one of two time-adjacent overlapping windows has first window coefficients at the location of the transient and the other of the two time-adjacent overlapping windows has second window coefficients at the location of the transient, wherein the second coefficients are at least nine times greater than the first coefficients.

According to another embodiment, a decoder for decoding an audio signal including a sequence of blocks of converted windowed samples and associated window information identifying a specific window function for a block out of at least three different window functions may have: a processor for providing a sequence of blocks of spectral values; a controllable converter for converting the sequence of blocks of spectral values into a time domain representation using an overlap-add processing, wherein the controllable converter is controlled by the window information to apply window functions indicated by the window information to the corresponding block to calculate a decoded audio signal, wherein the window is selected from a group of at least three windows including a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero.

According to another embodiment, a method for encoding an audio signal may have the steps of: windowing the audio signal to provide a sequence of blocks of windowed samples; converting the sequence of blocks of windowed samples into a spectral representation including a sequence of frames of spectral values; identifying a location of a transient within a transient look-ahead region of a frame; and controlling the windowing to apply a specific window having a specified overlap length to the audio signal in response to an identified location of the transient, wherein the specific window is selected from a group of at least three windows including a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero, wherein the specific window is selected based on the transient location such that one of two time-adjacent overlapping windows has first window coefficients at the location of the transient and the other of the two time-adjacent overlapping windows has second window coefficients at the location of the transient, wherein the second coefficients are at least nine times greater than the first coefficients.

According to another embodiment, a method for decoding an audio signal including a sequence of blocks of converted windowed samples and associated window information identifying a specific window function for a block out of at least three different window functions may have the steps of: providing a sequence of blocks of spectral values; converting the sequence of blocks of spectral values into a time domain representation using an overlap-add processing, wherein the converting is controlled by the window information to apply window functions indicated by the window information to the corresponding block to calculate a decoded audio signal, wherein the window is selected from a group of at least three windows including a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero.

Another embodiment may have a computer program for performing, when running on a computer or a processor, the inventive methods.

Aspects of the present invention rely on the finding that, in order for a low-delay audio or image codec to be able to approach the coding quality of general-purpose codecs, it is useful to maintain a high overlap percentage between long transforms during stationary signal inputs and to allow instant switching to shorter overlaps and transforms at audio or image signal portions surrounding signal non-stationarities. Furthermore, it is desirable to allow a somewhat greater flexibility than offering only a binary choice with respect to overlap width and, additionally or alternatively with respect to transform lengths, such that the overlap width or lengths of the transform(s) within a frame can be accurately adapted based on the location of a possible transient within the temporal region of the frame in order to minimize pre-echoes or other artifacts.

Specifically, a transient location detector is configured for identifying a location of a transient within a transient-look-ahead region of a frame and, based on the location of the transient within the frame, a specific window from a group of at least three windows is selected, where these three windows are different with respect to their overlap lengths with corresponding adjacent windows. Thus, the first window has an overlap length being greater than the second window and the second window has an overlap length being greater than the overlap length of the third window and the third window can, alternatively, also have a zero overlap, i.e., no overlap. The specific window is selected based on the transient location such that one of two time-adjacent overlapping windows has first widow coefficients at the location of the transient and the other one of the two time-adjacent overlapping windows has second window coefficients at the location of the transient, wherein the second coefficients are at least nine times greater than the first coefficients. Thus, it is made sure that the transient location is, with respect to the first window, sufficiently suppressed and the transient is, with respect to the second window, sufficiently captured. In other words, and advantageously, the earlier window is already at values close to zero in the transient location where the transient has been detected and the second window has window coefficients close or equal to one in this region so that, during at least a portion of the transient, the transient is suppressed in the earlier window and is not suppressed in the later or following window.

In an implementation, the overlap lengths are different by integer factors so that the second overlap length is, for example, equal to one half of the third overlap length and the third overlap length is equal to one half of the second overlap length or is different from the second overlap length by a different factor but is greater than or equal to at least 64 samples or is greater than or equal to at least 32 samples or is greater than or equal to at least even 16 audio or image samples.

The window selection derived from the transient location is transmitted together with the frames of the audio or image signal so that a decoder can select the corresponding synthesis windows in line with the encoder selection of the analysis windows, making sure that encoder and decoder are synchronized throughout the whole encoding/decoding operation.

In an implementation, a controllable windower, a converter, a transient location detector and a controller form an apparatus for encoding and the converter applies any of the known aliasing introducing transforms such as an MDCT (modified discrete cosine transform), an DST (modified discrete sine transform) or any other similar transform. On the decoder-side, a processor cooperates with a controllable converter in order to convert a sequence of blocks of spectral values into a time domain representation using an overlap-add processing in accordance with window sequences indicated by a window information received by the decoder.

Depending on the implementation, a transform length switching can be implemented in addition to the transform overlap selection, again based on the transient location within the frame. By implementing a multi-overlap section in which at least three windows overlap with each other, a very low delay codec concept is realized which again substantially reduces the necessitated transient look-ahead delay with respect to earlier concepts. In a further implementation, it is advantageous to firstly perform an overlap selection and to subsequently perform a transform length decision in order to determine an overlap code for each frame. Alternatively, the transform length switching decision can be done independent from the overlap width decision and, based on these two decisions, an overlap code is determined. Based on the overlap code for a current frame and the overlap code of an earlier frame, a window sequence selection for a specific transient is done, based on which an encoder as well as a decoder operate in synchrony with each other.

In a further aspect, a window sequence controller, a preprocessor and a spectrum converter together constitute an apparatus for generating an encoded signal, where three windows have a multi-overlap portion. This multi-overlap portion, in which not only two windows as in the conventional technology but three windows overlap with each other, allows a very low delay concept due to the fact that the necessitated delay due for the transient look-ahead is further reduced. A corresponding decoder is formed by a decoder processor, a time converter and a post processor. The post processor and the pre-processor perform additional windowing operations using one and the same auxiliary window on the encoder side and on the decoder side so that an efficient implementation can be obtained particularly in mobile devices or low cost devices in which a necessitated ROM or RAM storage is to be as small as possible.

Embodiments rely on a specific window sequence and a specific interaction of windows having different lengths so that a short-length window is "placed" at the transient in order to avoid long pre- or post-echoes. For making sure that the multi-overlap portion does not result in audio or image artifacts, the preprocessor on the encoder side performs a windowing operation using the auxiliary window function and a pre-processing operation using a folding-in operation to obtain a modified multi-overlap portion which is then transformed into the spectral domain using an aliasing introducing transform. On the decoder-side, a corresponding post processor is configured for performing a folding-out operation subsequent to corresponding transforms into the time representation and, subsequent to the folding-out operation, a windowing using the auxiliary window function and a final overlap-adding with a preceding block of samples originating by a window operation with a long window is performed.

In an embodiment in which a transform overlap selection is performed, an increased audio or image quality is obtained.

Unlike existing coding systems, which employ only a binary choice of transform overlap width (large/maximum or small), the embodiment proposes a set of three overlap widths from which an encoder can choose an a per-frame (or optionally, a per-transform) basis: maximum overlap, half overlap, or minimum overlap. The maximum overlap could be equal to the frame length as for long transforms in AAC, i.e. 50% overlap, but could also equate to one half of the frame length, i.e. 33% overlap, or less, as will be described in an embodiment. Accordingly, the minimum overlap could indicate an overlap width of zero, i.e. no overlap, but could also represent a greater-than-zero overlap of a very small number of time samples or milliseconds, like said embodiment will demonstrate. Finally, the half overlap could be, but does not necessarily have to be, one half of the maximum overlap.

In particular, according to an aspect of the present invention, an overlap width determining unit is defined which selects for each frame (or optionally, for each transform within a frame) one of the three possible overlap widths.

More precisely, said overlap width determining unit has, as an input, the output of a transient detection unit to identify with sufficient accuracy the position of a transient within the current frame (or optionally, within a transform in the current frame) and to derive an overlap width such that at least one of the two objectives is achieved:

The width is chosen such that only one of the overlapping transforms contains the transient.

Pseudo-transients due to time-aliased TNS shaping of coding error are strongly suppressed.

In other words, the overlap width is determined with the goal of preventing pre- or post-echo distortion around a perceptually coded transient located in the given frame. It shall be noted that a certain degree of freedom regarding the means of determining the exact location of the transient is possible. The time or sub-block index designating a transient location could equal the start (onset) of that transient location, as in an embodiment, but it could also be the location of the maximum energy or amplitude, or the center of energy, of the transient.

Furthermore, unlike prior-art coding schemes which derive the instantaneous inter-transform overlaps from the given selection of transform lengths for a pair of frames (that is, the overlap width follows the output of a transform size determining unit), according to another aspect of the present invention a coding system can, under certain conditions to be examined below in an embodiment, control or derive the transform length(s) to be used for a particular frame using the overlap width attributed to that frame and, optionally, the overlap width of the previous frame (i.e. the transform size follows the data of the overlap width determining unit).

In a further embodiment in which a multi-overlap portion is used or a transform length switching is applied, a particularly low-delay concept is obtained.

An improvement to prior-art block switching schemes is an advantageous modification to the transition transforms of FIG. 16 which allows the additional encoder look-ahead necessitated for stable-quality operation during signal non-stationarities to be reduced by one half. As discussed above, the start windows proposed by Fraunhofer/Dolby or by Samsung are characterized by the presence or absence, respectively, of a "non-overlapping part having a length". The embodiment goes even further and allows the left and right overlap slopes of the transition window to extend into each other. In other words, the modified transition transform exhibits a "double-overlapping" region of non-zero length in which it overlaps with both the preceding frame's long transform as well as the following short transform. The resulting shape of the inventive transition transform is illustrated in FIG. 13. In comparison to Samsung's transition window shown in FIG. 17, it is clear that by allowing a "double-overlap" region in the transform, the short-overlap slope on the right end of the transform can be shifted to the left by—and thereby the necessitated encoder look-ahead can be reduced by—one half of the short-transform overlap width. The reduced length of such a modified transition window bears three crucial advantages which facilitate implementation, especially on mobile devices:

The transform kernel, i.e. the length of the coefficient vector resulting from the lapped time/frequency transform (advantageously the MDCT), is exactly half as long as the width of the overlap region between two long transforms. Given the fact that said long-overlap width usually equals the frame length or one half of the frame length, this implies that the inventive transition window and the subsequent short windows fit perfectly into the frame grid and that all transform sizes of the resulting codec are related by an integer power-of-two factor, as seen in FIG. 13.

Both transient locations depicted in FIG. 17 and again in FIG. 13 lie outside the transition transform, so a temporal smearing of the coding error due to the transients can be restricted to within the extension of the first two short windows following the transform. Hence, contrary to the prior-art Fraunhofer/Dolby and Samsung schemes, audible pre-echo noise around the transients is unlikely to occur when using the inventive block switching approach of FIG. 13.

Both encoder and decoder can utilize the exact same windows for the forward and inverse transforms. In a communication device performing both encoding and decoding, only one set of window data thus needs to be stored in ROM. Moreover, special pre- or post-processing of the signal, which would necessitate additional program ROM and/or RAM, can also be avoided.

Traditionally, transition windows with a "double-overlap" segment as in the present invention have not been used in speech or audio or image coding, most likely because they were thought of as violating certain principles which ensure perfect waveform reconstruction in the absence of quantization of the transform coefficients. It is, however, possible to exactly reconstruct the input when using the inventive transition transform, and furthermore, no special decoder-side post-processing as in the France Telecom proposal is necessitated.

As a further note, it is worth emphasizing that the usage of said inventive transition window may be controlled by means of the inventive overlap width determining unit instead of, or in addition to, a transform length determining unit.

Subsequently, embodiments of the present invention are discussed and illustrated in more detail. Furthermore, particular reference is made to the dependent claims in which further embodiments are defined.

Furthermore, the specification specifically illustrates an aspect related to transient-location adaptive overlap switching particularly with respect to FIGS. 1*a* to 7. A further aspect related to the multi-overlap portion is illustrated and described with respect to FIGS. 8*a* to 15*f*. These individual aspects can be implemented independent from each other, i.e., overlap switching can be applied without a multi-overlap region or the multi-overlap region can be applied without transient-location adaptive overlap switching. In an implementation, however, both aspects can be advantageously combined resulting in an encoding/decoding concept having a transient location-adaptive overlap switching and a multi-overlap region. Such a concept can be additionally enhanced by a transform length switching procedure, again dependent on a transient location within a transient look-ahead region of a frame. The transform length switching can be performed dependent on the overlap width determination or independent on the overlap switching.

The present invention is not only useful for audio signals but is also useful for video, picture or, generally image signals. For example in the coding of still images or so called I frames in AVC or less or more advances technologies, the present invention can be applied to avoid blocking artefacts. A transient in the image field would be a sharp edge and a frame would correspond for example to a macroblock. The image is then two-dimensionally encoded using an aliasing introducing transform and a corresponding spatial overlap. This reduces blocking artefacts on the one hand and reduces any other artefacts by transient portions, i.e., portions with sharp edges on the other hand. Hence, the subsequent disclosure equally applies to image signals although not specifically indicated throughout the disclosure

BRIEF DESCRIPTION OF THE DRAWINGS

Embodiments of the present invention will be detailed subsequently referring to the appended drawings, in which:

FIG. 1b illustrates an apparatus for decoding for the aspect of the overlap-switching;

FIGS. 4a to 4g illustrate a selection of transform overlap lengths for a 10 ms transform length such as TCX 10 dependent on a transient location;

FIGS. 5a to 5c illustrate an encoding of an overlap width;

FIG. 6a illustrates a coding of the overlap width and the transform length based on the transient position;

FIG. 6b illustrates a transform length decision table;

FIG. 14a illustrates a window sequence having a switched transform length dependent on the transient location;

FIG. 14b illustrates a further window sequence having a multi-overlap portion;

DETAILED DESCRIPTION OF THE INVENTION

Figure 1A:
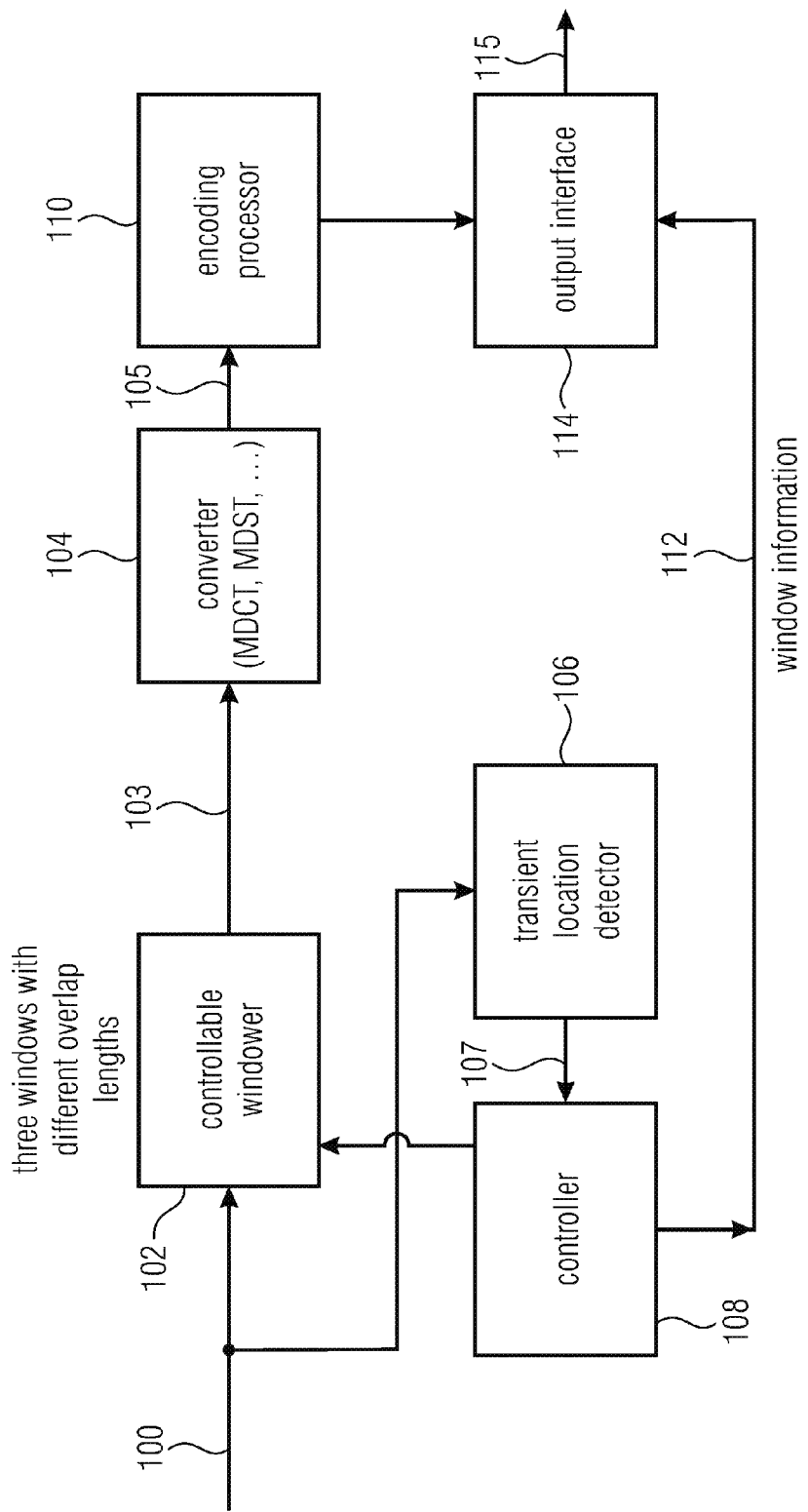
FIG. 1a illustrates an apparatus for encoding in the context of an overlap switching aspect.

FIG. 1a illustrates an apparatus for encoding an audio signal 100. The apparatus for encoding an audio signal comprises a controllable windower 102 for windowing the audio signal 100 to provide a sequence of blocks of windowed samples at 103. The decoder furthermore comprises a converter 104 for converting the sequence of blocks of windowed samples 103 into a spectral representation comprising a sequence of frames of spectral values indicated at 105. Furthermore, a transient location detector 106 is provided. The detector is configured for identifying a location of a transient within a transient look-ahead region of a frame. Furthermore, a controller 108 for controlling the controllable windower is configured for applying a specific window having a specified overlap length to the audio signal 100 in response to an identified location of the transient illustrated at 107. Furthermore, the controller 108 is, in an embodiment, configured to provide window information 112 not only to the controllable windower 102, but also to an output interface 114 which provides, at its output, the encoded audio signal 115. The spectral representation comprising the sequence of frames of spectral values 105 is input in an encoding processor 110, which can perform any kind of encoding operation such as a prediction operation, a temporal noise shaping operation, a quantizing operation with respect to a psycho-acoustic model or at least with respect to psycho-acoustic principles or may comprise a redundancy-reducing encoding operation such as a Huffman encoding operation or an arithmetic encoding operation. The output of the encoding processor 110 is then forwarded to the output interface 114 and the output interface 114 then finally provides the encoded audio signal having associated, to each encoded frame, a certain window information 112.

The controller 108 is configured to select the specific window from a group of at least three windows. The group comprises a first window having a first overlap length, a second window having a second overlap length, and a third window having a third overlap length or no overlap. The first overlap length is greater than the second overlap length and the second overlap length is greater than a zero overlap. The specific window is selected, by the controllable windower 102 based on the transient location such that one of two time-adjacent overlapping windows has first window coefficients at the location of the transient and the other of the two time-adjacent overlapping windows has second window coefficients at the location of the transient and the second window coefficients are at least nine times greater than the first coefficients. This makes sure that the transient is substantially suppressed by the first window having the first (small) coefficients and the transient is quite unaffected by the second window having the second window coefficients. Advantageously, the first window coefficients are equal to 1 within a tolerance of plus/minus 5%, such as between 0.95 and 1.05, and the second window coefficients are advantageously equal to 0 or at least smaller than 0.05. The window coefficients can be negative as well and in this case, the relations and the quantities of the window coefficients are related to the absolute magnitude.

Figure 2A:
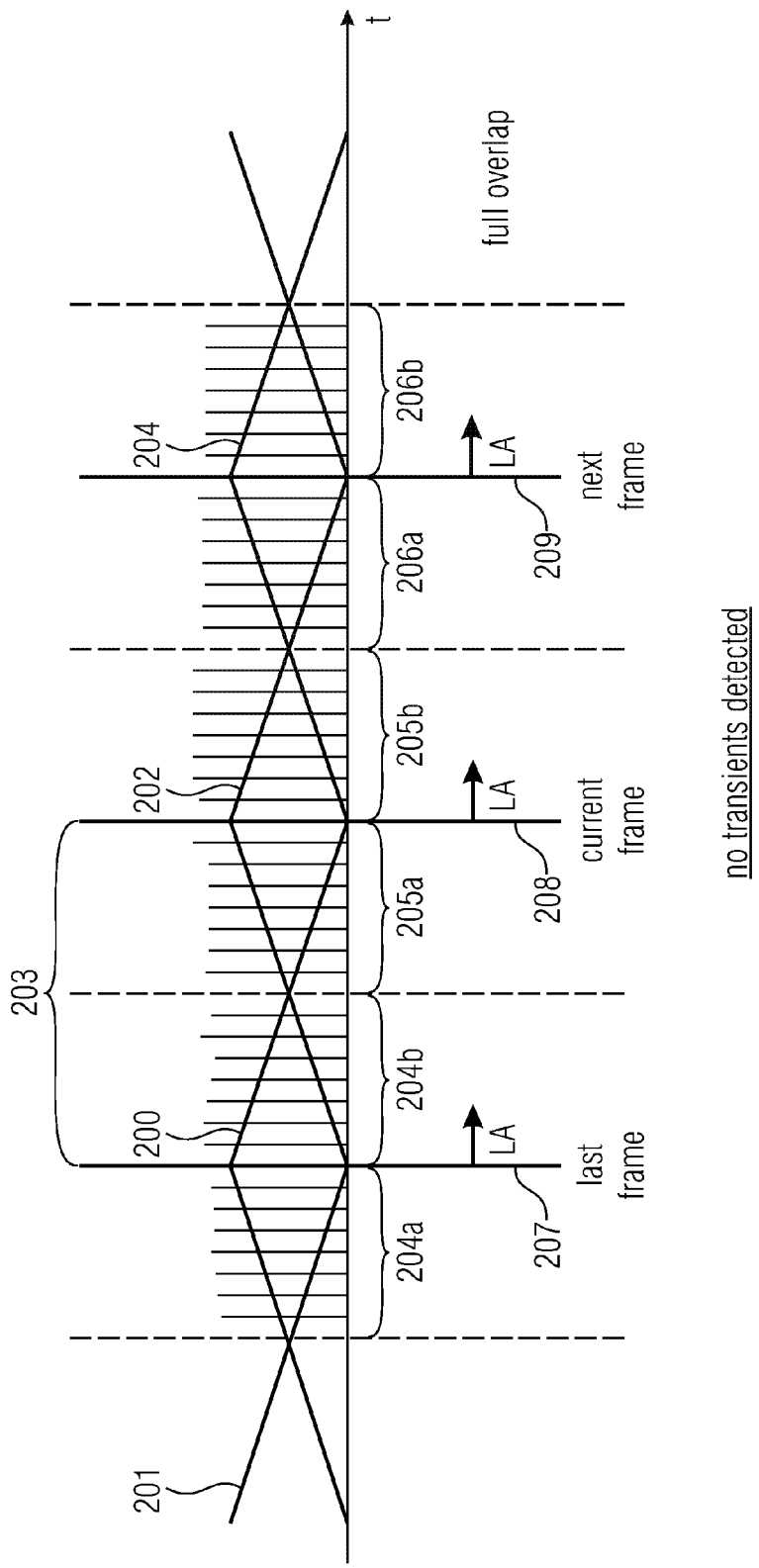
FIG. 2a illustrates a window sequence with full overlap between adjacent windows.

FIG. 2a illustrates a window sequence with first windows only and the first windows have the first overlap length. Particularly, the last frame has associated a first window 200, the current frame has associated window 202 and the third or next frame has associated a window 204. In this embodiment, adjacent windows overlap by 50%, i.e., a full length. Furthermore, the frames are placed with respect to the windows in order to identify which portion of the audio signal is processed by a frame. This is explained referring to the current frame. The current frame has a left portion 205a and a right portion 205b. Correspondingly, the last frame has a right portion 204b and a left portion 204a. Analogously, the next frame has a left portion 206a and a right portion 206b. Left/right refers to earlier in time and later in time as illustrated in FIG. 2a. When the current frame of spectral values is generated, the audio samples obtained by windowing with the window 202 are used. The audio samples stem from portions 204b to 206a.

As known in the art of MDCT processing, generally, processing using an aliasing-introducing transform, this aliasing-introducing transform can be separated into a folding-in step and a subsequent transform step using a certain non-aliasing introducing transform. In the FIG. 2a example, section 204b is folded into section 205a and section 206a is folded into section 205b. The result of the folding operation, i.e., the weighted combination of 205a, 204b on the one hand and 206a and 205b are then transformed into the spectral domain using a transform such as a DCT transform. In the case of an MDCT, a DCT IV transform is applied.

Subsequently, this is exemplified by reference to the MDCT, but other aliasing-introducing transforms can be processed in a similar and analogous manner. As a lapped transform, the MDCT is a bit unusual compared to other Fourier-related transforms in that it has half as many outputs as inputs (instead of the same number). In particular, it is a linear function F: $R^{2N} \rightarrow R^N$ (where R denotes the set of real numbers). The 2N real numbers x0, . . . , x2N−1 are transformed into the N real numbers X0, . . . , XN−1 according to the formula:

$$y_n = \frac{1}{N} \sum_{k=0}^{N-1} X_k \cos\left[\frac{\pi}{N}\left(n + \frac{1}{2} + \frac{N}{2}\right)\left(k + \frac{1}{2}\right)\right]$$

(The normalization coefficient in front of this transform, here unity, is an arbitrary convention and differs between treatments. Only the product of the normalizations of the MDCT and the IMDCT, below, is constrained.)
Inverse Transform The inverse MDCT is known as the IMDCT. Because there are different numbers of inputs and outputs, at first glance it might seem that the MDCT should not be invertible. However, perfect invertibility is achieved by adding the overlapped IMDCTs of time-adjacent overlapping blocks, causing the errors to cancel and the original data to be retrieved; this technique is known as time-domain aliasing cancellation (TDAC).

The IMDCT transforms N real numbers X0, . . . , XN−1 into 2N real numbers y0, . . . , y2N−1 according to the formula:

$$y_n = \frac{1}{N} \sum_{k=0}^{N-1} X_k \cos\left[\frac{\pi}{N}\left(n + \frac{1}{2} + \frac{N}{2}\right)\left(k + \frac{1}{2}\right)\right]$$

(Like for the DCT-IV, an orthogonal transform, the inverse has the same form as the forward transform.)

In the case of a windowed MDCT with the usual window normalization (see below), the normalization coefficient in front of the IMDCT should be multiplied by 2 (i.e., becoming 2/N).

In typical signal-compression applications, the transform properties are further improved by using a window function wn (n=0, . . . , 2N−1) that is multiplied with xn and yn in the MDCT and IMDCT formulas, above, in order to avoid discontinuities at the n=0 and 2N boundaries by making the function go smoothly to zero at those points. (That is, we window the data before the MDCT and after the IMDCT.) In principle, x and y could have different window functions, and the window function could also change from one block to the next (especially for the case where data blocks of different sizes are combined), but for simplicity we consider the common case of identical window functions for equal-sized blocks.

The transform remains invertible (that is, TDAC works), for a symmetric window wn=w2N−1−n, as long as w satisfies the Princen-Bradley condition:

$$w_n^2 + w_{n+N}^2 = 1$$

various window functions are used. A window that produces a form known as a modulated lapped transform [3][4] is given by $$w_n = \sin\left[\frac{\pi}{2N}\left(n + \frac{1}{2}\right)\right]$$

and is used for MP3 and MPEG-2 AAC, and $$w_n = \sin\left(\frac{\pi}{2} \sin^2\left[\frac{\pi}{2N}\left(n + \frac{1}{2}\right)\right]\right)$$

for Vorbis. AC-3 uses a Kaiser-Bessel derived (KBD) window, and MPEG-4 AAC can also use a KBD window.

Note that windows applied to the MDCT are different from windows used for some other types of signal analysis, since they have to fulfill the Princen-Bradley condition. One of the reasons for this difference is that MDCT windows are applied twice, for both the MDCT (analysis) and the IMDCT (synthesis).

As can be seen by inspection of the definitions, for even N the MDCT is essentially equivalent to a DCT-IV, where the input is shifted by N/2 and two N-blocks of data are transformed at once. By examining this equivalence more carefully, important properties like TDAC can be easily derived.

In order to define the precise relationship to the DCT-IV, one has to realize that the DCT-IV corresponds to alternating even/odd boundary conditions: even at its left boundary (around n=−½), odd at its right boundary (around n=N−½), and so on (instead of periodic boundaries as for a DFT). This follows from the identities and. Thus, if its inputs $$\cos\left[\frac{\pi}{N}\left(-n - 1 + \frac{1}{2}\right)\left(k + \frac{1}{2}\right)\right] = \cos\left[\frac{\pi}{N}\left(n + \frac{1}{2}\right)\left(k + \frac{1}{2}\right)\right]$$

and $$\cos\left[\frac{\pi}{N}\left(2N - n - 1 + \frac{1}{2}\right)\left(k + \frac{1}{2}\right)\right] = -\cos\left[\frac{\pi}{N}\left(n + \frac{1}{2}\right)\left(k + \frac{1}{2}\right)\right].$$

Thus, if its inputs are an array x of length N, we can imagine extending this array to (x, −xR, −x, xR, . . . ) and so on, where xR denotes x in reverse order.

Consider an MDCT with 2N inputs and N outputs, where we divide the inputs into four blocks (a, b, c, d) each of size N/2. If we shift these to the right by N/2 (from the +N/2 term in the MDCT definition), then (b, c, d) extend past the end of the N DCT-IV inputs, so we have to "fold" them back according to the boundary conditions described above.

Thus, the MDCT of 2N inputs (a, b, c, d) is exactly equivalent to a DCT-IV of the N inputs: (−cR−d, a−bR), where R denotes reversal as above.

This is exemplified for window function 202 in FIG. 2a. a is the portion 204b, b is the portion 205a, c is the portion 205b and d is the portion 206a.

(In this way, any algorithm to compute the DCT-IV can be trivially applied to the MDCT.) Similarly, the IMDCT formula above is precisely ½ of the DCT-IV (which is its own inverse), where the output is extended (via the boundary conditions) to a length 2N and shifted back to the left by N/2. The inverse DCT-IV would simply give back the inputs (−cR−d, a−bR) from above. When this is extended via the boundary conditions and shifted, one obtains:

IMDCT(MDCT($a,b,c,d$))=($a$−$bR,b$−$aR,c$+$dR,d$+$cR$)/2.

Half of the IMDCT outputs are thus redundant, as b−aR=−(a−bR)R, and likewise for the last two terms. If we group the input into bigger blocks A,B of size N, where A=(a,b) and B=(c,d), we can write this result in a simpler way:

IMDCT(MDCT($A,B$))=($A$−$AR,B$+$BR$)/2

One can now understand how TDAC works. Suppose that one computes the MDCT of the time-adjacent, 50% overlapped, 2N block (B, C). The IMDCT will then yield, analogous to the above: (B−BR,C+CR)/2. When this is added with the previous IMDCT result in the overlapping half, the reversed terms cancel and one obtains simply B, recovering the original data.

The origin of the term "time-domain aliasing cancellation" is now clear. The use of input data that extend beyond the boundaries of the logical DCT-IV causes the data to be aliased in the same way that frequencies beyond the Nyquist frequency are abased to lower frequencies, except that this aliasing occurs in the time domain instead of the frequency domain: we cannot distinguish the contributions of a and of bR to the MDCT of (a, b, c, d), or equivalently, to the result of IMDCT(MDCT(a,b,c,d))=(a−bR,b−aR,c+dR,d+cR)/2. The combinations c−dR and so on, have precisely the right signs for the combinations to cancel when they are added.

For odd N (which are rarely used in practice), N/2 is not an integer so the MDCT is not simply a shift permutation of a DCT-IV. In this case, the additional shift by half a sample means that the MDCT/IMDCT becomes equivalent to the DCT-III/II, and the analysis is analogous to the above.

We have seen above that the MDCT of 2N inputs (a, b, c, d) is equivalent to a DCT-IV of the N inputs (−cR−d, a−bR). The DCT-IV is designed for the case where the function at the right boundary is odd, and therefore the values near the right boundary are close to 0. If the input signal is smooth, this is the case: the rightmost components of a and bR are consecutive in the input sequence (a, b, c, d), and therefore their difference is small. Let us look at the middle of the interval: if we rewrite the above expression as (−cR−d, a−bR)=(−d,a)−(b,c)R, the second term, (b,c)R, gives a smooth transition in the middle. However, in the first term, (−d, a), there is a potential discontinuity where the right end of −d meets the left end of a. This is the reason for using a window function that reduces the components near the boundaries of the input sequence (a, b, c, d) towards 0.

Above, the TDAC property was proved for the ordinary MDCT, showing that adding IMDCTs of time-adjacent blocks in their overlapping half recovers the original data. The derivation of this inverse property for the windowed MDCT is only slightly more complicated.

Consider to overlapping consecutive sets of 2N inputs (A,B) and (B,C), for blocks A,B,C of size N. Recall from above that when (A,B) and (B,C) are MDCTed, IMDCTed, and added in their overlapping half, we obtain (B+$B_R$)/2+(B−$B_R$)/2=B, the original data.

Now we suppose that we multiply both the MDCT inputs and the IMDCT outputs by a window function of length 2N. As above, we assume a symmetric window function, which is therefore of the form (W,$W_R$) where W is a length-N vector and R denotes reversal as before. Then the Princen-Bradley condition can be written as W+$W_R^2$=(1, 1, . . . ), with the squares and additions performed elementwise.

Therefore, instead of MDCTing (A,B), one now MDCTs (WA,$W_R$B) with all multiplications performed elementwise. When this is IMDCTed and multiplied again (elementwise) by the window function, the last-N half becomes:

$W_R(W_R B+(W_R B)_R)=W_R(W_R B+WB_R)=W_R^2 B+WW_R B_R$.

(Note that we no longer have the multiplication by ½, because the IMDCT normalization differs by a factor of 2 in the windowed case.)

Similarly, the windowed MDCT and IMDCT of (B,C) yields, in its first-N half:

$W \cdot (WB-W_R B_R)=W^2 B - WW_R B_R$

When one adds these two halves together, one recovers the original data.

Figure 2B:
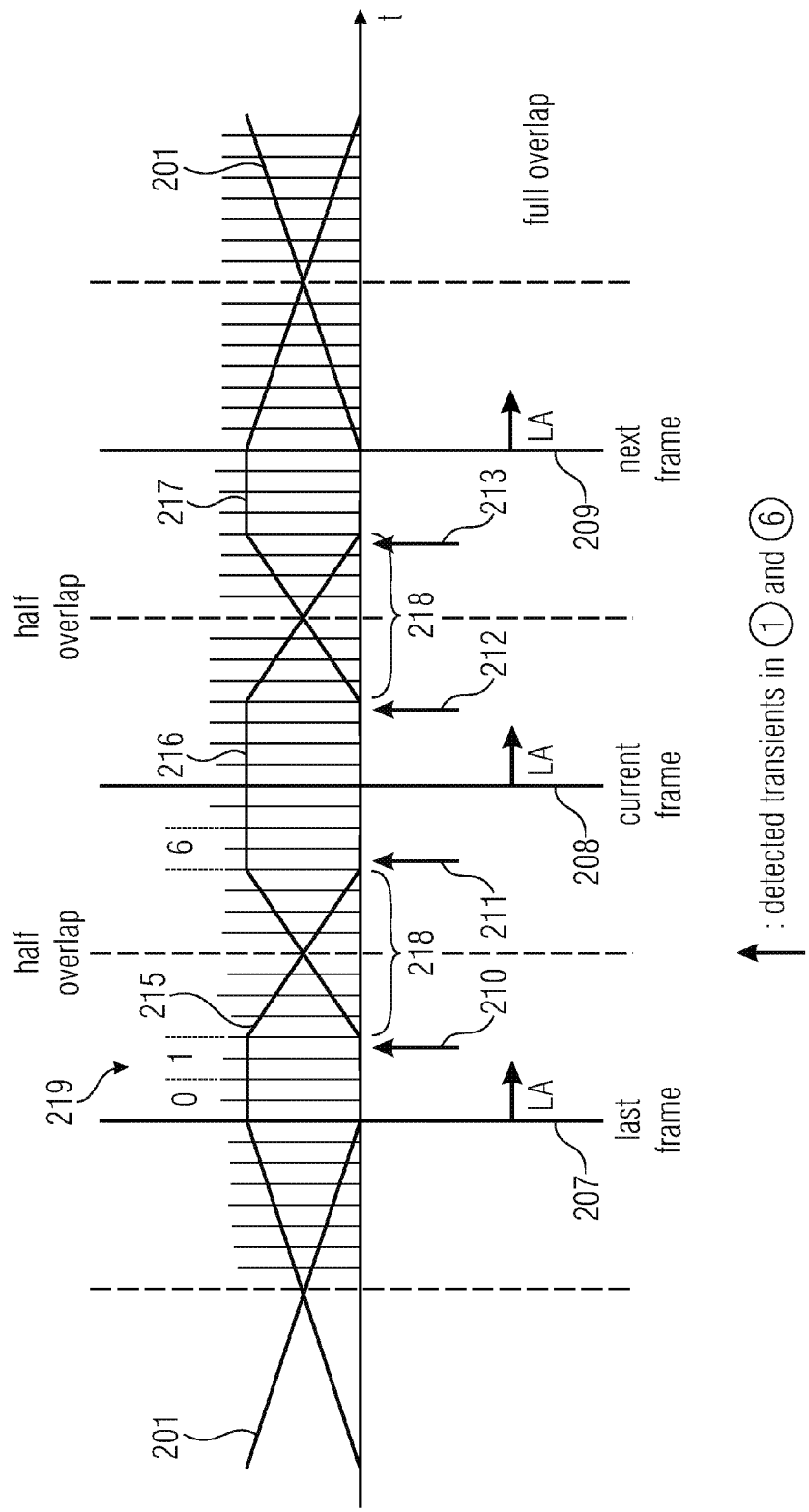
FIG. 2b illustrates a window sequence with half overlap between two adjacent windows.

In a similar procedure, the next frame is calculated by using portions 205b, 206a, 206b and the first portion of the next to next frame in FIG. 2a. Thus, windows 200, 202, 204 correspond to the window function having a first overlap length of the three windows with the different overlap lengths used by the controllable windower 102 of FIG. 1a. As stated, FIG. 2a illustrates a situation, where no transients are detected in the last frame, the current frame and the next frame and, specifically, in the look-ahead region for each frame indicated by item 207 for the last frame, 208 for the current frame and 209 for the next frame. FIG. 2b illustrates a situation, where transients are detected at transient positions 210, 211, 212, 213. Due to the fact that a transient position is, for example, detected at 210, and due to the fact that 210 is in the look-ahead region starting at 207 for the last frame, the controller 108 determines that a switch from the first window 201 to a further window 215 is to be performed. Due to the further transients 211, and, particularly, 212/213 which lie in the next look-ahead region, the current frame additionally is processed using the second window 216 with the second overlap length. Thus, window 215 is a kind of a start window changing from the window with the first overlap length indicated at 201 over to the second window having the second overlap length. As illustrated, the second overlap length only extends over eight slots and, therefore, is only half as long as the first overlap length. Due to the fact that in the look-ahead region starting at 209, no transient is detected anymore, a switch is performed back to the long window 201 by a kind of a "stop window 217". Again, it is noted that the overlap length illustrated at 218 in the current frame on the one hand and between the current frame and the next frame on the other hand, which is indicated at 218 is half as long as the overlap length in FIG. 2a for the first window which is 16 illustrated slots.

Thus, the half-overlap window is used for transients which are detected in detection regions 1 and 6. As illustrated at 219, such a detection region comprises two slots. Thus, the look-ahead range is separated into eight slots. On the other hand, however, a more coarse or more fine subdivision can be performed. However, in embodiments, the look-ahead region is subdivided into at least four slots and advantageously subdivided into eight slots as illustrated in 2b and 2c and other figures.

As illustrated, the second window 216 has the half overlap at both sides, while the window 215 has the half overlap on the right side and has the full overlap on the left side and the window 217 has the half-overlap on the left side and the full overlap on the right side.

Figure 2C:
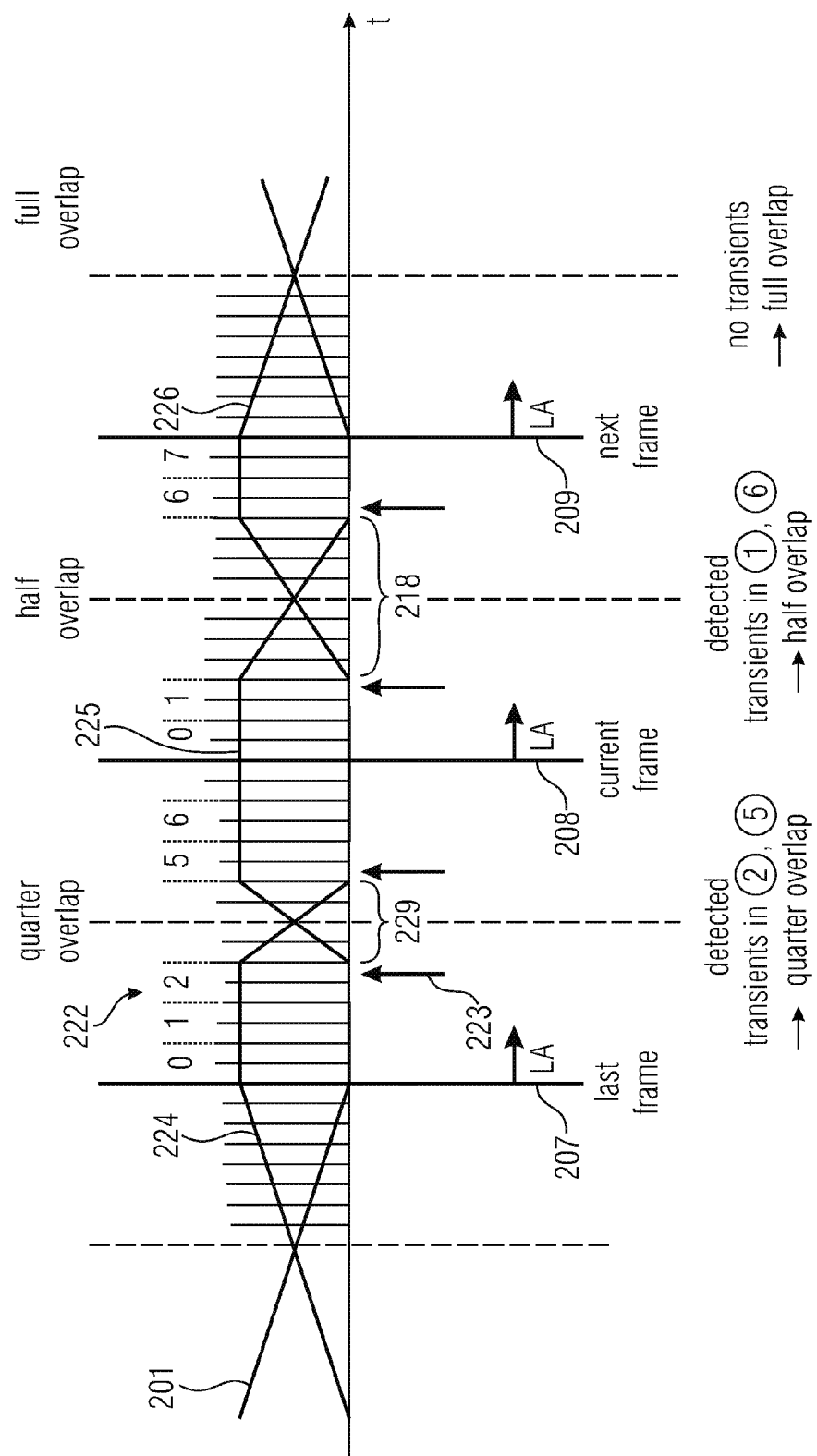
FIG. 2c illustrates a window sequence with a quarter overlap between adjacent windows and a half overlap between adjacent windows and a subsequent full overlap between adjacent windows.

Reference is made to FIG. 2c. FIG. 2c illustrates a situation, where the transient detector detects in the look-ahead region starting in the middle of the last frame that there is a transient in the second transient detection region 222. Thus, a switch to a quarter overlap is performed in order to make sure that the transient 223 is only "smeared" within the window 224, but is not included in the region defined by window 201 or in the region defined by window 225. Furthermore, a sequence is indicated, where a switch from a quarter overlap in the last frame and the current frame to a half overlap between the current frame and the next frame and back to the full overlap between the next frame and the next to next frame is performed. This is due to the detected transients. In the look-ahead region starting at 208, transients are detected in portion one and portion six while transients are detected in portion two and portion five between the last frame 207 and the current frame 208.

Thus, FIG. 2c illustrates a window sequence, where the first window 201 having the full or first overlap length is illustrated, where a second window having the second overlap length indicated at 218 is used, where the second window can, for example, be window 225 or window 226, and where a third window having a third overlap length is illustrated as window 224 or window 225 which has, at its left side, the small overlap length 229. Thus, a window sequence switching from a full overlap to a quarter overlap and then to a half overlap and then to a full overlap is illustrated. Hence, the first window having the first overlap length can be an asymmetric window having a different overlap from the first overlap on one side and having the first overlap length on the other side. Alternatively, however, the first window can also be a window having the first overlap length on both sides as illustrated at 216 in FIG. 2b. Furthermore, the second window having the second overlap length can be a symmetric window having the second overlap length on both sides or can be an asymmetric window having the second overlap length on one side and having, at the other side, the first overlap length or the third overlap length or any other overlap length. Finally, the third window having the third overlap length can be a symmetric window having the third overlap length on both sides or can be a window having the third overlap length on one side and having a different overlap length on the other side.

Subsequently, further embodiments are illustrated with respect to the following figures. Generally, the detection of the transient and its location can be done for example using a method or procedure similar to the transient detector described in U.S. Pat. No. 6,826,525 B2, but any other transient detectors can be used as well.

The transient detection unit identifies the presence and, if applicable, the location of the onset of the strongest transient in the new signal portion of a given frame, i.e., excluding the overlap region between the current and the previous frame. The resolution of the index describing the transient location is, in the following figures, ⅛ of the frame length, so the index range is from 0 to 7. In subsequent figures, the sub-blocks with indices 0, . . . , 7 represent the newest 20 ms of a time domain signal that are used for the coding in the current frame.

Figure 3A:
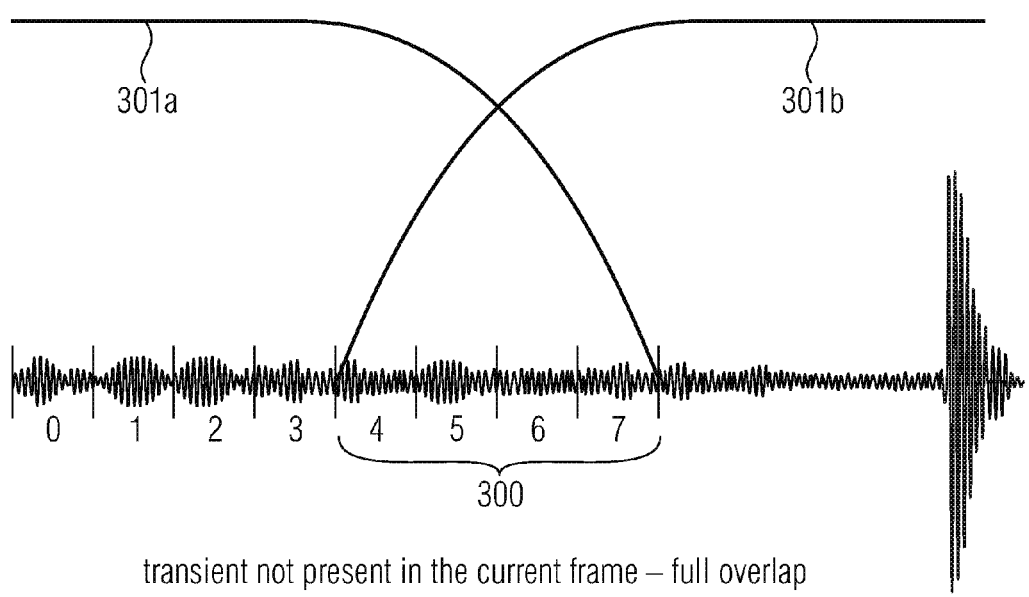
FIGS. 3a to 3c and illustrate different overlap widths for different transient locations for an embodiment with a 20 ms transform length such at TCX 20.
Figure 3B:
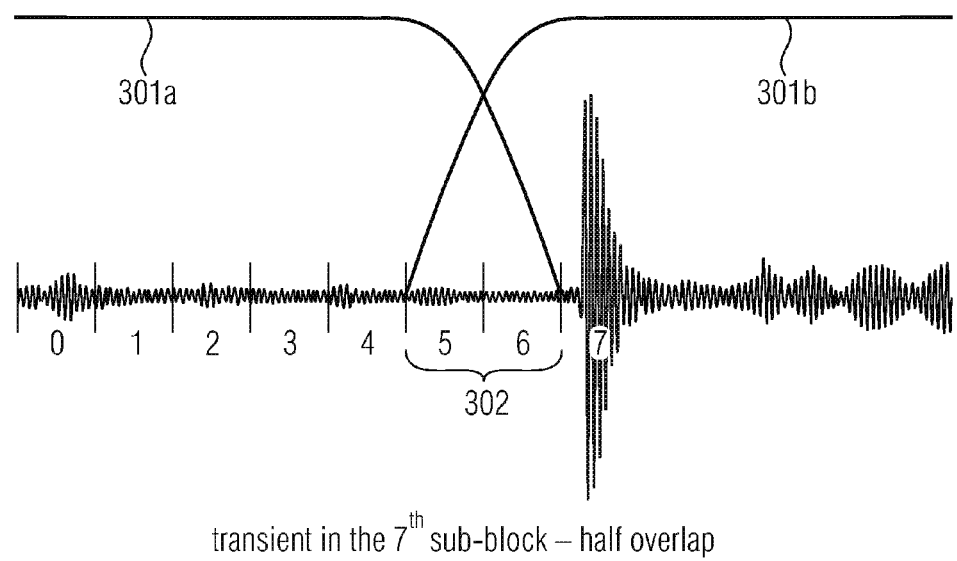
Figure 3C:
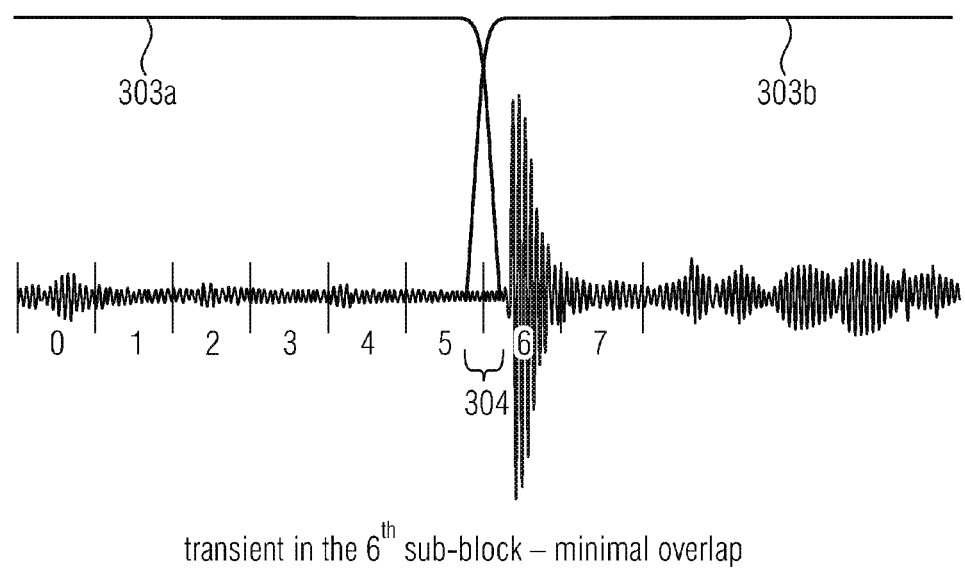

FIGS. 3a-3c illustrate the selection of the transform overlap width for an exemplary ms transform length, i.e., for a TCX20 transform length.

In FIG. 3a, a transient is not present in the current frame. Therefore, a full overlap 300 is detected.

FIG. 3b, to the contrary, illustrates a situation, where a transient is detected in the seventh sub-block so that a half-overlap 302 is selected by the controller 108 of FIG. 1a.

Furthermore, FIG. 3c illustrates the situation, where a transient is detected in the sixth sub-block and, therefore, a minimum overlap 304 is set by the controller. Thus, the transient location detector 106 detects whether there is a transient and if not, the overlap width or first overlap width 300 is selected. When, however, there is a transient in the seventh sub-block as determined by the transient location detector 106 of FIG. 1a, then the second overlap length 302 being half of the first overlap length 300 is set by the controller and when the transient is in the sub-block 6, then a minimum overlap is set. FIG. 3c additionally shows the situation where, instead of the fact that the transient is detected in location 6 or 7, the transform length is nevertheless maintained. Thus, the transform lengths of windows 301a, 301b or 303a or 303b are identical and equal to the first window having the longest overlap length illustrated in FIG. 3a at 301a and 301b. As will be shown later on, it is advantageous to not only control the overlap length, but to additionally control the transform length specifically in situations, where the transient is detected in other sub-blocks. Thus, the overlap width between the current and the following transform window depends on the location of the transient. The overlap between the current and the previous transform window, however, was determined when processing the previous frame.

Subsequently, reference is made to FIGS. 4a to 4g in order to show the selection of the transform overlap length for 10 ms transform length, i.e., TCX10. If, for example, a codec is limited to a 10 ms transform length, the overlap between two TCX10 windows is chosen so that pseudo transients due to time-aliased TNX shaping of the coding error are strongly suppressed. Also, the smearing of the transient to more than five previous and to more than five following sub-blocks is minimized. That is the pre-echo and the post-echo are limited to 12.5 ms. The choice of the overlap is based on the transient position.

FIG. 4a illustrates a situation, where a transient is detected in the zeroth or the first sub-block. Then, "first windows" 401, 402 are chosen, which have the maximum or first overlap length 403. Furthermore, for illustrative purposes, a TCX20 full overlap with the previous and with the next window is illustrated as a reference at 404. Thus, the "full overlap" corresponds to 50% of the window 401, 402 or corresponds 33% of the TCX20 window 301a, 301b, for example. Thus, the overlap length 300 in FIGS. 3a and 403 in FIG. 4a are identical.

FIG. 4b illustrates a situation that a transient is detected in the second sub-block and the controller then controls the window sequence so that a minimum overlap 404 corresponding to the "third overlap length" illustrated at 229 of FIG. 2c is chosen. Thus, windows 406, 407 which are, in this embodiment, asymmetric windows are selected having the short overlap length corresponding to the "second window" in the language of FIGS. 1a and 1b. Furthermore, when the transient in the third sub-block is detected, then the second overlap length 405 is selected. Thus, windows 408, 409 correspond to the third window having the third overlap length 405, but are asymmetric windows.

Figure 4C:
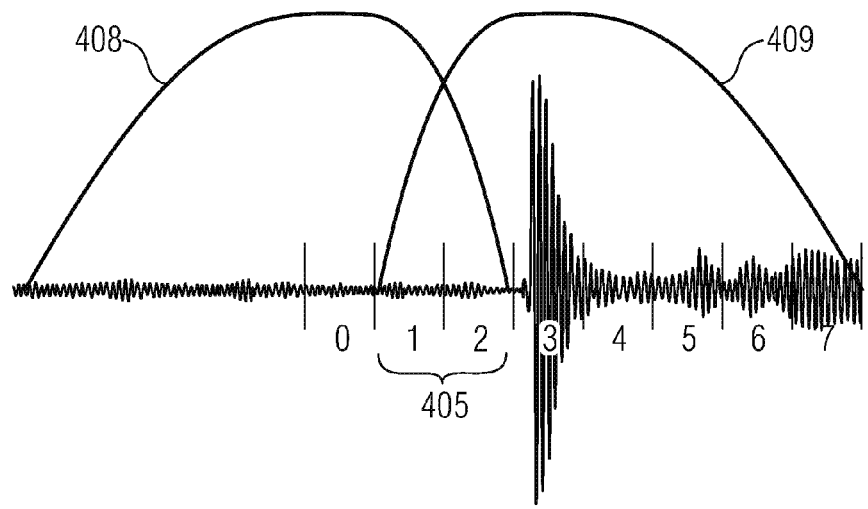
Figure 4D:
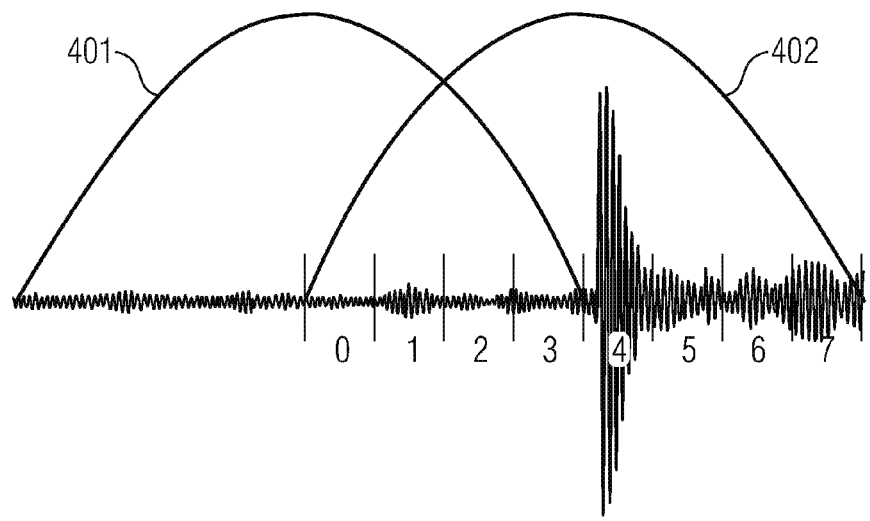
Figure 4E:
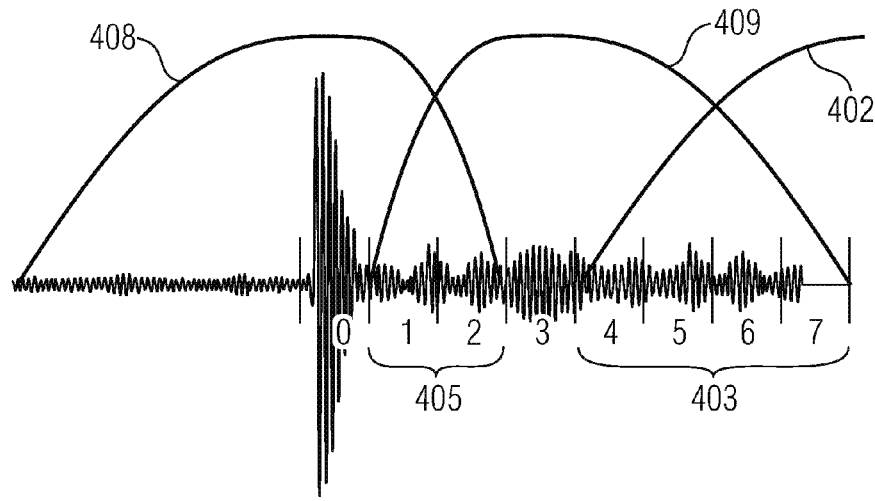
Figure 4F:
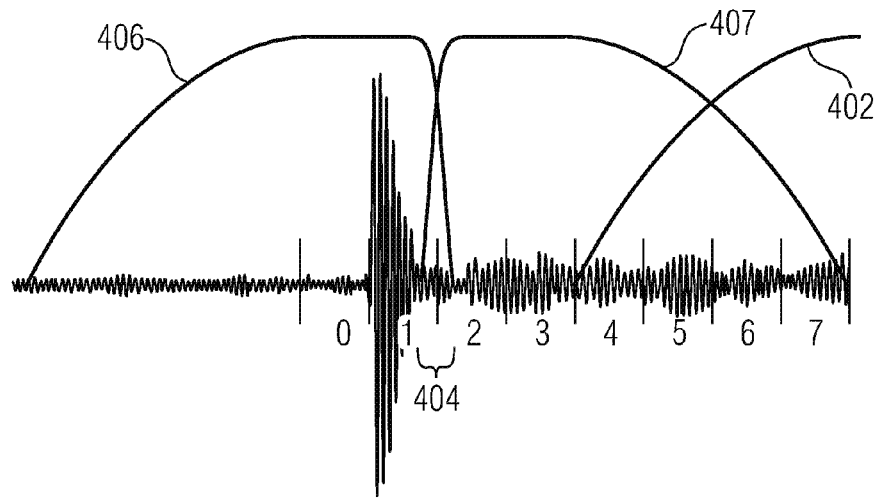
Figure 4G:
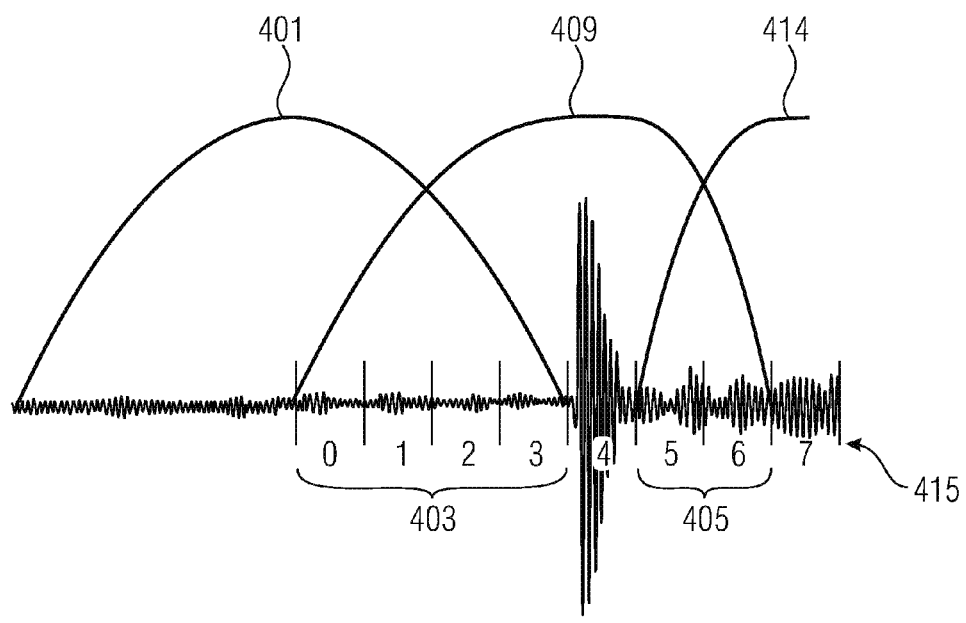

Furthermore, as illustrated in FIG. 4*d*, the full overlap length is determined when the transient is at transient portion 4 and, therefore, the windows selected in this situation are the windows 401, 402 illustrated in FIG. 4*a*. When choosing the overlap so that on the one of the overlapping transforms contains a transient as illustrated, the case wherein the transient is in the second or third sub-block is as illustrated in FIG. 4*f* or 4*g* respectively. The cases, when the transient is in the zero or first sub-block are then treated separately, as well as the cases, when the transient is in the fourth or fifth sub-block. Therefore, reference is made to FIG. 4*e* illustrating the situation, where the transient is in the zero sub-block, a window sequence as illustrated in FIG. 4*e* is obtained, where there is a half-overlap 405 and which is then switched back to the full overlap 403. This is obtained by the window sequence formed by the start window 408, and the stop window 409 and a further normal length window 402.

FIG. 4*f*, on the other hand, illustrates the situation, where the transient is in the first sub-block so that a short or a third overlap length 404 is selected, which is made possible by the start window 406 and the stop window 407 which is then followed by a full overlap window 402. Thus, window 408 or 409 in FIG. 4*e* illustrates the second window having the second overlap length 405 and window 406 and 407 correspond to the third window having the third overlap length 404".

FIG. 4*g* illustrates a situation, where the transient is detected to lie in the fourth sub-block. This situation is reflected by a first window 401 having a full overlap length 403 and a second window 409 having a half-overlap length 405 and a further second window 414 having the second overlap length 405. The right side of the window 414, however, depends on the overlap length determined for the next frame, i.e., in the next look-ahead region starting at the time instant indicated by reference number 415.

Thus, FIGS. 4*a*-4*g* illustrate the situation, where the overlap length is determined so that the transient is located only within one window which is made sure by the fact that, at the location of the transient, for example in sub-block 4, the window coefficients of window 414 are equal to 0 and the window coefficients of window 409 are equal to 1.

Subsequently, reference is made to an embodiment, in which the transform length is derived from the overlap width. FIGS. 5*a*, 5*b*, 5*c* illustrate three different overlap lengths 403, 405, 404, where the full overlap length is determined by two first windows indicated at 501 and 502. Furthermore, the half overlap length is obtained by two second windows having the second overlap length illustrated at 503 and 504, and the third overlap length 404 is obtained by two third windows 505 and 506 having the third overlap length 404. The full overlap is coded advantageously using a "0" bit, the half overlap is coded using a "11" bit combination and the minimal overlap is coded using the "10" bit combination.

Thus, this coding is useful when determining the overlap width and transform length selection when TCX-20 and a combination of TCX-5 and TCX-10 frames can be used.

Unlike coding schemes which derive the instantaneous inter-transform overlaps from the given selection of transform lengths for a pair of frames, that is the overlap width follows the output of the transform length determination, an embodiment of the present invention relates to a coding system which can control or derive the transform length(s) to be used for a particular frame using the overlap width attributed to that frame and optionally the overlap width of a previous frame, i.e. the transform length follows the data of the overlap width determining unit or, with respect to FIG. 1*a*, by the cooperation of the transient location detector 106 and the controller 108. FIG. 6*a* illustrates a coding table and FIG. 6*b* illustrates a corresponding decision table. In FIGS. 5*a*, 5*b* and 5*c*, the full line represents the right half of the window of the last transform in the current frame and the broken line represents the left half of the window of the first transform in the following frame.

FIG. 6*a* illustrates a coding of the overlap and the transform length based on the transient position. In particular, the short/long transform decision is coded using 1 bit as indicated in column 600 and the overlap with the first window of the following frame is coded using the variable length code with 1 or 2 bits as illustrated at column 602. The code for the short/long transform decision 600 on the one hand and the binary code for the overlap width of column 602 are concatenated to obtain the so called overlap code in column 603. Furthermore, the overlap with the first window of the following frame is determined by the controller 108 depending on the transient position index of column 604 as determined by the transient detector 106. In contrast to the earlier illustrations, the transient position index has an increased look-ahead range starting at two earlier slots indicated by −1 and −2 and for this situation, additionally, the full overlap is signaled in this embodiment.

Thus, the full overlap is signaled for "no transient" or a transient position between −2 and 1. Furthermore, a half overlap is signaled by column 605 for transient positions 2 and 3 and 7 and the minimal overlap is signaled for transient positions 4, 5, 6.

Thus, the index "−2" in FIG. 6*a* means that there was a transient in the previous frame at position 6, and "−1" means that there was a transient in the previous frame at position 7. As stated, "none" means that no transient was detected in the transient look-ahead region.

As outlined, the short/long transform decision and the overlap width are jointly coded using the overlap code. The overlap code consists of 1 bit for a short/long transform decision and of the binary code for the overlap width coded with 1 or 2 bits. The code is a variable length code where it is automatically detected where a codeword starts and the earlier codeword stops. The codes for the short/long transform decision and for the overlap width are defined in FIG. 6*a*. For example, when the short/long transform decision gives 1 and the minimal overlap is selected, i.e. a binary code is equal to 10, the overlap code is 110.

Furthermore, FIG. 6*a* illustrates the situation that a short transform decision is taken for all transient positions between −2 and 5 and a long transform is chosen for no transient or the transient at position 6 or 7. Thus, FIG. 6*a* illustrates the situation where the transient location detector can detect a certain transient at a certain position, and where independent form each other or in parallel, the short/long transform decision and the overlap with the first window of the following frame can be determined, i.e. the full overlap code 603 can be derived. It is emphasized that those skilled in the art will understand that any other codes for encoding different short/long transforms and different overlaps can be used. Furthermore, more than two, i.e. three or even more transform lengths can be determined and signaled and, at the same time, more than three overlaps such as four or five different overlap lengths can be determined and encoded as well. All this determined is, for example, in response to a transient location detector operating on at least four different divisions per frame or, as in the embodiment, operating on eight divisions per frame or, for a finer decision, operating in even more divisions, such as sixteen divisions of a frame.

Based on the overlap code for the current frame and for the previous frame, a decision is made for a combination of the transform length to use, as illustrated in FIG. 6b. Thus, FIG. 6b illustrates the decision of a transform length based on the previous overlap code and the current overlap code. For example, if the previous overlap code and the current overlap code both are "00", then a window such as 401 is used. If the previous overlap code was 10 and the current overlap code is 00, then the same window is selected. However, if the previous code is 111, meaning a half overlap code, and the current overlap code is 00, then the window 409 of FIG. 4c, for example, is selected. For a previous overlap code of 110 and the current overlap code 00, again a long transform is selected, but with a window similar to window 407, and the same situation is for a previous overlap code of 010 and the current overlap code of 00, i.e., window 407 of FIG. 4f is selected. Finally, for a previous overlap code 011, and for the current overlap code 00, a window such as 409 in FIG. 4e is selected.

Figure 7:
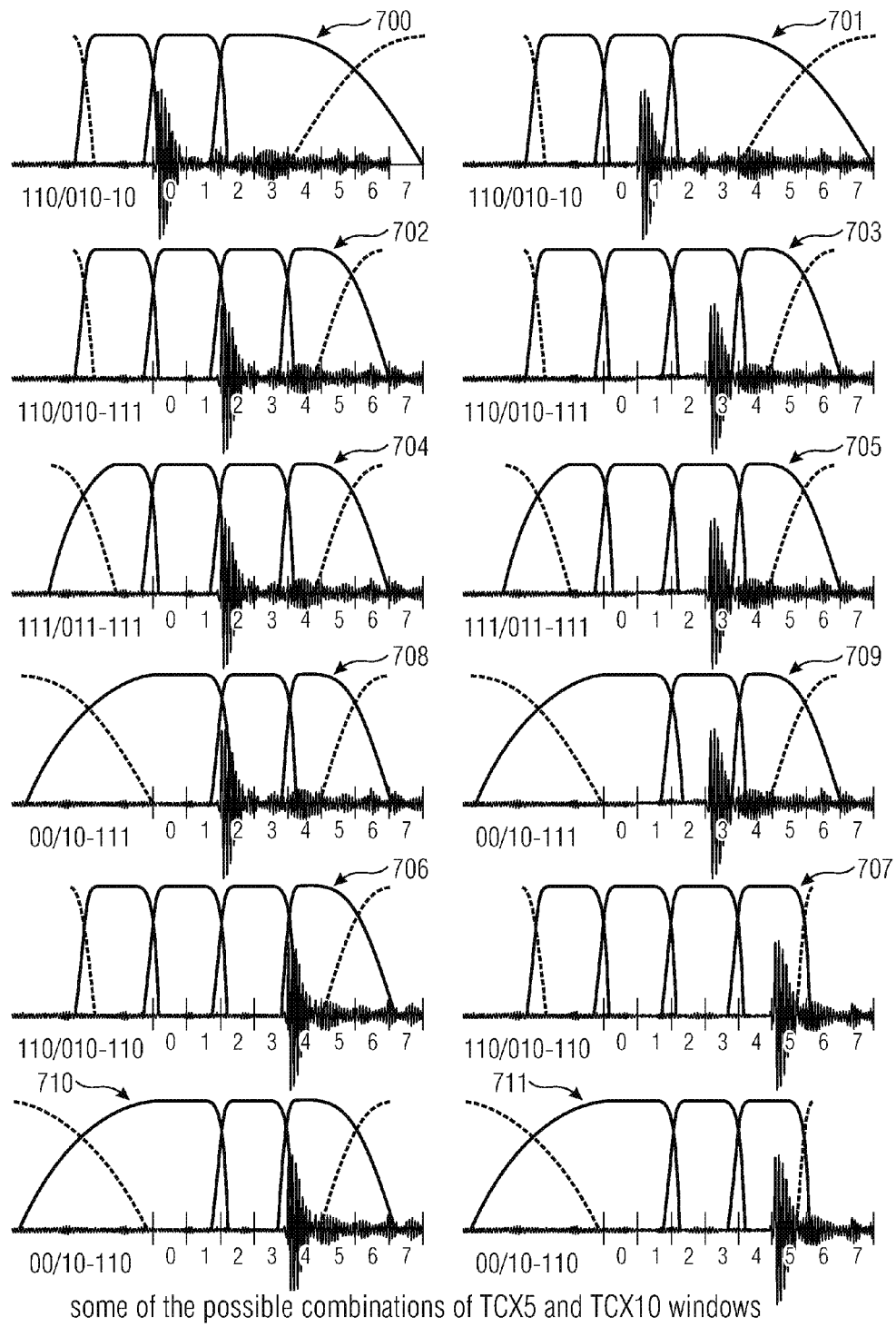
FIG. 7 illustrates different window sequences dependent on the previous and current overlap codes.

Other windows are selected for other combinations and this is specifically illustrated with respect to FIG. 7. Thus, FIG. 7 illustrates some of the transform length combinations together with the transient position in the current frame and with the overlap codes for the current and for the previous frames. 110/010-111 in FIG. 7 means that the previous overlap code is 110 or 010 and the current overlap code is 111. FIG. 7 therefore illustrates different combinations. For example, the upper left picture in FIG. 7 illustrates a minimum overlap at the beginning of a sequence of two TCX-5 transforms and a following TCX-10 transform having the full overlap. Contrary thereto, the picture below this picture illustrates a minimum overlap followed by four TCX-5 windows, where the fourth window of the TCX-5 windows has a half overlap and so on. Thus, reference numbers 700, 701 illustrate a sequence of two TCX-5 or two short windows followed by a medium window. Similarly, reference numbers 702, 703, 704, 705, 706, 707 illustrate a situation with four short transform lengths or "TCX-5" transforms while reference numbers 708, 709, 710, 711 illustrate the situation where there is, at the first time, i.e. at the beginning of the sequence, a medium transform length window such as a TXC 10 window followed by two TCX-5 or short transform length windows. The sequences 700 to 711 in FIG. 7 can be introduced by other such sequences or by TCX-20 or long transform length windows having different overlaps such as short overlaps at 700, 702 for example, a medium overlap at 704 or long overlaps at 708 or 710, for example. At the same time, the sequence can be followed by further such sequences or can be followed by TCX-20, i.e. long transform windows, but with a different overlap length. Thus, the sequence 700, for example, ends with a long overlap and the sequence 702, for example, ends with a medium overlap or the sequence 706, for example, ends with a small overlap length.

As illustrated in FIG. 1a, the window information, i.e. the overlap code 603 of FIG. 6a illustrated at 112 in FIG. 1a may be associated to each encoded frame by an output interface 114.

Furthermore, the transform applied in the converter 104 may be an MDCT or an MDST or a different aliasing introducing transform which is characterized by the fact that the number of spectral values in a block of spectral values is lower than the number of windowed samples in a block of windowed samples input into the transform or, with respect to the decoder side, in which the number of time domain output samples is greater than the number of spectral values input into such an aliasing reducing back or inverse transform.

As illustrated in all of FIGS. 2 to 7, a constant frame raster is maintained. Thus, the controller 108 makes sure that even though a switch over to shorter transform lengths is performed as, for example, illustrated in FIG. 7, the same constant frame raster is maintained. This is made sure by using only such specific windows which result in similar transform length for each class of windows in the context of the correct overlap size. Thus, each TCX-5 transform length is defined to have such an overlap region and a constant region between the two overlap regions that the transform results N/4 spectral values, where N is the number of spectral values within a frame. The form and size and specifically the overlap lengths of the TCX 20 transform windows are additionally designed in such a way that this window results in N spectral samples subsequent to the transform.

Figure 1C:
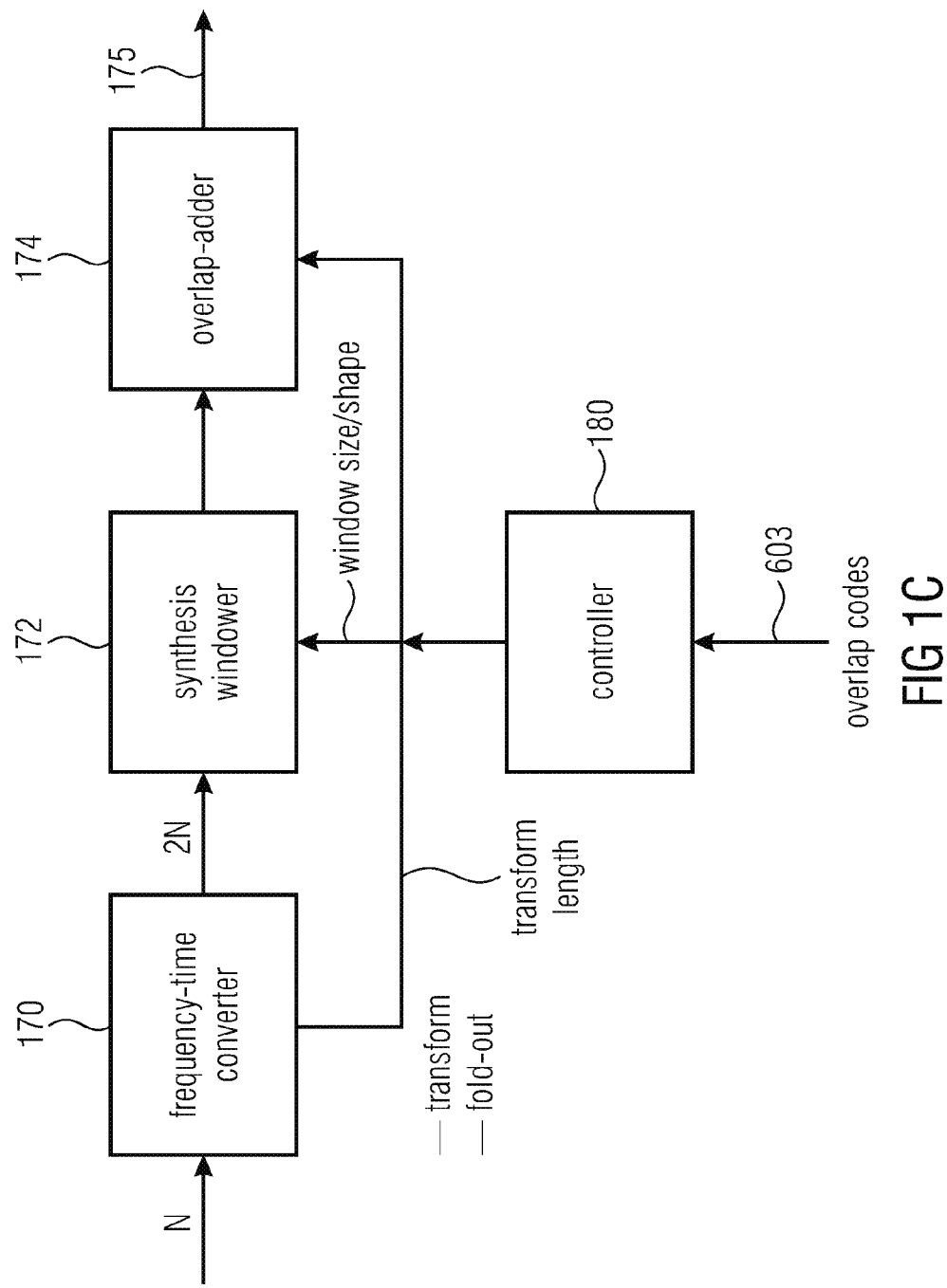
FIG. 1c illustrates a decoder-side implementation of the controllable converter.

FIG. 1c illustrates a decoder-side implementation of the controllable converter 158. In particular, the controllable converter 158 comprises a frequency-time converter 170, a subsequently connected synthesis windower 172 and a final overlap-adder 174. Specifically, the frequency-time converter performs the transform such as a DCT-IV transform and a subsequent fold-out operation so that the output of the frequency-time converter 170 has, for a first or long window, 2N samples while the input into the frequency-time converter was, exemplarily, N spectral values. On the other hand, when the input into the frequency-time converter are N/8 spectral values, then the output is N/4 time domain values for an MDCT operation, exemplarily.

Then, the output of the frequency-time converter 170 is input into a synthesis windower which applies the synthesis window which is advantageously exactly the same as the encoder-side window. Thus, each sample is, before an overlap-add is performed, windowed by two windows so that the resulting "total windowing" is a square of the corresponding window coefficients so that the Princen-Bradley condition as discussed before is fulfilled.

Finally, the overlap-adder 174 performs the corresponding correct overlap-add in order to finally obtain the decoded audio signal at output 175. In particular, the frequency-time converter 170, the synthesis windower 172 and the overlap-adder 174 are controllable and are controlled, for example, by the overlap code 603 discussed in the context of FIG. 6a or by any other information referring to the situation discussed in the context of FIG. 6b. However, the corresponding transform length for the frequency-time converter is determined, based on the previous overlap code and the current overlap code using the transform length decision table. Furthermore, the window size/shape is also determined based on the previous overlap code and a current overlap code and the same is true for the overlap-adder so that the overlap-adder applies the maximum overlap, the medium overlap or the minimum overlap as signalled.

Thus, it is advantageous that controller 180 in the decoder in FIG. 1c receives the overlap codes, i.e., the previous overlap code 606 and the current overlap code 607 and determines, from this information, the overlap and window for the block of spectral values.

Thus, each window and the corresponding transform size associated with the window are determined. In the embodiments where an MDCT is used as a transform and an inverse MDCT is used for the inverse transform, the window size is two times the transform length or the transform length is half of the window size.

Figure 1D:
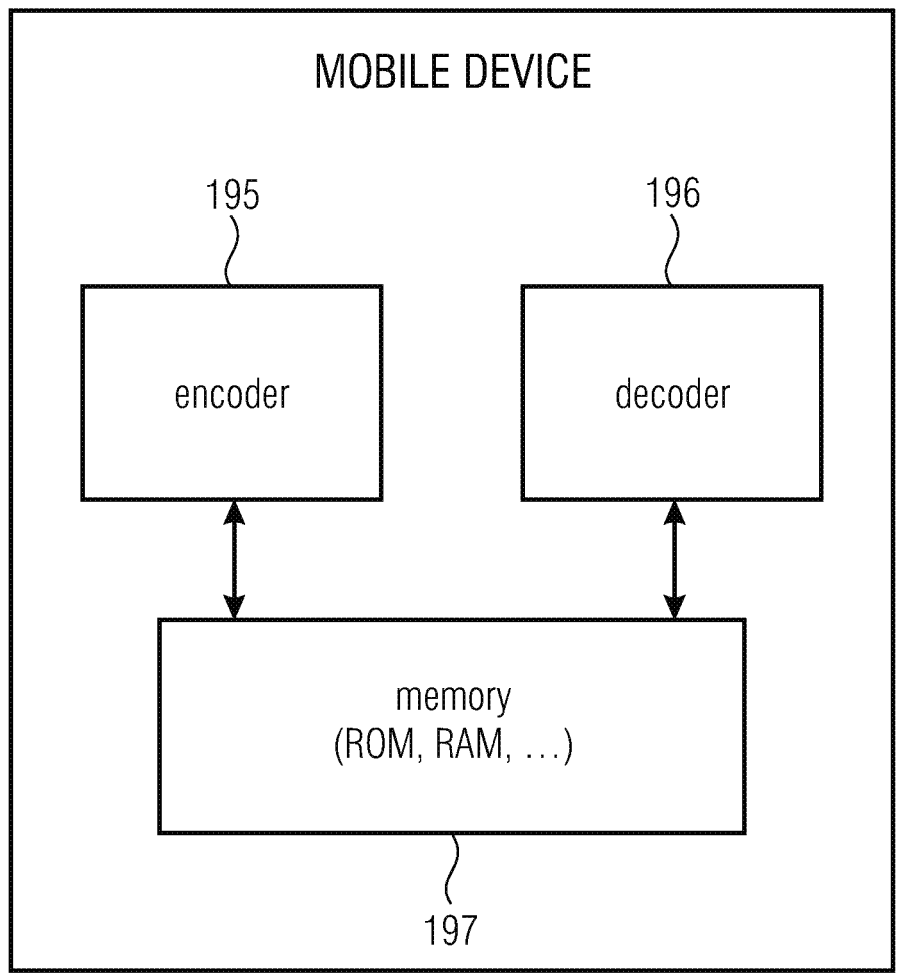
FIG. 1d illustrates a further embodiment of the present invention implemented with a mobile device.

FIG. 1d illustrates a further embodiment of the present invention implemented with a mobile device, where the mobile device comprises, on the one hand, an encoder 195 and on the other hand a decoder 196. Furthermore, in accordance with an embodiment of the present invention, both the encoder 105 and the decoder 106 retrieve the same window information from only a single memory 197, since the windows used in the encoder 195 and the windows used in the decoder 196 are identical to each other. Thus, the decoder has a read-only memory 197 or a random access memory or generally any memory 197 in which only a single set of window sequences or windows is stored for usage both in the encoder and in the decoder. This is advantageous due to the fact that the different window coefficients for the different windows do not have to be stored two times, with one set for the encoder and one set for the decoder. Instead, due to the fact that in accordance with the present invention identical windows and window sequences are used in the encoder and the decoder, only a single set of window coefficients has to be stored. Hence, the memory usage of the inventive mobile device illustrated in FIG. 1d is substantially reduced with respect to a different concept in which the encoder and the decoder have different windows or in which certain post-processing with processing other than windowing operations is performed.

Subsequently, reference is made to a further embodiment with respect to the transform/transform length switching embodiment.

The transform and overlap length-adaptive coding scheme outlined above was implemented in the transform coded excitation (TCX) path of the LD-USAC encoder, a low-delay variant of xHE-AAC [5] with a frame length of 20 ms, and tested at 48 kbit/s mono. At this configuration point, LD-USAC operates in TCX-only mode with a core-frame length of 512 samples and a long-transform overlap of 256 samples, i.e. 33%, during (pseudo-)stationary input conditions. The encoder includes a transient detection unit, whose output is input to a transform length determining unit and to the inventive overlap width determining unit. Three transform lengths are available for coding: a TCX-20 length with 512 MDCT coefficients, a TCX-10 length with 256 MDCT coefficients, and a special TCX-5 length with 128 MDCT coefficients. Accordingly, one of three overlap widths can be used and transmitted per frame: maximum overlap of 256 core-samples (10 ms), half overlap of 128 core-samples (5 ms), and minimum overlap of 16 samples (0.6 ms). For each frame the transform lengths have to be selected such that the sum of the lengths of all transforms in that frame equals the core-frame length, i.e. 512 samples.

In an embodiment of the inventive coding system, the encoder operates as follows:
1. The transient detection unit identifies the presence and, if applicable, the location of the onset of the strongest transient in the new signal portion of a given frame (i.e. excluding the overlap region between the current and previous frame). The resolution of the index describing the transient location is ⅛ of the frame length, so the index range is 0, . . . , 7.
2. If no transient has been detected, or if the transient location index is 6 or 7, the affected frame is coded using the TCX-20 transform by decision of the transform length determining unit. Otherwise, a combination of TCX-10 and/or TCX-5 transforms is used: either 2×TCX-10 or 4×TCX-5 or TCX-10 followed by 2×TCX-5 or 2×TCX-5 followed by TCX-10.
3. The overlap width determining unit now controls the overlap shapes of the transforms used within the current frame (excluding the already chosen overlap with the last frame) according to the objectives enumerated above, such that the longest possible overlaps which do not violate said objectives are selected. In particular, if a frame is TCX-20 and the transient location index is 6 or 7, the overlap unit returns minimum or half overlap, respectively. If no signal nonstationarity is present in a frame, maximum overlap is used.
4. Furthermore, if a TCX-10/-5 combination was returned by the transform length determining unit for the (non-stationary) frame, the overlap width determining unit controls the exact composition of transform lengths in that frame. Particularly, if maximum overlap is used in the preceding as well as the current frame, 2×TCX-5 followed by a TCX-10 are applied in the current frame, with the first of the TCX-5 transforms being the inventive transition transform with double overlap. If either the last frame's or the current frame's overlap width is less than maximum, one of the mixed TCX-10/-5 configurations is also used. If both last and current frame have less than maximum overlap, 4×TCX-5 is used.
5. The encoder now proceeds to the windowing of the signal and the actual MDCTs for the frame. Special care has to be taken regarding the order of the windowing operations in the presence of the inventive double-overlap transition window in order to attain perfect reconstruction after decoding. The remainder of the encoding process is similar to that of xHE-AAC. TNS is optionally applied to the individual transforms, and grouping of two TCX-5 MDCT coefficient sets into one TCX-10-like set of (interleaved) coefficients may be performed to save side information. For each frame, one overlap width value as well as one 1-bit flag indicating TCX-20 or non-TCX-20 coding is transmitted to the decoder.

Like the encoder, the appropriate decoder according to the embodiment features an overlap width determining unit interpreting the transmitted overlap width values to control the length and windowing of the inverse MDCTs so that encoder and decoder are fully synchronized with regard to the transforms used. As in the encoder, the order of the windowing and folding operations after the individual MDCTs is critical to obtain perfect signal reconstruction.

Subsequently, a further embodiment of the invention is discussed and illustrated in the context of FIGS. 8 to 15f. This aspect, which is also named the "multi-overlap aspect" can be combined with the overlap width and transform length switching embodiment discussed with respect to FIGS. 1 to 7 or can be implemented separately from this aspect.

Figure 8A:
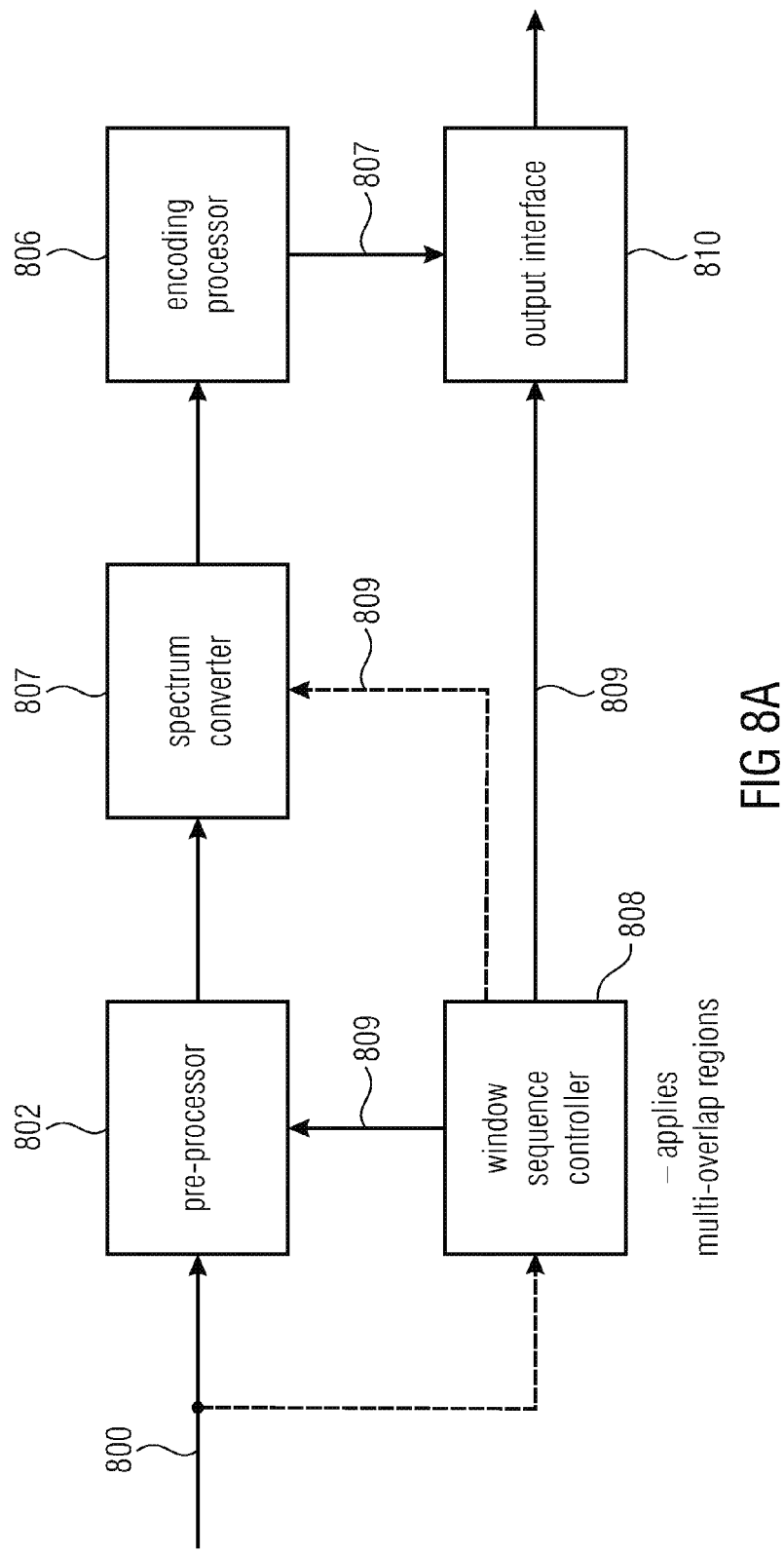
FIG. 8a illustrates an encoder in the context of a multi-overlap portion in an embodiment of the present invention.
Figure 8B:
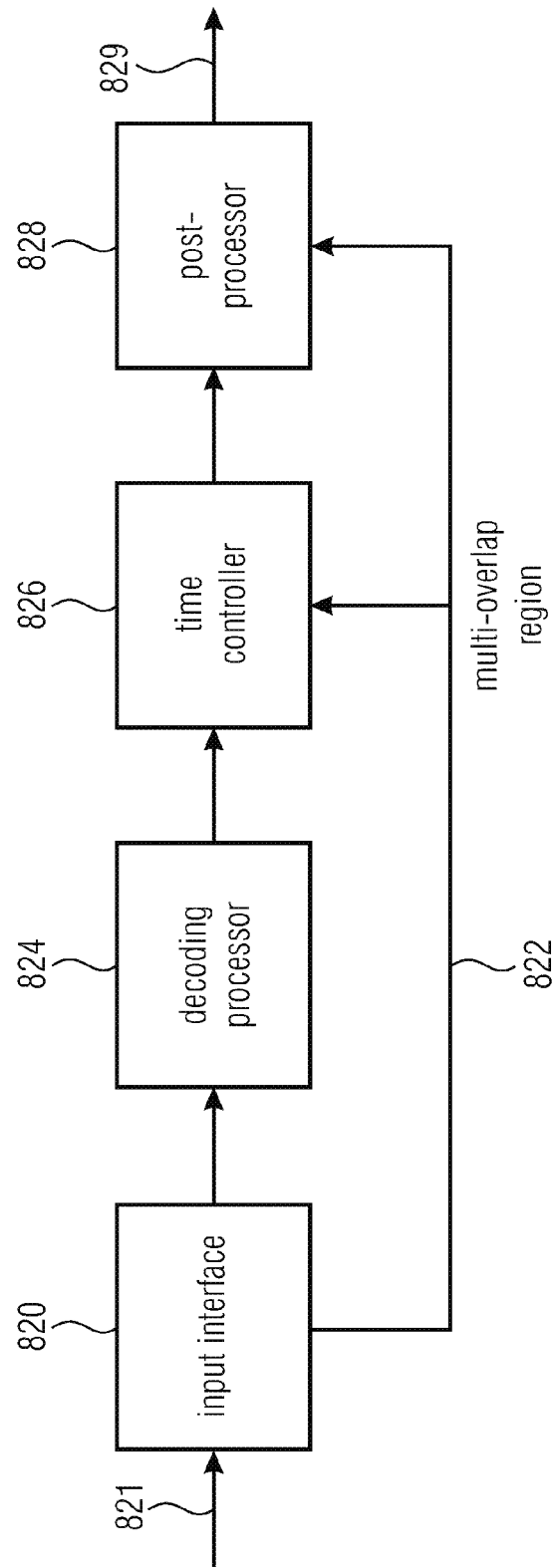
FIG. 8b illustrates a decoder for the aspect of the multi-overlap portion in an embodiment of the present invention.

An encoder-side of the invention is illustrated in FIG. 8a and a decoder-side is illustrated in FIG. 8b. In particular, the apparatus for generating an encoded signal or the encoder illustrated in FIG. 8a comprises a window sequence controller for generating a window sequence information 809 forwarded, for example, to a pre-processor 802, a spectrum converter 804 or an output interface 810 as illustrated in FIG. 8a. The window sequence information indicates a first window function for generating a first frame of spectral values, a second window function and one or more third window functions for generating a second frame of spectral values. The first window function, the second window function and the one or more third window functions overlap within a multi-overlap region.

Figure 15A:
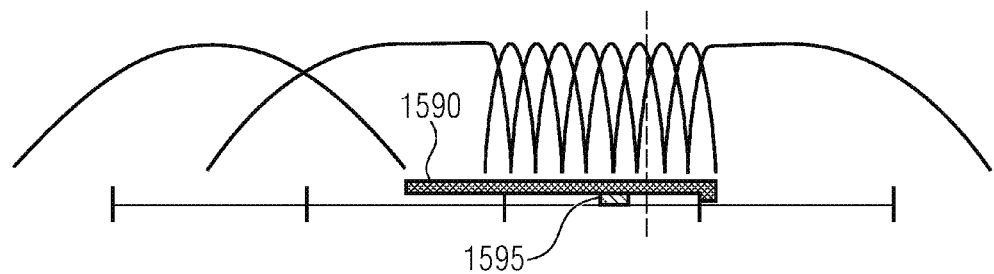
FIGS. 15a to 15f illustrate different window sequences and corresponding look-ahead portions and pre-echoes.
Figure 15B:
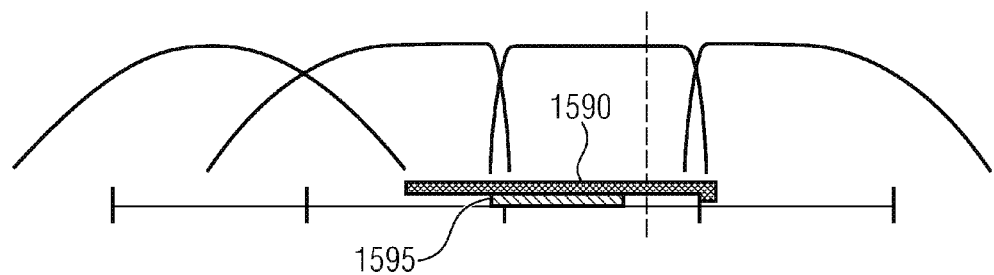
Figure 15C:
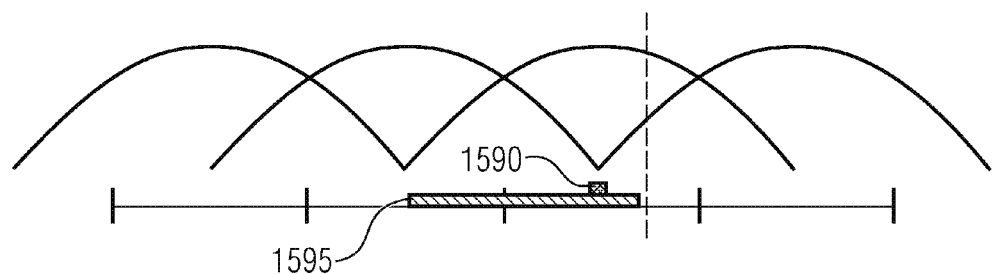
Figure 15D:
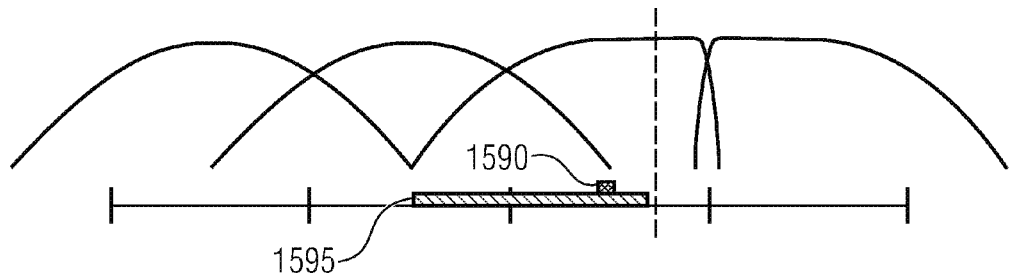
Figure 15E:
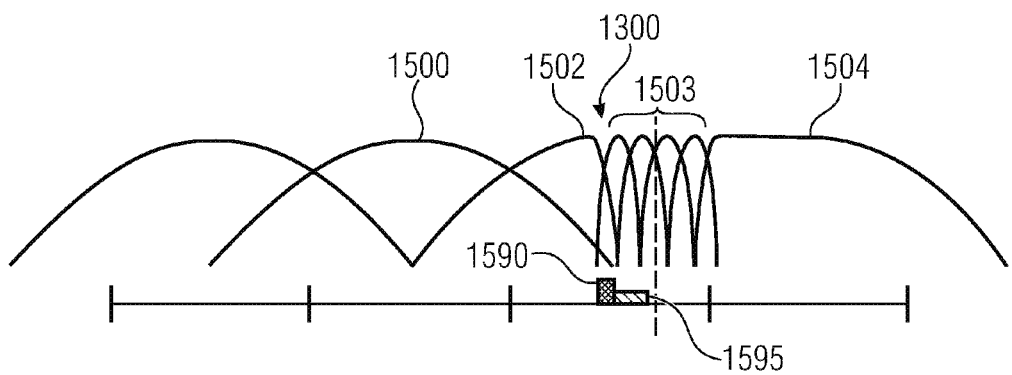
Figure 15F:
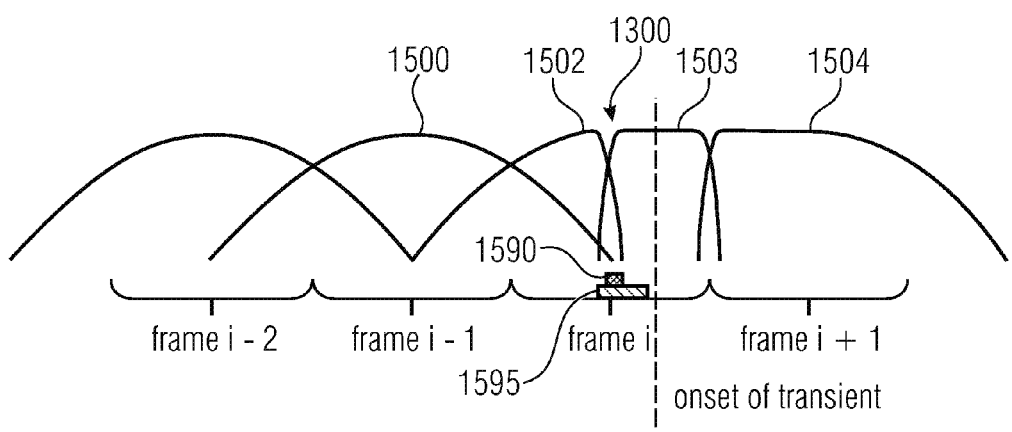
Figure 16:
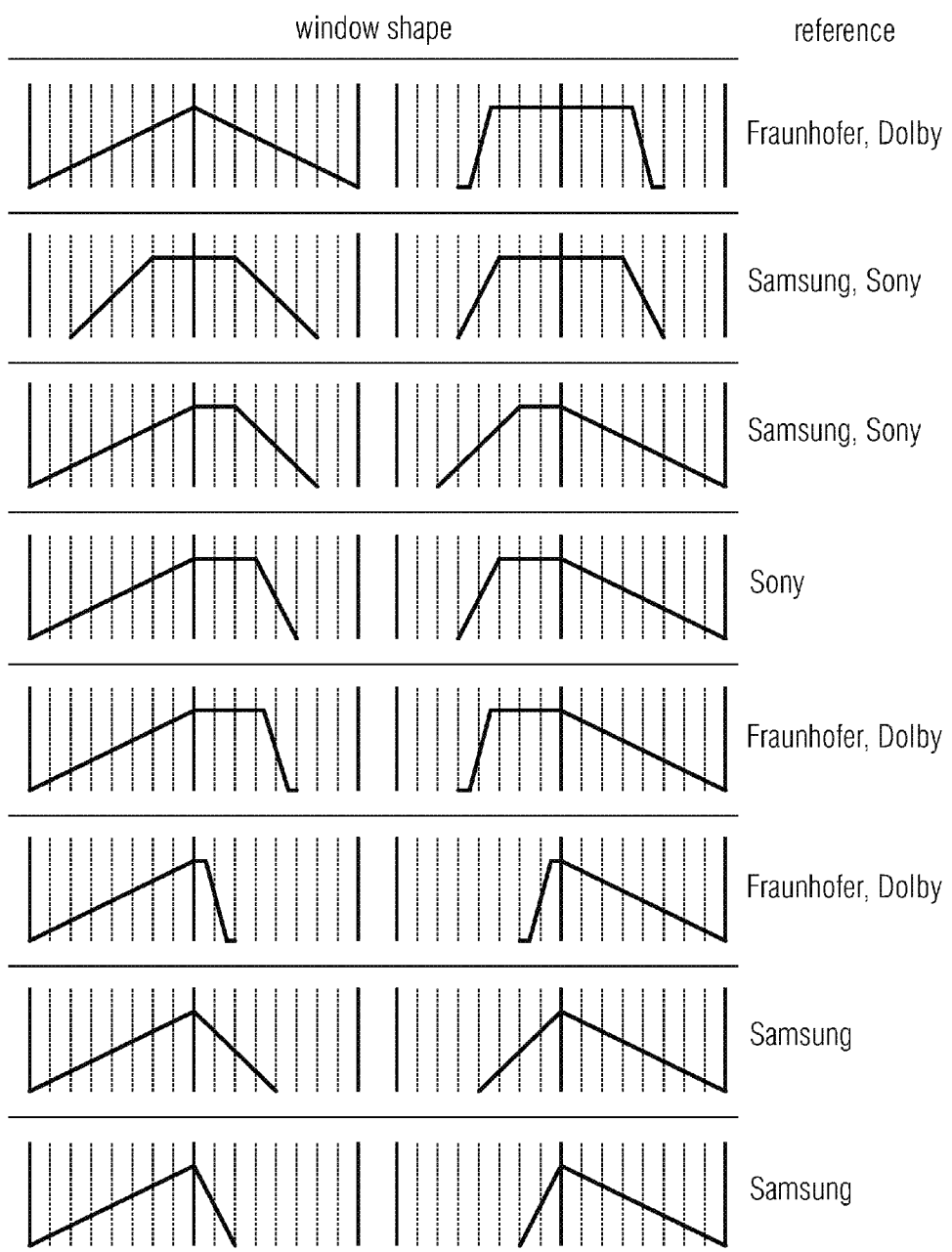
FIG. 16 illustrates conventional window shapes.
Figure 17:
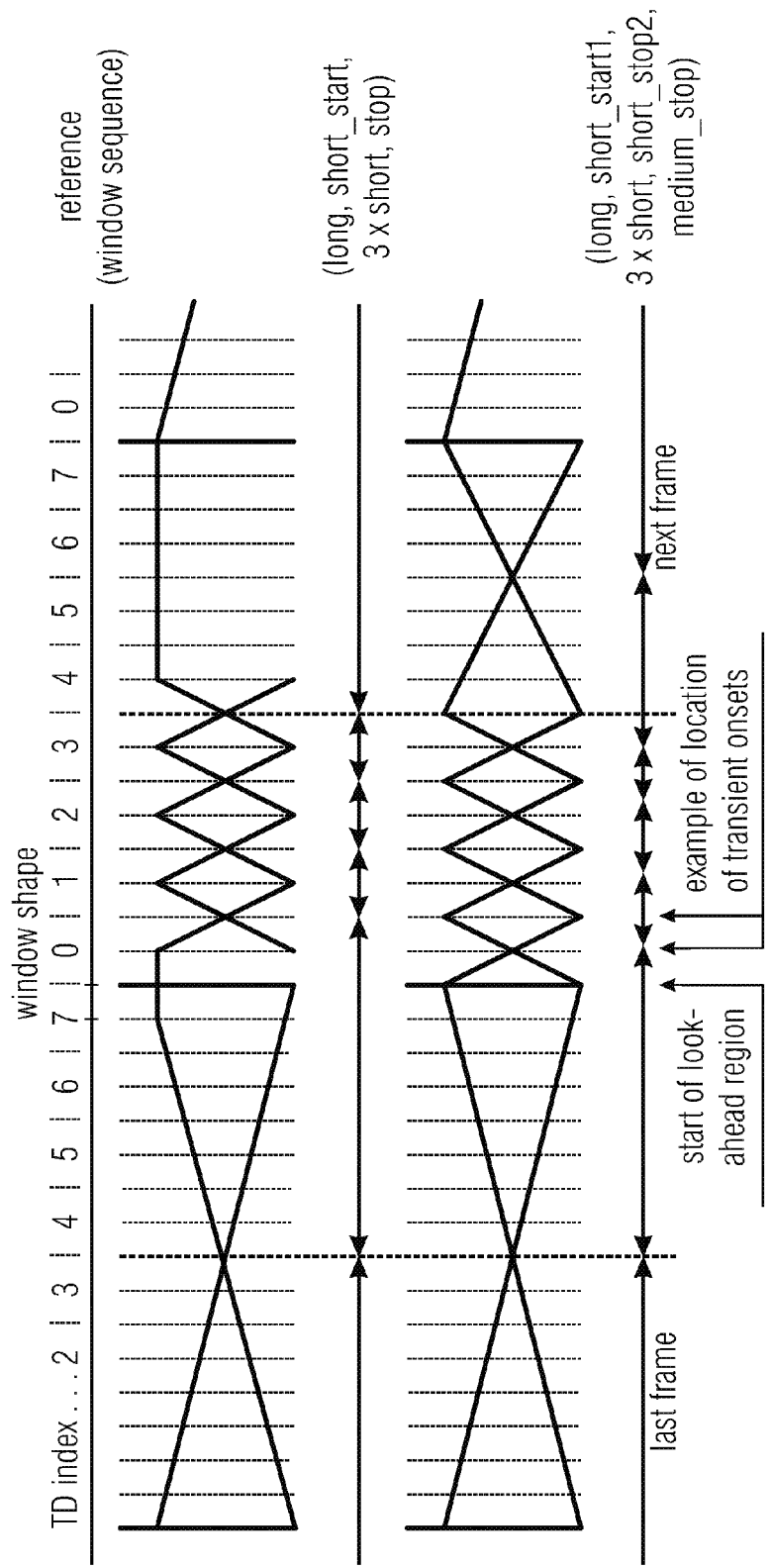
FIG. 17 illustrates conventional window sequences formed by window shapes of FIG. 16.

This multi-overlap region is, for example, illustrated at 1300 in FIG. 13 or FIG. 14*b* or FIG. 15*e* or FIG. 15*f*. Thus, in this multi-overlap region 1300, at least three window functions, i.e. the first window function with respect to FIG. 15*f* illustrated at 1500, the second window function 1502 and the third window function 1503, overlap each other within the multi-overlap region 1300. There can also be a higher overlap, such as an overlap of four, five or even more windows. Alternatively, FIG. 15*e* illustrates the situation where one again has the first window function 1500, the second window function 1502 but now four third window functions 1503 in contrast to a single third window function 1503 of FIG. 15*f*.

In order to correctly handle this multi-overlap region which results in a significant reduction of the delay necessitated for the transient look-ahead region, a pre-processor 102 is provided. The pre-processor is configured for windowing a second block of samples corresponding to the second window and the one or more third window functions using an auxiliary window function to obtain a second block of windowed samples. Furthermore, the pre-processor is configured for pre-processing the second block of window samples using a folding-in operation of a portion of the second block overlapping with the first block into the multi-overlap portion to obtain a pre-processed second block of windowed samples having a modified multi-overlap portion. Furthermore, a spectrum converter 804 is configured for applying an aliasing-introducing transform to the first block of samples using the first window to obtain the first frame of spectral values. Furthermore, the spectrum converter is configured for applying an aliasing introducing transform to a first portion of the pre-processed second block of windowed samples using the second window function to obtain a first portion of spectral samples of a second frame and for applying the aliasing introducing transform to a second portion of the pre-processed second block of windowed samples using the one or more third window functions to obtain a second portion of spectral samples of the second frame. Furthermore, a processor 806 indicated as "encoding processor" is provided within the encoder of FIG. 8*a* for processing the first frame and the second frame of spectral values to obtain encoded frames of the audio signal at the output 807 of block 806. Thus, the encoding processor can be identical or different from the encoding processor 110 of FIG. 1*a* and can perform any of the well-known MPEG or AMR r any other encoding features in the art.

Subsequently, reference is made to FIG. 13. FIG. 13 once again illustrates the second half of the first window function 1500, the second window function 1502 and, in the second picture of FIG. 13, two third window functions 1503. Contrary thereto, the upper illustration in FIG. 13 illustrates again a first window function 1500, a second window function 1502 and, in contrast to for example FIG. 15*f* and slightly similar to FIG. 15*e*, four third window functions 1503. Alternatively, the number of third window functions can also be three, five or so.

Figure 13:
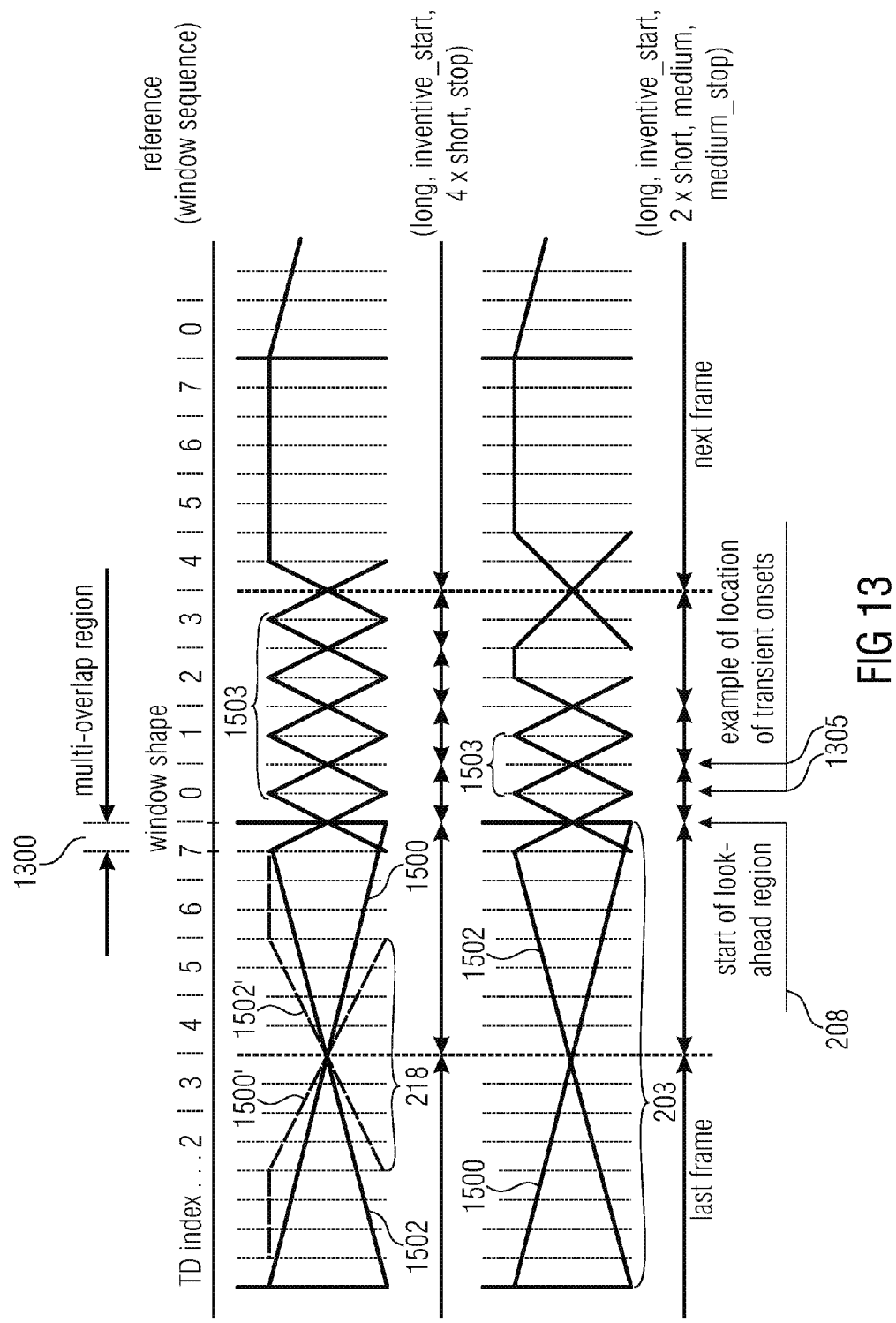
FIG. 13 illustrates different window sequences both having a multi-overlap portion.

Furthermore, FIG. 13 additionally illustrates a situation with a different first window function 1500', a different second window function 1502' and the same third window function 1503. The difference between 1500 and 1500' is that the overlap length of the functions 1500' and 1502' is half with respect to windows 1500, 1502. Thus, the situation of window functions 1500' and 1502' is that the overlap length is a half overlap illustrated at 218, for example in FIG. 2*d*, while the full overlap length corresponds to a complete frame as, for example, illustrated at 203 in FIG. 2*a* or FIG. 13. Hence, the window functions 1500' and 1502' illustrated in this figure represent a combination of the multi-overlap aspect and the overlap width determination aspect.

Figure 9A:
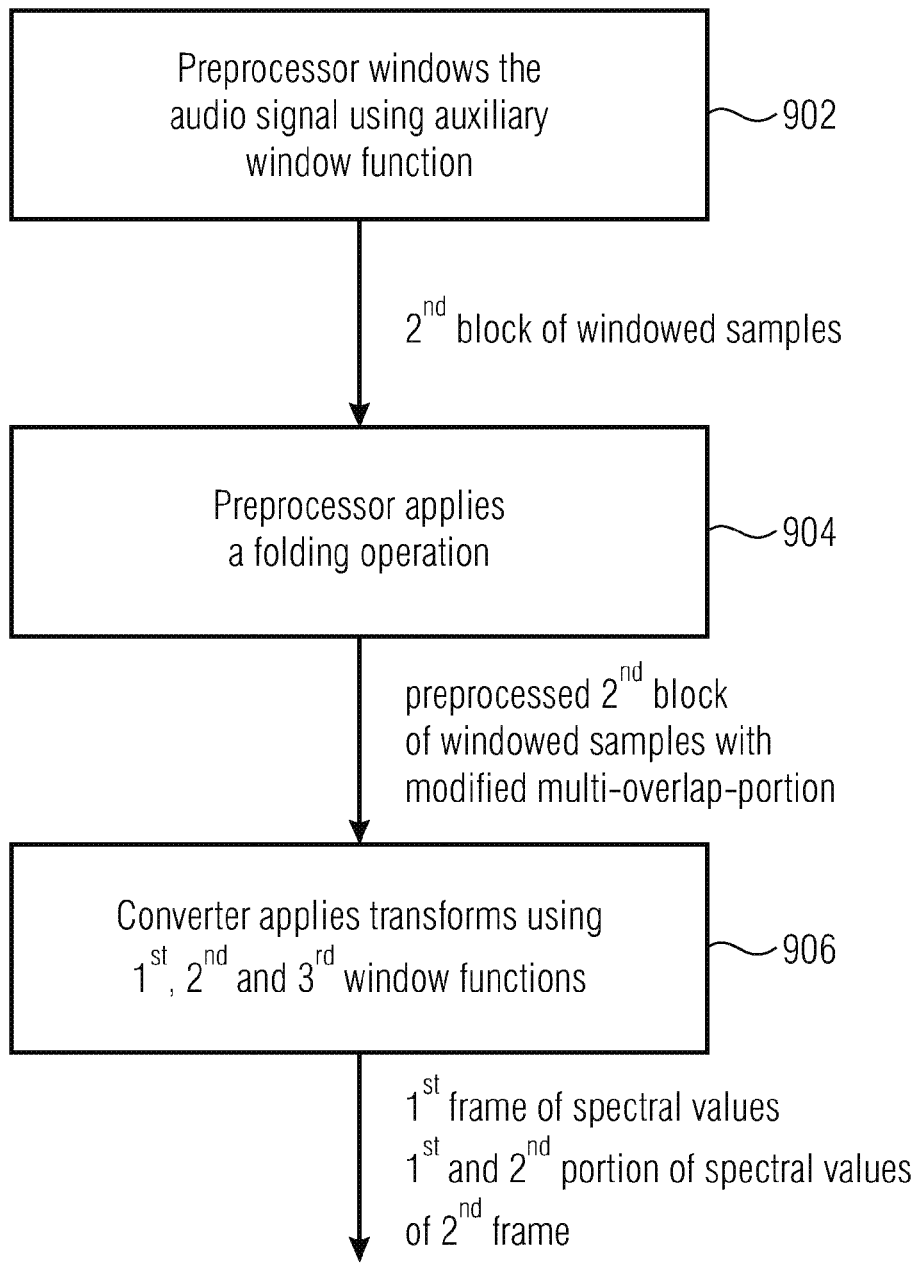
FIG. 9a illustrates a procedure in accordance with an embodiment illustrating the encoder-side.
Figure 9B:
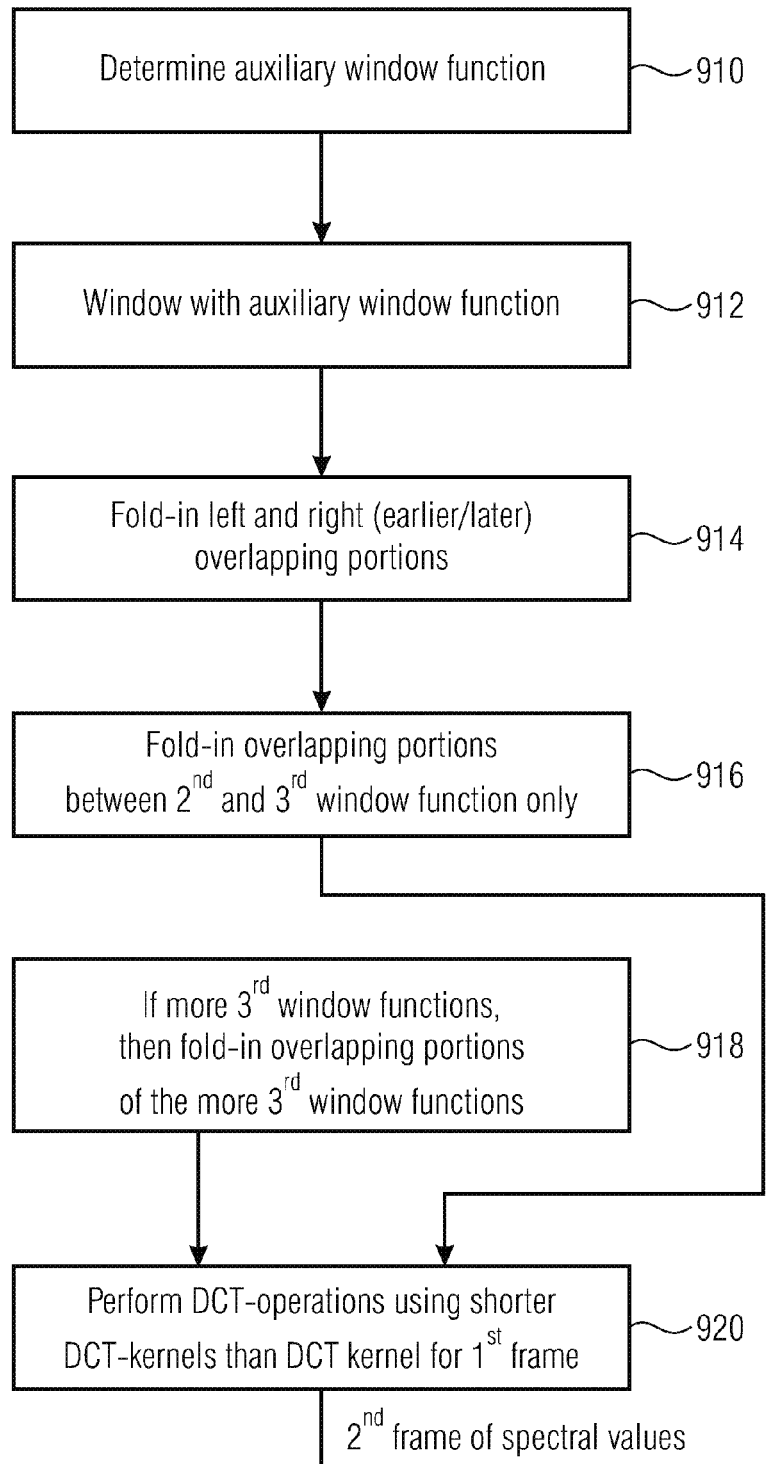
FIG. 9b illustrates a flow chart of a procedure performed on the encoder-side.
Figure 10A:
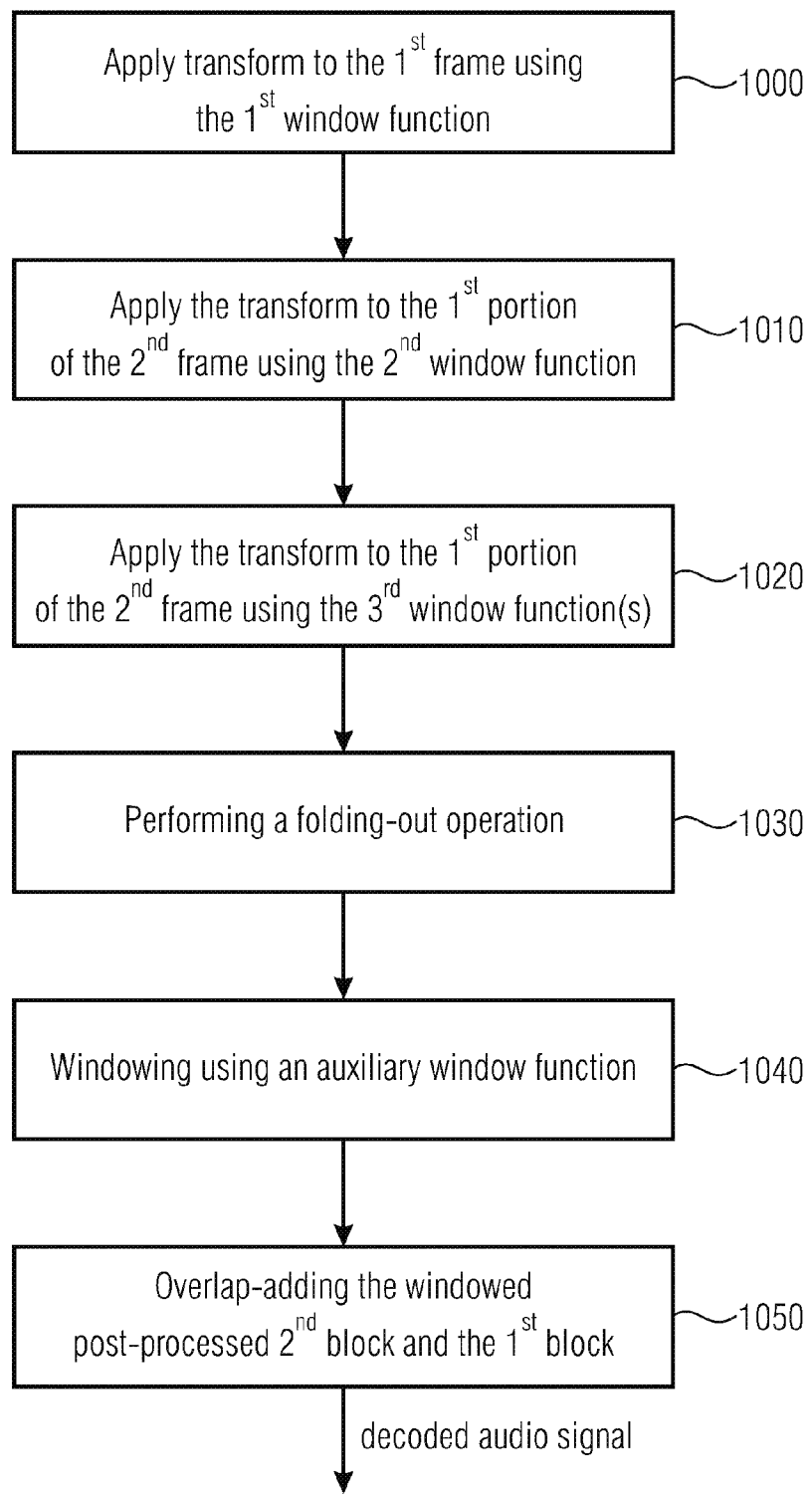
FIG. 10a illustrates an embodiment of a procedure on the decoder-side.
Figure 10B:
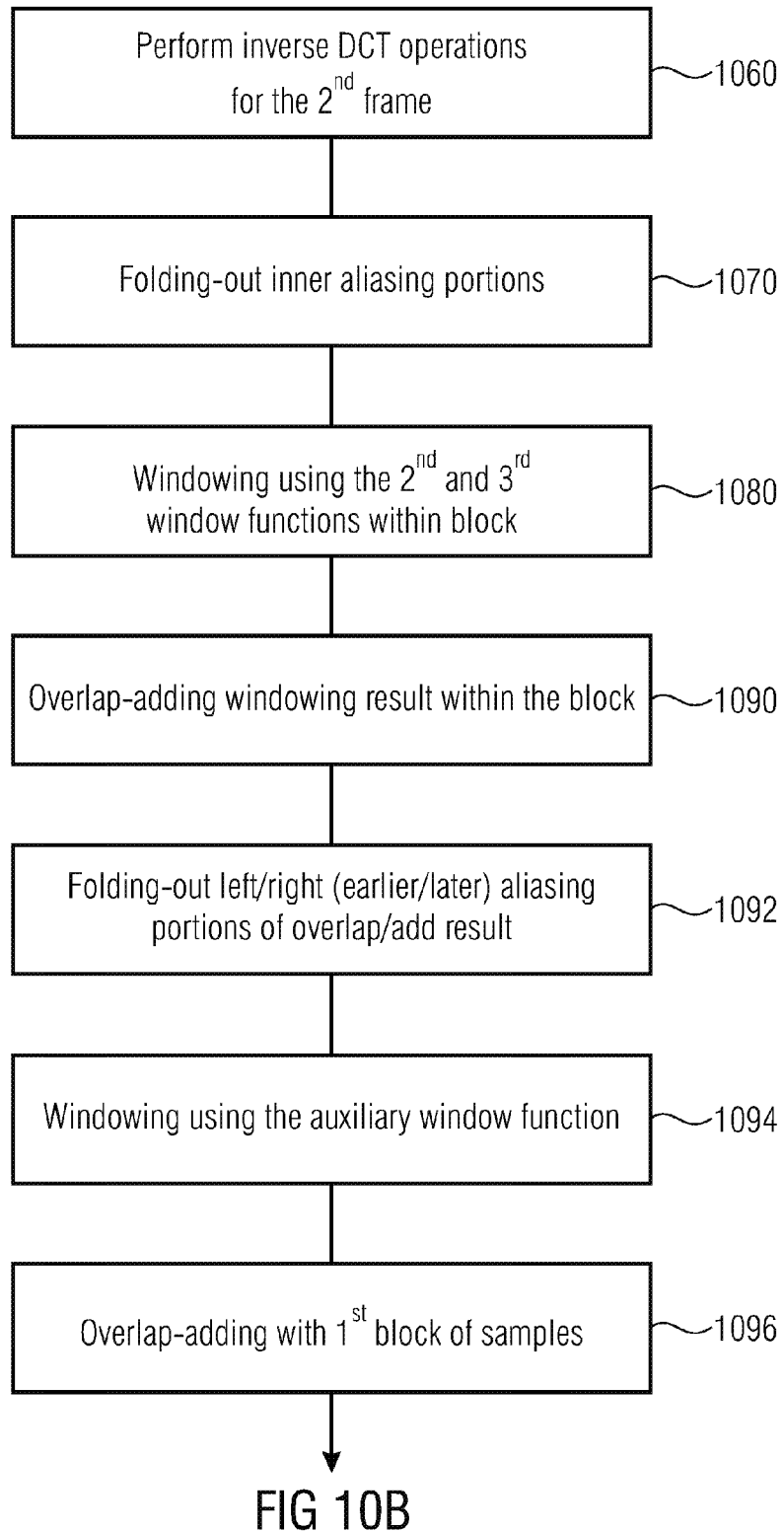
FIG. 10b illustrates a further embodiment of a procedure performed on the decoder-side.
Figure 11A:
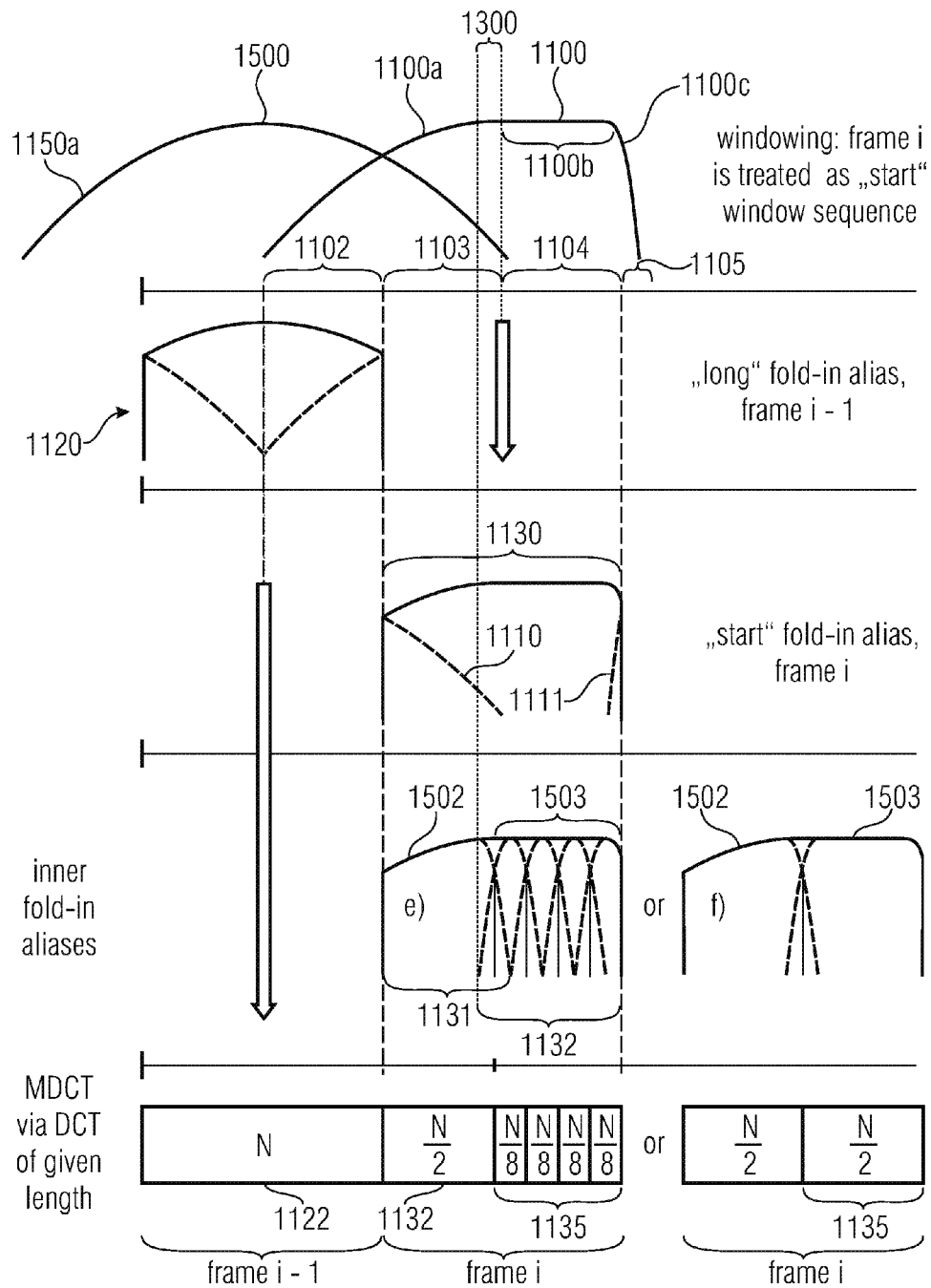
FIG. 11a illustrates operations performed on the encoder-side of an embodiment.

In order to better explain the procedure of the preprocessor 802 on the encoder-side, reference is made to the illustration in FIG. 11*a* on the one hand and flowcharts in FIG. 9*a*, 9*b* on the other hand. Regarding the decoder, reference is made to the corresponding illustrations in FIG. 8*b*, FIGS. 10*a*, 10*b* and the illustration in FIG. 11*b*. Furthermore, the encoder is also illustrated in FIG. 12*a* and the decoder is illustrated in FIG. 12*b*.

In particular, FIG. 11*a* illustrates once again the first window function 1500 and at least a portion of the second window function 1502 and either four third window functions 1503 or a single third window function 1503. In particular, FIG. 11*a* additionally illustrates the auxiliary window function 1100. The auxiliary window function 1100 has a first portion 1100*a* coinciding with the first ascending portion 1500*a* of the first window function 1500. Furthermore, the auxiliary window function 1100 has a second non-overlapping part 1100*b* advantageously having window coefficients equal to unity and a third portion 1100*c* corresponding to a descending or falling or right portion of the one or more third window functions. Thus, the auxiliary window function 1100 covers the second half of the earlier frame illustrated at 1102, the first half of the current frame i indicated by 1103, the second half of the current frame i indicated by 1104 and the first small portion 1105 covered by the auxiliary window function part 1100*c*. As becomes clear from FIG. 11*a*, the auxiliary window function is treated as a "start window sequence" or corresponds to such a "start window sequence", as if in the frame i+1 a sequence of short windows would have to be introduced. Importantly, however, a sequence of short windows is already introduced in the current frame rather than in the coming frame i+1.

The functionality of the preprocessor is then illustrated in FIG. 11*a*. The preprocessor preprocesses the second block of window samples obtained by windowing using the auxiliary window function using a voting in operation indicated as "start fold-in alias, frame i". Thus, the left most portion of the second block of windowed samples indicated by 1110 is folded inward. This portion 1110 is the portion of the second block of windowed samples overlapping with the preceding first window function 1500, i.e. the portion of the second block of windowed samples corresponding to the time period 1102 and lying in the preceding frame i−1. Due to the fact that this folding-in operation of the portion 1110 now influences the overlap region 1300, the folding-in operation performed by the pre-processor results in a modified multi-overlap portion. Now, the spectrum converter applies the operation illustrated in the line of FIG. 11*a* indicated as "inner fold-in aliases". In particular, the spectrum converter applies an aliasing introducing transform to the first block of samples using the first window function illustrated for frame i−1. The aliasing-introducing transform comprises the fold-in operation illustrated at 1120 and the subsequent, for example, DCT-IV transform indicated at 1122. To this end, the first window function 1500 is necessitated in order to obtain the shape before the folding-in operation 1120 for frame i−1. Furthermore, the spectrum converter applies the aliasing-introducing transform to the first portion indicated by item 1131 in FIG. 11*a*. This is done using the second window function 1502 and in particular the right portion of the second window function 1502. This operation results in a first portion of spectral samples of a second frame obtained by transform 1132, where transform 1132 once again represents a DCT-IV operation which constitutes, together with the corresponding folding operation, but now only in the right overlapping portion of block 1131, the aliasing-introducing transform.

Furthermore, the spectrum converter is configured to apply the aliasing introducing transform to a second portion 1133 of the pre-processed second block 1130 using the one or more third window functions 1503 to obtain a second portion 1135 of spectral samples of the second frame. Thus, in order to obtain the second portion 1135 of spectral samples, four N/8 DCT-IV transforms or a single N/2 DCT-IV transform can be applied. The number of transforms and the lengths depend on the number of third window functions. Generally, the length, the transform or the number of spectral samples in the second portion 1135 is equal to the number of spectral samples in a frame minus the length of the transform 1132 and the result is then divided by the number of third window functions used.

Thus, the pre-processor 802 is generally operative for windowing 902 (FIG. 9*a*), the audio signal using the auxiliary window function 1100 to obtain the second block of windowed samples. Then, the processor 904 advantageously applies the folding operation indicated at 1110 in FIG. 11*a* to obtain the pre-processed second block of windowed samples with the modified multi-overlap portion 1300. Then, the converter 906 applies the transforms using the first, the second and the third window functions to obtain the first frame of spectral values 1122, the first portion 1132 of the second frame and the second portion 1135 of the second frame or frame i in the notation of FIG. 11*a*.

In the embodiment, illustrated with respect to FIG. 9*b*, the auxiliary window function is determined 910 by making reference to the first window function, and exemplarily by selecting, as the first portion 1100*a* of the auxiliary window function 1100, the first portion 1500*a* of the first window function. Furthermore, the non-overlapping part 1100*b* is determined (window coefficients of one are taken for the corresponding length) and the third part 1100*c* is then determined, again exemplarily by taking the second part of the short window function.

Then, the audio signal is windowed 912 with this auxiliary window function in the correct relation to the preceding or first frame i−1 illustrated in FIG. 11*a*. Then, as illustrated at 914 in FIG. 9*b*, the left portion 1110 and advantageously the right portion 1111 are folded-in. In step 916, a folding of the overlapping portions illustrated in hatched lines in item e) or f) in the inner region is performed. Furthermore, as illustrated at 918, if there are more third window functions as in FIG. 11*a* sub-picture e), then the fold-in of overlapping portions of the third window functions is performed as well. However, if there is only a single third window function as illustrated in FIG. 11*a*, sub-picture f), then the control proceeds from step 916 to 920 directly without step 918. In step 920, DCT operations are performed using the shorter DCT kernels than the DCT kernel for the first frame. The DCT kernel for sub-picture e) is, for the second window function, N/2, and for the third window functions, N/8. Contrary thereto, when there is only a single third window function, then the transform kernel is equal to N/2 for the second window function and is equal to N/2 for the single third window function.

Thus, it becomes clear that the multi-overlap region 1300 is windowed two times. The first windowing is done by the first portion 1100*a* of the auxiliary window and the second windowing is performed by the second half of the first third window function 1503 as illustrated in sub-picture e) or f) of FIG. 11*a*.

Reference is made to FIG. 13 again. As discussed in the context of FIG. 1*a* or in the context of FIG. 8*a*, the window sequence controller generates the specific window shapes. In an embodiment, the window sequence controller is configured to comprise the transient location detector 106. When a transient is detected in transient detection portions 0 or 1, then the encoder is controlled to go into the multi-overlap portion mode so that these transients indicated at 1305 are confined to lie only within a single third window or within two adjacent third windows. Specifically, the left transient 1305 is confined to lie in the first short window function only, where the right transient of the transients 1305 lies in the first to third window functions. However, when it is determined that the transients are located in a region different from 0, such as in region 1, 2, 3 or so, then a processing without the multi-overlap region can be performed, for example, similarly as discussed in the context of FIG. 6*a*, FIG. 6*b*, FIG. 7 or so.

Contrary thereto, however, the multi-overlap region processing can also be performed in the context of the window switching application, where, when a transient is detected, an even larger set of short windows can be switched for the current frame so that, advantageously within one and the same block or frame raster, either a long window or a specified number of short windows is used for windowing. The first window corresponds to window 1500, for example in FIG. 13, the second window corresponds to window 1502 and a switch-over is performed, without having reference to a certain transient location, to a number of third window functions only when anywhere in the current frame a transient is detected without knowing where exactly within the frame the transient is located.

However, it is advantageous in order to keep the number of third window functions as small as possible that the switching into the multi-overlap portion mode and the additional switching of the transform overlap and the transform length selection is performed depending on the specific location of the transient within the frame, i.e. in one of four or even eight different portions of a frame or of a time portion corresponding to a frame, where this time portion is then equal to half the size of a long window, such as long window 1500 of FIG. 13. Advantageously, the multi-overlap portion is, as can be seen in FIG. 13, located before a start 208 (illustrated in FIG. 2 on the one hand and FIG. 13 on the other hand) of the look-ahead region.

On the decoder-side, an analogous processing is performed. In an embodiment of an apparatus for decoding an encoded audio signal 821, which comprises an encoded first frame and an encoded second frame, a decoding processor 824 of FIG. 8*b* is necessitated for processing the first encoded frame and the second encoded frame to obtain a first frame of spectral values and a second frame of spectral values, the first and the second frames comprising aliasing portions. A time converter 826 is connected to the decoded processor 824 and the time converter 826 is configured for applying a transform to this first frame using a first window function to obtain a first block of samples. Furthermore, the time converter 826 is configured to applying the transform to a first portion of the second frame using a second window function and to apply the transform to a second portion of the second frame using one or more third window functions to obtain the second block of samples. As discussed in the context of FIG. 1*a*, the first window function 1500, the second window function 1502 and the one or more third window functions 1503 together have a multi-overlap region 1300.

Furthermore, the decoder comprises a post-processor 828 for post-processing the second block of samples using a folding-out operation to obtain a post-processed second block of samples having a portion of the second block of samples overlapping with the first block of samples in the multi-overlap region. Furthermore, the post-processor 828 is configured for windowing the post-processed second block of samples using the auxiliary window function discussed in the context of FIG. 8*a* and FIG. 11*a*. The post-processor 828 performs an overlap-adding of the windowed post-processed second block of samples and the first block of samples to obtain the decoded audio signal indicated at 829 of FIG. 8*b* or at block 175 of FIG. 1*c*. Thus, basically the post-processor 828 of FIG. 8*b* may have the functionality of the synthesis windower 172 with respect to the auxiliary window function and the overlap-adder 174.

Subsequently, the functionality of the post-processor in cooperation with the time converter is discussed with respect to the illustration of FIG. 11*b* which illustrates a reverse processing with respect to the FIG. 11*a* encoder illustration. The first frame of spectral values 1142 is input into an N-size inverse transform 1161 and the first portion 1152 of the second frame is input into an N/2 inverse transform 1162 and depending on the number of third window functions, the second portion 1155 of the second frame is either input into four N/8 short transforms 1163 or a single N/2 transform 1162 similar as for the first portion 1152 of the second frame.

This procedure is performed by the time converter. The time converter additionally uses the first window function to perform the windowing together with a before performed folding-out operation illustrated at 1170 in FIG. 11*b*. Furthermore, the second window function is used when applying the procedures to the first portion 1152 illustrated at 1172. Specifically, the fold-out of specifically the most right portion 1173 of the second window function and the second subsequent windowing is performed while, on the left hand side of the frame, any inner-fold-out is not performed. Furthermore, the transform performs a specific fold-out and subsequent windowing and additional overlap-adding not only with the first portion 1152 of the second frame but also with the second portion 1155 of the second frame as illustrated at 1172 in FIG. 11*b*. If there is only a single third window function illustrated at sub-picture f) in FIG. 11*b*, then only a single folding-out operation from both sides together with the windowing using the right hand portion of the second window function and the left hand portion of the third window function and the subsequent overlap-add within the overlapping range 1174 are performed.

Then, the post-processor applies the post-processing using the folding-out operation illustrated at 1175 with the first portion of the result of the procedure in 1172 to obtain a portion 1176*a* extending in the previous frame and advantageously 1176*b* extending in the next frame. Then, windowing with the folded-out portion 1176*a*, 1176*b* and of course with the portion within the current frame i using the auxiliary window function is performed to obtain the state illustrated at 1175. Then, a final overlap-adding of the auxiliary window function-windowed post-processed second block of samples and the first block of samples is performed at and within the overlapping range 1180 to obtain the final decoded audio signal corresponding to this overlapping range 1180. Furthermore, this procedure additionally results in a subsequent portion of decoded audio signal samples 1181 due to the fact that there is no overlap and the next section 1182 is obtained by overlapping with the corresponding part of a window function for frame i+1, following frame i in time.

Thus, as illustrated in FIG. 10*a*, the decoder-side method comprises applying 1000 a transform to the first frame using the first window function and applying 1010 the transform to the first portion of the second frame using the second window function and applying 1020 the transform to the second portion of the second frame using the third window function(s). Then, in step 1030 a folding-out operation is performed and in step 1040, a windowing using the auxiliary window function is performed and finally, in step 1050 an overlap-adding of the windowed post-processed second block and the first block is performed to obtain the decoded audio signal at the end of the processing illustrated, for example, in FIG. 11*b*.

As illustrated in FIG. 10*b*, embodiments comprise performing an inverse DCT operation for each portion of the second frame, i.e. performing several DCT operations with shorter lengths with respect to the previous frame i−1, where a long window 1500 was used. In step 1070 a folding-out of the inner aliasing portions is performed as the operation illustrated in 1172 and the folding-out is advantageously a mirroring at the corresponding border illustrated as vertical lines in the line indicated by 1172 in FIG. 11*b*. Then, in step 1080, a windowing using the second and third window functions within the block 1184 is performed and the subsequent overlap-adding of the windowing result within the block is performed as illustrated in 1090. Then, as indicated at 192, a folding-out of the left/right or, in other words, earlier/later aliasing portions of the overlap-add result is performed in order to obtain portions 1176*a* extending in the previous frame and portion 1176*b* extending in the next frame. However, the representation in 1175 is only subsequent to windowing using the auxiliary window function illustrated in 1094. Then, in step 1906, an overlap-adding with the first block of samples is performed subsequent to the windowing using the auxiliary window function.

Subsequently, reference is made to FIG. 12*a* and FIG. 12*b*. Item a in FIG. 12*a* corresponds to the procedure in the first line of FIG. 11*a*. The procedure in sub-picture b) corresponds to the procedure performed in the second and third lines of FIG. 11*a* and the procedures illustrated in item c) in FIG. 12*a* correspond to the procedures in the last two lines of FIG. 11*a*. Analogously, the decoder-side representation corresponds to FIG. 12*b*. In particular, the first two lines of FIG. 11*b* correspond to the sub-picture f) in FIG. 12*b*. The third and fourth lines correspond to item e) in FIG. 12*b*, and the last line in FIG. 12*b* corresponds to the last line in FIG. 11*b*.

FIG. 14*a* illustrates a situation where the window sequence controller on the encoder-side or the elements 824, 826, 828 of the decoder side are configured for switching between a non-multi-overlap situation as in FIG. 14*a* and a multi-overlap situation illustrated in FIG. 14*b*. Thus, when a transient is detected in transient portion 0, one procedure is to not apply the multi-overlap portion but to switch to single-overlapping short windows TCX-10 from TCX-20 windows. Advantageously, however, a switch over to a multi-overlap portion is performed by applying a window sequence comprising the first window 1400, the second window 1402 and one or, in the embodiment of FIG. 14*b*, two third windows 1403.

Figure 11B:
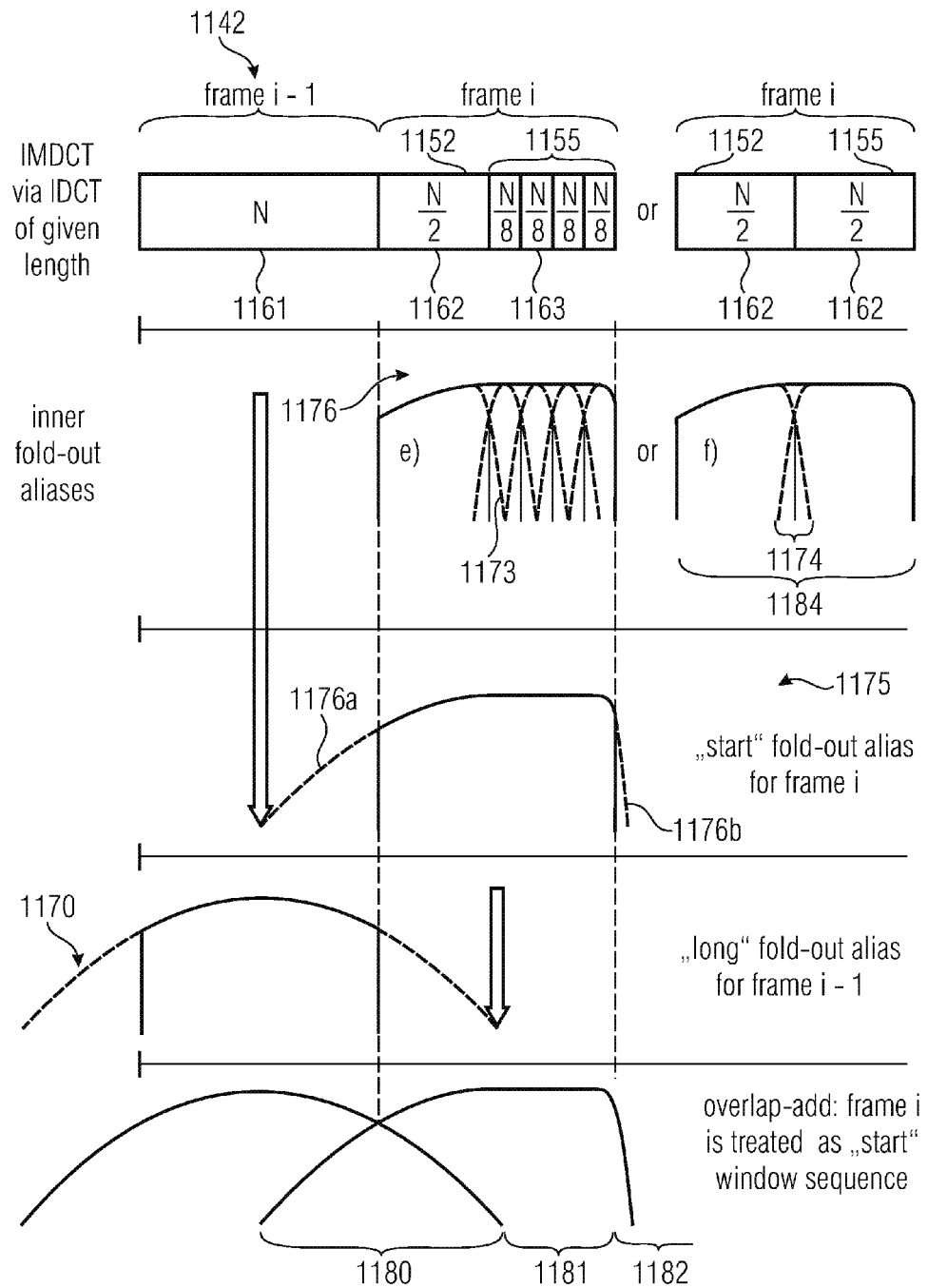
FIG. 11b illustrates operations performed by a decoder in an embodiment of the present invention.
Figure 12A:
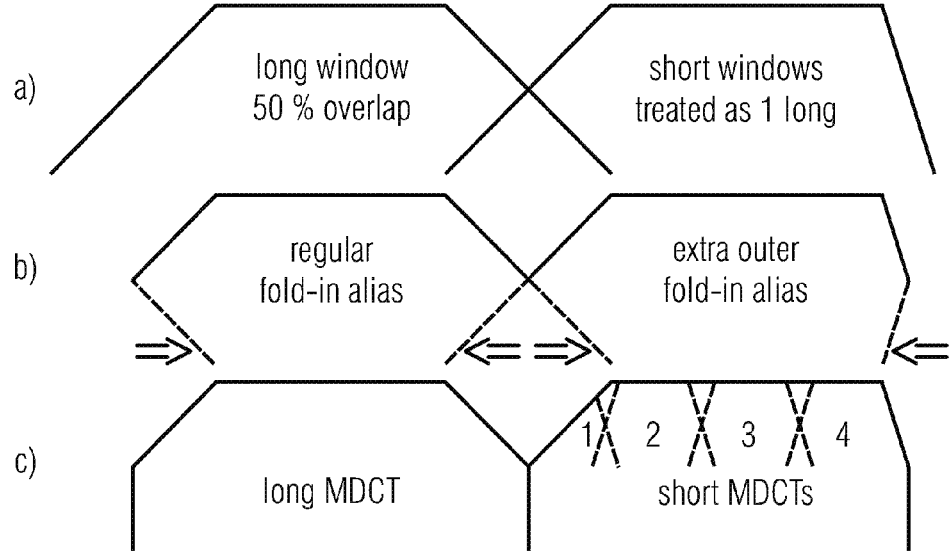
FIGS. 12a and 12b illustrate a further embodiment of procedures to be performed on the encoder/decoder-side in the context of the multi-overlap aspect of the invention.
Figure 12B:
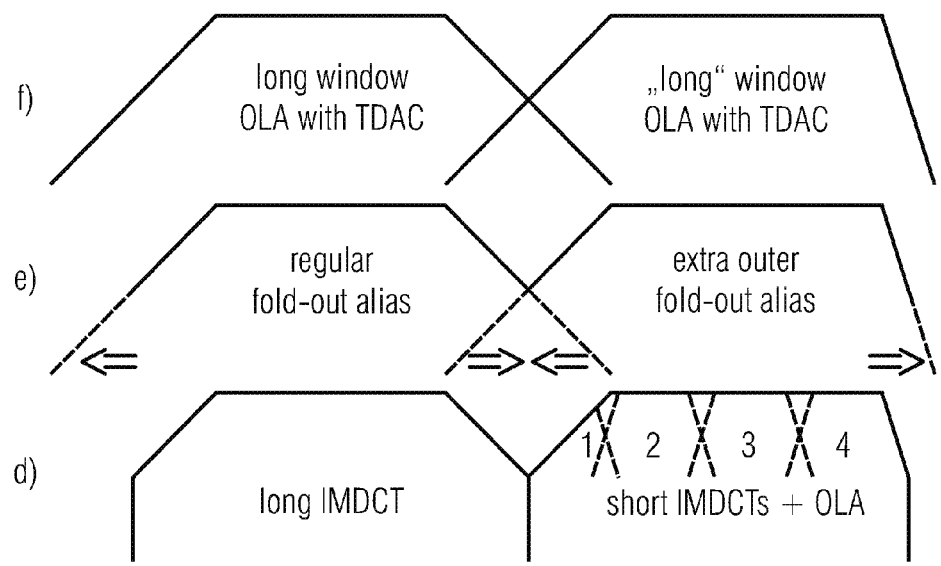

The window overlaps and sizes of FIG. 14*b* are somewhat different from the illustration in FIG. 13, but it becomes clear that the general procedures regarding the encoder-side in FIG. 11a or the decoder-side in FIG. 11b take place in the same way.

Subsequently, FIG. 15 is discussed. Specifically, FIG. 15 illustrates, as the black boxes, a transient detection look-ahead 1590 and the duration of the resulting pre-echo 1595. FIG. 15a illustrates a traditional High-Efficiency-AAC-type sequence comprising a long-start window, eight short windows, a long-stop window and so on. The necessitated look-ahead is high and amounts to N+N/2+N/16, but the pre-echo 1595 is small. Analogously, FIG. 15b illustrates a traditional AAC low delay-type transient detection procedure resulting in a window sequence comprising a long sequence, a long-start window, a low overlap window, and a long-stop window. The transient detection look-ahead is the same as in FIG. 15a, but the duration of the pre-echo is longer than in FIG. 15a. On the other hand, however, the efficiency is higher due to the fact that the more shorter windows are used, the lower the bitrate efficiency is.

FIGS. 15c and 15d illustrate an implementation of the High-Efficiency AAC or an AAC-low delay procedure with a reduced transient detection look-ahead of N/16 samples and there are only shown long sequences possible with a reduced transient detection look-ahead of N/16 samples. If the sequence consists of a long window, a long window, a long-start window, a long-stop window, and so on, as illustrated in FIG. 15d, only the post-echo is reduced compared to FIG. 15c, but the pre-echo 1595 is the same. Hence, FIG. 15c, d, illustrate a short look-ahead similar to the inventive FIGS. 15e and 15f. If one would now implement the multi overlap portion as in FIGS. 15c and 15e, then one can only use sequences as in those figures, but any switch to a short window is not possible. Thus, the multi-overlap portion allows either switching to short windows to reduce the pre/post echoes, or to use a short look-ahead delay or both features to reduce the delay and to reduce pre/post echoes.

FIG. 15e illustrates a High-Efficiency AAC sequence with a reduced transient detection look-ahead of N/16 samples and the multi-overlap region 1300. The sequence comprises a long window, a further long window 1500, a further start sequence 1502, four short sequences 1503, and a long-stop window 1504. As becomes clear, the look-ahead is small, as is the pre-echo. A similar situation is obtained for FIG. 15f illustrating a similar configuration as in FIG. 15e, but with only a single third window function instead of four short sequences.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] International Organization for Standardization, ISO/IEC 14496-3 2009, "Information Technology—Coding of audio-visual objects—Part 3 Audio," Geneva, Switzerland, August 20096.
[2] Internet Engineering Task Force (IETF), RFC 6716, "Definition of the Opus Audio Codec," Proposed Standard, September 2012. Available online at http://tools.ietf.org/html/rfc6716.
[3] C. R. Helmrich, "On the Use of Sums of Sines in the Signal Windows," in *Proc. of the 13$^{th}$ Int. Conference on Digital Audio Effects (DAFx-10)*, Graz, Austria, September 2010.
[4] J. Herre and J. D. Johnston, "Enhancing the Performance of Perceptual Audio Coders by Using Temporal Noise Shaping (TNS)," in *Proc. 101$^{st}$ AES Convention*, LA, USA, November 1996
[5] M. Neuendorf et al., "MPEG Unified Speech and Audio Coding—The ISO/MPEG Standard for High-Efficiency Audio Coding of All Content Types," *in Proc 132$^{nd}$ Convention of the AES*, Budapest, Hungary, April 2012. Also to appear in the Journal of the AES, 2013.

The invention claimed is:

1. Apparatus for encoding an audio signal, comprising:
    a controllable windower for windowing the audio signal to provide a sequence of blocks of windowed samples;
    a converter for converting the sequence of blocks of windowed samples into a spectral representation comprising a sequence of frames of spectral values;
    a transient location detector for identifying a location of a transient within a transient look-ahead region of a frame; and
    a controller for controlling the controllable windower to apply at least two time-adjacent overlapping windows to the audio signal in response to an identified location of the transient, a window of the at least two time-adjacent overlapping windows having a specified overlap length,
    wherein the controller is configured to select the at least two time-adjacent overlapping windows from a group of at least three windows comprising a first window having a first overlap length, a second window having a second overlap length, and a third window having a third overlap length or having no overlap,
    wherein the first overlap length is greater than the second overlap length, and wherein the second overlap length is greater than the third overlap length or greater than an overlap of zero,
    wherein the at least two time-adjacent overlapping windows are selected based on the transient location such that one of the at least two time-adjacent overlapping windows comprises first window coefficients at the location of the transient and the other of the at least two time-adjacent overlapping windows comprises second window coefficients at the location of the transient, wherein the second window coefficients are at least nine times greater than the first window coefficients.

2. Apparatus of claim 1, wherein the controller is configured to select the window of the at least two time-adjacent overlapping windows having the specified overlap length so that the second window coefficients are equal to 1 and the first window coefficients are equal to zero.

3. Apparatus of claim 1, wherein the first overlap length is equal to one quarter or one third or one half of a length of the window of the at least two time-adjacent overlapping windows having the specified overlap length, wherein the second overlap length is equal to one half or one third of the first overlap length, and wherein the third overlap length is one half or one quarter or one eighth of the second overlap length or less than or equal to 1.25 milliseconds.

4. Apparatus of claim 1, further comprising an output interface for associating a window information provided by the controller with an encoded representation of the spectral representation comprising a sequence of encoded blocks of spectral values.

5. Apparatus of claim 1,
    wherein the converter is configured for performing a modified discrete cosine transform or a modified discrete sine transform, wherein a number of spectral values in a block of spectral values is lower than a number of windowed samples in a block of windowed samples.

6. Apparatus of claim 1, wherein the controller is configured to control the windower in such a way that a constant frame raster is maintained in the sequence of blocks comprising at least five frames, wherein a frame has a length being equal to a length of the first window or being equal to the length of the first window divided by an integer multiple of two, and
    wherein the transient look-ahead region extends from a location in the current frame until a location in a next frame, the location being in the middle of the frame or displaced from the middle of the frame by less than or equal to 25% of the samples of a frame.

7. Apparatus of claim 1,
    wherein the transient location detector is configured to apply the transient look-ahead region extending over a full frame and to distinguish at least four quarters, and wherein the controller is configured to select the first window, when no transient is detected, to select the second window, when a transient is detected in the first or fourth quarter and to select the third window, when a transient is detected in the second or the third quarter.

8. Apparatus of claim 1,
    wherein the controller is configured to determine the window of the at least two time-adjacent overlapping windows having the specified overlap length window so that an overlap width is chosen in such a way that only one of the two time-adjacent overlapping windows comprises the detected transient.

9. Apparatus of claim 1,
    wherein the transient location detector is configured to detect the location of the transient within the transient look-ahead region so that the transient location coincides with a start or an onset of the transient or coincides with a time location of a maximum amplitude or energy or a center of an energy of the transient.

10. Apparatus of claim 1,
wherein the transient location detector is configured for using a transient look-ahead region covering a second portion of a current frame and a first portion of a next frame,
wherein the transient location detector is configured to identify eight different transient locations identified by an index from zero to seven,
wherein the controller is configured to select the second window, when the transient index is seven or to select the third window, when the transient index is six.

11. Apparatus of claim 1,
wherein the transient location detector is configured for using a transient look-ahead region covering a second portion of a current frame and a first portion of a next frame,
wherein the transient location detector is configured to identify eight different transient locations identified by an index from zero to seven,
wherein the controller is configured to select the first window, when no transient is detected, to select the second window, when the transient index is equal to zero, one, six, seven, or to select the third window, when the transient index is equal to two, three, four, five.

12. Apparatus of claim 1,
wherein the controller is configured to select a number of windows for a frame so that a number of spectral values acquired by a plurality of windows for a frame is equal to the number of spectral values acquired by converting using a window having the first window size,
wherein the first to third windows have an identical first window size, and wherein a frame is defined by the identical window size, and wherein the group comprises a fourth window and a fifth window, the fourth window and the fifth window having an identical second window size, the second window size being an integer fraction of the first window size, and wherein the fourth window has a fourth overlap length and the fifth window has a fifth overlap length lower than the fourth overlap length.

13. Apparatus of claim 1,
wherein the controller is configured to determine, based on the transient location, an overlap width information and a short/long transform information,
wherein the overlap width information is determined to have a first value indicating a maximum overlap width, a second value indicating a medium overlap width and a third value indicating a minimum overlap width,
wherein the short/long transform information comprises an identification for a long window or a short window for a frame comprising more than one transforms, and
wherein the controller is configured to determine a single window for a frame or a sequence of two, three or four windows for the frame based on the overlap width information and the short/long transform information.

14. Apparatus of claim 1,
wherein the controller is configured to determine a number of transforms and corresponding lengths of the transforms for a frame in response to an identified transient location,
wherein the controller is configured to determine the number and lengths of the transform for a frame such that a number of spectral values acquired by the transforms for the frame is equal to a number of spectral values acquired by a longest transform length associated with a maximum overlap window.

15. Apparatus of claim 1,
wherein the controller is configured to determine a length and number of transforms or to select the window of the at least two time-adjacent overlapping windows having the specified overlap length so that a multi-overlap region extending over a plurality of samples is acquired within the frame so that the plurality of samples are windowed by at least three overlapping windows.

16. Apparatus of claim 1,
wherein the controller is configured to determine the length and number of transforms or to select the window of the at least two time-adjacent overlapping windows having the specified overlap length so that the multi-overlap region is determined, wherein a transient is located at a location of the transient look-ahead region corresponding to a region extending by 30% of the samples of the frame around the middle of the frame.

17. Decoder for decoding an audio signal comprising a sequence of blocks of converted windowed samples and associated window information identifying a specific window for a block out of at least three different windows, comprising:
a processor for providing a sequence of blocks of spectral values;
a controllable converter for converting the sequence of blocks of spectral values into a time domain representation using an overlap-add processing,
wherein the controllable converter is controlled by the window information to apply the specific window identified by the window information to a corresponding block when calculating a decoded audio signal,
wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero,
wherein the first window, the second window and the third window have associated the same transform size defining a frame, and
wherein the first overlap length is one quarter or one third or one half of a length of the first window, wherein the second overlap length is one half or one third of the first overlap length, and wherein the third overlap length is one half or one quarter or one eighth of the second overlap length or less than or equal to 1.25 milliseconds.

18. Decoder of claim 17, wherein the controllable converter comprises:
a frequency-time converter for converting the blocks of spectral values into a time representation;
a synthesis windower for applying the specific window as a synthesis window to the time representation of the block of spectral values; and
an overlap-adder for overlapping and adding time-adjacent windowed time representations to acquire the decoded audio signal,
wherein the synthesis windower, the overlap-adder or the frequency-time converter are controlled by the associated window information to apply the specific window as the synthesis window and to apply an overlap as indicated by the window information.

19. Decoder of claim 17,
wherein the controllable converter is configured to apply, in response to the window information, a fourth window having the first overlap length, wherein the fourth window has associated a transform size being half of the transform size of the first to third windows, or
wherein the controllable converter is configured to apply, in response to the window information, a fifth window having the second overlap length and a sixth window having the third overlap length, wherein the fifth window and the sixth window have associated the same transform size being a quarter of the transform size of the first to third windows.

20. Decoder of claim 19,
wherein the controllable converter is configured to apply, in response to the window information, either a sequence of a single fourth window and two sixth windows, wherein the two sixth windows have the third overlap length in overlapping window portions.

21. Decoder of claim 19,
wherein the controllable converter is configured to apply, in response to the window information, a sequence of windows comprising, in the order:
the first window, the fourth window, the sixth window and the fifth window,
the first window, the fourth window and two sixth windows,
the second window, the fifth window, two sixth windows and the fifth window,
the third window and four sixth windows;
the third window, two sixth windows, and the fourth window,
the third window, three sixth windows, and the fifth window;
the first window and the second window, or vice versa,
the first window, the third window or vice versa, or
the second window and the third window, or vice versa.

22. Decoder of claim 17,
wherein the controllable converter is configured to perform an inverse modified discrete cosine transform or an inverse modified discrete sine transform or any other aliasing reducing transform with an overlap and add functionality.

23. Decoder of claim 17,
wherein a first transform length comprises 512 MDCT or MDST coefficients, wherein a second transform length comprises 256 MDCT or MDST coefficients, and wherein a third transform length comprises 128 MDCT or MDST coefficients.

24. System for processing an audio signal comprising:
an apparatus for encoding the audio signal to obtain an encoded audio signal, the apparatus for encoding being defined by claim 1;
a decoder for decoding an encoded audio signal comprising a sequence of blocks of converted windowed samples and associated window information identifying a specific window for a block out of at least three different windows, comprising:
a processor for providing a sequence of blocks of spectral values;
a controllable converter for converting the sequence of blocks of spectral values into a time domain representation using an overlap-add processing,
wherein the controllable converter is controlled by the window information to apply the specific window identified by the window information to a corresponding block when calculating a decoded audio signal,
wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero.

25. System of claim 24,
wherein windows used in the apparatus for encoding are identical to corresponding windows used in the decoder, and
wherein the decoder comprises a read-only memory, in which only a single set of windows is stored for usage in the apparatus for encoding and the decoder.

26. Method for encoding an audio signal, comprising:
windowing the audio signal to provide a sequence of blocks of windowed samples;
converting the sequence of blocks of windowed samples into a spectral representation comprising a sequence of frames of spectral values;
identifying a location of a transient within a transient look-ahead region of a frame; and
controlling the windowing to apply at least two time-adjacent overlapping windows a to the audio signal in response to an identified location of the transient, a window of the at least two time-adjacent overlapping windows having a specified overlap length,
wherein the at least two time-adjacent overlapping windows are selected from a group of at least three windows comprising a first window having a first overlap length, a second window having a second overlap length, and a third window having a third overlap length or having no overlap,
wherein the first overlap length is greater than the second overlap length, and wherein the second overlap length is greater than the third overlap length or greater than an overlap of zero,
wherein the at least two time-adjacent overlapping windows are selected based on the transient location such that one of two at least two time-adjacent overlapping windows comprises first window coefficients at the location of the transient and the other of the at least two time-adjacent overlapping windows comprises second window coefficients at the location of the transient, wherein the second window coefficients are at least nine times greater than the first window coefficients.

27. Method for decoding an audio signal comprising a sequence of blocks of converted windowed samples and associated window information identifying a specific window for a block out of at least three different windows, comprising:
providing a sequence of blocks of spectral values;
converting the sequence of blocks of spectral values into a time domain representation using an overlap-add processing,
wherein the converting is controlled by the window information to apply the specific windows indicated identified by the window information to the corresponding block when calculating a decoded audio signal,
wherein the window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero, wherein the first window, the second window and the third window have associated the same transform size defining a frame, and wherein the first overlap length is one quarter or one third or one half of a length of the first window, wherein the second overlap length is one half or one third of the first overlap length, and wherein the third overlap length is one half or one quarter or one eighth of the second overlap length or less than or equal to 1.25 milliseconds.

28. Non-transitory storage medium having stored thereon a computer program performing, when running on a computer or a processor, the method of claim 26.

29. Non-transitory storage medium having stored thereon a computer program performing, when running on a computer or a processor, the method of claim 27.

30. Decoder for decoding an audio signal comprising a sequence of blocks of converted windowed samples and associated window information identifying a specific window for a block, the specific window being a certain window from at least three different windows, comprising:
   a processor for providing a sequence of blocks of spectral values;
   a controllable converter for converting the sequence of blocks of spectral values into a time domain representation using an overlap-add processing,
   wherein the controllable converter is controlled by the window information to apply the specific window identified by the window information to a corresponding block when calculating a decoded audio signal,
   wherein the window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero,
   wherein the window information comprises a transform length information and an overlap information,
   wherein a controller is configured to determine an overlap and a window for a block of spectral values based on a previous window information and a current window information,
   wherein the current window information either indicates a first transform having a first transform length or two second transforms each having a second transform length, or a second transform having the second transform length and two third transforms each having a third transform length or four transforms having the third transform length,
   wherein the first transform length is double the size of the second transform length, and wherein the second transform length is double the size of the third transform length.

31. Decoder for decoding an audio signal comprising a sequence of blocks of converted windowed samples and associated window information identifying a specific window for a block, the specific window being a certain window from at least three different windows, comprising:
   a processor for providing a sequence of blocks of spectral values;
   a controllable converter for converting the sequence of blocks of spectral values into a time domain representation using an overlap-add processing,
   wherein the controllable converter is controlled by the window information to apply the specific window identified by the window information to a corresponding block when calculating a decoded audio signal,
   wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero,
   wherein the window information comprises a previous overlap information indicating an overlap of a later portion of a previous window, and wherein the window information comprises a current overlap information indicating an overlap of a later portion, wherein a controller is configured to determine an earlier portion of a window immediately following the previous window in accordance with the overlap information of the later portion of the previous window.

32. Decoder for decoding an audio signal comprising a sequence of blocks of converted windowed samples and associated window information identifying a specific window for a block, the specific window being a certain window from at least three different windows, comprising:
   a processor for providing a sequence of blocks of spectral values;
   a controllable converter for converting the sequence of blocks of spectral values into a time domain representation using an overlap-add processing,
   wherein the controllable converter is controlled by the window information to apply the specific window identified by the window information to a corresponding block when calculating a decoded audio signal,
   wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero,
   wherein the window information for a current frame indicates a transform length information necessitating a second transform length being smaller than a first transform length defining the frame,
   wherein the controllable converter is configured to apply a sequence of two or four windows associated with a third transform length, wherein an overlap between two time-adjacent windows associated with the third transform length is the third overlap length, and wherein the third transform length is lower than the second transform length.

33. Decoder for decoding an audio signal comprising a sequence of blocks of converted windowed samples and associated window information identifying a specific window for a block out of at least three different windows, comprising:
   a processor for providing a sequence of blocks of spectral values;

a controllable converter for converting the sequence of blocks of spectral values into a time domain representation using an overlap-add processing, wherein the controllable converter is controlled by the window information to apply the specific window identified by the window information to a corresponding block when calculating a decoded audio signal, wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero, wherein the window information is associated with each frame of the encoded audio signal, wherein a frame is defined by a transform associated with the first window, wherein the window information is a variable length code comprising a bit for a transform length and a single or 2 bits for an overlap length, wherein the controllable converter is configured to apply a sequence of windows defined by an overlap length of a previous window information and by an overlap length and a transform length of a current window information immediately following the previous window information in the encoded audio signal.

34. Decoder for decoding an audio signal comprising a sequence of blocks of converted windowed samples and associated window information identifying a specific window for a block, the specific window being a certain window from at least three different windows, comprising:

a processor for providing a sequence of blocks of spectral values;

a controllable converter for converting the sequence of blocks of spectral values into a time domain representation using an overlap-add processing, wherein the controllable converter is controlled by the window information to apply the specific window identified by the window information to a corresponding block when calculating a decoded audio signal, wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero, wherein the first overlap length comprises 256 samples or about 10 ms, wherein the second overlap length comprises 128 samples or about 5 ms and wherein the third overlap length comprises 16 samples or about 0.6 ms, and wherein the frame length comprises 512 samples or about 20 ms.

35. Method for decoding an audio signal comprising a sequence of blocks of converted windowed samples and associated window information identifying a specific window for a block, the specific window being a certain window from at least three different windows, comprising:

providing a sequence of blocks of spectral values;

converting the sequence of blocks of spectral values into a time domain representation using an overlap-add processing, wherein the converting is controlled by the window information to apply the specific window identified by the window information to the corresponding block when calculating a decoded audio signal, wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero, wherein the window information comprises a transform length information and an overlap information, wherein an overlap and a window for a block of spectral values is determined based on a previous window information and a current window information, wherein the current window information either indicates a first transform having a first transform length or two second transforms each having a second transform length, or a second transform having the second transform length and two third transforms each having a third transform length or four transforms having the third transform length, wherein the first transform length is double the size of the second transform length, and wherein the second transform length is double the size of the third transform length.

36. Method for decoding an audio signal comprising a sequence of blocks of converted windowed samples and associated window information identifying a specific window for a block out of, the specific window being a certain window from at least three different windows, comprising:

providing a sequence of blocks of spectral values;

converting the sequence of blocks of spectral values into a time domain representation using an overlap-add processing, wherein the converting is controlled by the window information to apply the specific window identified by the window information to the corresponding block when calculating a decoded audio signal, wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero, wherein the window information comprises a previous overlap information indicating an overlap of a later portion of a previous window, and wherein the window information comprises a current overlap information indicating an overlap of a later portion, wherein an earlier portion of a window immediately following the previous window is determined in accordance with the overlap information of the later portion of the previous window.

37. Method for decoding an audio signal comprising a sequence of blocks of converted windowed samples and associated window information identifying a specific window for a block, the specific window being a certain window from at least three different windows, comprising:

providing a sequence of blocks of spectral values;
converting the sequence of blocks of spectral values into a time domain representation using an overlap-add processing,
wherein the converting is controlled by the window information to apply the specific window identified by the window information to the corresponding block when calculating a decoded audio signal,
wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero,
wherein the window information for a current frame indicates a transform length information necessitating a second transform length being smaller than a first transform length defining the frame,
wherein a sequence of two or four windows associated with a third transform length is applied, wherein an overlap between two time-adjacent windows associated with the third transform length is the third overlap length, and wherein the third transform length is lower than the second transform length.

38. Method for decoding an audio signal comprising a sequence of blocks of converted windowed samples and associated window information identifying a specific window for a block, the specific window being a certain window from at least three different windows, comprising:
providing a sequence of blocks of spectral values;
converting the sequence of blocks of spectral values into a time domain representation using an overlap-add processing,
wherein the converting is controlled by the window information to apply the specific window identified by the window information to the corresponding block when calculating a decoded audio signal,
wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero,
wherein the window information is associated with each frame of the encoded audio signal, wherein a frame is defined by a transform associated with the first window,
wherein the window information is a variable length code comprising a bit for a transform length and a single or 2 bits for an overlap length,
wherein a sequence of windows defined by an overlap length of a previous window information and by an overlap length and a transform length of a current window information immediately following the previous window information in the encoded audio signal is applied.

39. Method for decoding an audio signal comprising a sequence of blocks of converted windowed samples and associated window information identifying a specific window for a block, the specific window being a certain window from out of at least three different windows, comprising:
providing a sequence of blocks of spectral values;
converting the sequence of blocks of spectral values into a time domain representation using an overlap-add processing,
wherein the converting is controlled by the window information to apply the specific window identified by the window information to the corresponding block when calculating a decoded audio signal,
wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero,
wherein the first overlap length comprises 256 samples or about 10 ms, wherein the second overlap length comprises 128 samples or about 5 ms and wherein the third overlap length comprises 16 samples or about 0.6 ms, and wherein the frame length comprises 512 samples or about 20 ms.

40. Method of processing an audio signal comprising:
a method of encoding the audio signal to obtain an encoded audio signal, the method of encoding being defined by claim 26;
decoding an encoded audio signal comprising a sequence of blocks of converted windowed samples and associated window information identifying a specific window for a block, the specific window being a certain window from at least three different windows, comprising:
providing a sequence of blocks of spectral values;
converting the sequence of blocks of spectral values into a time domain representation using an overlap-add processing,
wherein the converting is controlled by the window information to apply the specific window identified by the window information to a corresponding block when calculating a decoded audio signal,
wherein the specific window is selected from a group of at least three windows comprising a first window having a first overlap length, a second window having a second overlap length, and a third window having a third overlap length or having no overlap, wherein the first overlap length is greater than the second overlap length, and wherein the second overlap length is greater than the third overlap length or greater than an overlap of zero.

41. Non-transitory storage medium having stored thereon a computer program performing, when running on a computer or a processor, the method of any one of the claims 35, 36, 37, 38, 39, 40.

* * * * *